US012077996B2

(12) United States Patent
Leonardi et al.

(10) Patent No.: US 12,077,996 B2
(45) Date of Patent: Sep. 3, 2024

(54) CLOSURE LATCH ASSEMBLY AND ELECTRONIC CONTROL SYSTEMS FOR THE CLOSURE LATCH ASSEMBLY

(71) Applicant: MAGNA CLOSURES INC., Newmarket (CA)

(72) Inventors: Emanuele Leonardi, Pisa (IT); Enrico Margheritti, Picciorana (IT); Cristiano Sileo, Newmarket (CA); Francesco Patane, Newmarket (CA); Francesco Cumbo, Pisa (IT); Marco Marlia, Guasticce Collesalvetti (IT); Enrico Boeri, Camaiore (IT)

(73) Assignee: MAGNA CLOSURES INC., Newmarket (CA)

( * ) Notice: Subject to any disclaimer, the term of this patent is extended or adjusted under 35 U.S.C. 154(b) by 128 days.

(21) Appl. No.: 17/684,976

(22) Filed: Mar. 2, 2022

(65) Prior Publication Data

US 2022/0282530 A1 Sep. 8, 2022

Related U.S. Application Data

(60) Provisional application No. 63/226,254, filed on Jul. 28, 2021, provisional application No. 63/192,372, (Continued)

(51) Int. Cl.
*E05B 81/06* (2014.01)
*E05B 81/14* (2014.01)
(Continued)

(52) U.S. Cl.
CPC .............. *E05B 81/06* (2013.01); *E05B 81/14* (2013.01); *E05B 81/34* (2013.01); *E05B 83/36* (2013.01); *E05B 85/26* (2013.01)

(58) Field of Classification Search
CPC .......... E05B 81/90; E05B 81/32; E05B 81/06; E05B 81/14; E05B 81/34; E05B 83/36; E05B 85/26
See application file for complete search history.

(56) References Cited

U.S. PATENT DOCUMENTS 3,566,703 A * 3/1971 Van Noord ............ B62D 1/181 292/201
4,272,112 A * 6/1981 Schlick ................... E05B 81/25 292/201
(Continued)

FOREIGN PATENT DOCUMENTS

CN 103089089 A 5/2013
EP 0710755 A1 5/1996
(Continued)

*Primary Examiner* — Kristina R Fulton
*Assistant Examiner* — Emily G. Brown
(74) *Attorney, Agent, or Firm* — Dickinson Wright PLLC

(57) ABSTRACT

A closure latch assembly, operable in one of a normal operating mode and an emergency mode, has a power release motor, a ratchet and a pawl, with the ratchet being moveable between a striker capture position and a striker release position and the pawl being moveable between a ratchet holding position, whereat ratchet is maintained in the striker capture position, and a ratchet release position, whereat ratchet is biased toward the striker release position. The power release motor is configured to operate using primary control signals received from a primary controller external to closure latch assembly during the normal operating mode of closure latch assembly and to operate using secondary control signals received from a secondary controller internal to closure latch assembly during the emergency operating mode of closure latch assembly and not operate using the secondary control signals received from secondary controller during the normal operating mode.

17 Claims, 51 Drawing Sheets

Related U.S. Application Data filed on May 24, 2021, provisional application No. 63/158,315, filed on Mar. 8, 2021.

(51) Int. Cl.

| | |
|---|---|
| ***E05B 81/34*** | (2014.01) |
| ***E05B 83/36*** | (2014.01) |
| ***E05B 85/26*** | (2014.01) |

(56) References Cited

U.S. PATENT DOCUMENTS

| | | | | |
|---|---|---|---|---|
| 4,518,180 | A | 5/1985 | Kleefeldt et al. | |
| 6,007,117 | A * | 12/1999 | Spindler | E05B 83/36 292/216 |
| 6,540,270 | B1 | 4/2003 | Reddmann | |
| 6,817,636 | B1 * | 11/2004 | Evans | E05B 81/14 292/216 |
| 6,948,745 | B2 | 9/2005 | Chevalier | |
| 7,234,736 | B2 * | 6/2007 | Kachouh | E05B 81/14 292/216 |
| 7,261,334 | B2 | 8/2007 | Oberheide et al. | |
| 8,764,075 | B2 | 7/2014 | Taurasi et al. | |
| 9,194,163 | B2 | 11/2015 | Margheritti et al. | |
| 9,745,773 | B2 | 8/2017 | Halliwell | |
| 10,745,947 | B2 * | 8/2020 | Okeke | E05B 17/007 |
| 2004/0195845 | A1 | 10/2004 | Chevalier | |
| 2005/0200137 | A1 | 9/2005 | Nelsen et al. | |
| 2007/0046035 | A1 | 3/2007 | Tolley | |
| 2008/0073918 | A1 | 3/2008 | Arabia et al. | |
| 2008/0224482 | A1 | 9/2008 | Cumbo et al. | |
| 2009/0230699 | A1 | 9/2009 | Carabalona | |
| 2010/0235058 | A1 | 9/2010 | Papanikolaou et al. | |
| 2014/0175809 | A1 | 6/2014 | Takeuchi | |
| 2014/0203573 | A1 * | 7/2014 | Lujan | E05B 81/00 292/217 |
| 2018/0087298 | A1 | 3/2018 | Strole et al. | |
| 2018/0163439 | A1 * | 6/2018 | Patane | E05B 81/16 |
| 2019/0242163 | A1 * | 8/2019 | Cetnar | E05B 85/26 |
| 2020/0224464 | A1 | 7/2020 | Cumbo et al. | |
| 2021/0372169 | A1 | 12/2021 | Patane et al. | |

FOREIGN PATENT DOCUMENTS

| | | | | |
|---|---|---|---|---|
| EP | 1402139 | B1 | 9/2007 | |
| EP | 2317043 | A2 | 5/2011 | |
| GB | 2415990 | A | 1/2006 | |
| WO | WO-9827301 | A2 * | 6/1998 | E05B 77/26 |
| WO | 0049252 | A1 | 8/2000 | |
| WO | 03004810 | A2 | 1/2003 | |
| WO | WO-2021062541 | A1 * | 4/2021 | E05B 79/20 |

* cited by examiner

CLOSURE LATCH ASSEMBLY AND ELECTRONIC CONTROL SYSTEMS FOR THE CLOSURE LATCH ASSEMBLY

CROSS REFERENCE TO RELATED APPLICATIONS

This utility application claims the benefit of U.S. Provisional Application No. 63/158,315 filed Mar. 8, 2021 and U.S. Provisional Application No. 63/192,372 filed May 24, 2021 and U.S. Provisional Application No. 63/226,254 filed Jul. 28, 2021. The entire disclosure of the above applications being considered part of the disclosure of this application and hereby incorporated by reference.

FIELD

The present disclosure relates to generally to power-operated closure latch assemblies of the type used in closure systems for releasably latching a closure panel to a body portion of a motor vehicle. More particularly, the present disclosure is directed to a closure latch assembly having a standardized actuator module capable of being attached to a plurality of different latch modules and which is configured to include a latch ECU/actuator assembly and a latch ECU cover.

BACKGROUND

This section provides background information which is not necessarily prior art to the inventive concepts embodied in the present disclosure.

Continued increases in technology, driven by consumer demand for advanced comfort and convenience features, has resulted in more electronics being integrated in modern motor vehicles. To this end, electronic controllers and electronically-controlled devices are now used to control a wide variety of functions in the vehicle. For example, many modern vehicles are now equipped with a passive (i.e. "keyless") entry system to permit locking/unlocking and release of closure panels (i.e. doors, tailgates, liftgates, decklids, etc.) without the use of a traditional key-type entry system. In this regard, some popular functions now available with such passive entry systems include power lock/unlock, power cinch, and power release. Thus "powered" functions are provided by a closure latch assembly mounted to the closure panel and which is equipped with a ratchet/pawl type of latch mechanism that is selectively actuated via actuation of at least one electric actuator.

Movement of the closure panel from an open position toward a closed position results in a striker (mounted to a structural portion of the vehicle) engaging and forcibly rotating the ratchet, in opposition to a biasing force normally applied to the ratchet via a ratchet biasing member, from a striker release position toward a striker capture position. Once the ratchet is located in its striker capture position, the pawl moves, due to the urging of a pawl biasing member, into a ratchet holding position whereat the pawl mechanically engages and holds the ratchet in its striker capture position, thereby latching the latch mechanism and holding the closure panel in its closed position. A latch release mechanism is commonly associated with the latch mechanism for causing movement of the pawl from its ratchet holding position into a ratchet releasing position whereat the pawl is disengaged from the ratchet. Upon moving the pawl to its ratchet releasing position, the ratchet biasing member drives the ratchet back to its striker release position, thereby releasing the latch mechanism and permitting movement of the closure panel to its open position.

Functionality of closure latch assemblies during normal operation and emergencies is typically controlled locally by a latch control unit that may also be powered by a backup energy source if a main vehicle power source is not available (e.g., during a crash). Yet, local operation of the closure latch assembly may not be desirable in a vehicle electrical system in which other vehicle control modules are instead responsible for coordinating latch operation during normal operation. Therefore, coordinating operation of the closure latch assembly during normal operation while still providing powered operation during emergencies presents various difficulties.

In view of the above, while current power-operated closure latch assemblies are sufficient to meet all regulatory requirements and provide the desired consumer expectations for enhanced comfort and convenience, a need exists directed toward advancing the technology and providing alternative power-operated closure latch assemblies that address and overcome at least some of the known shortcomings associated with conventional arrangements.

SUMMARY

This section provides a general summary of various aspects, features and structural embodiments provided by or associated with the inventive concepts hereinafter disclosed in accordance with the present disclosure and is not intended to be a comprehensive summation and/or limit the interpretation and scope of protection afforded by the claims.

In an aspect, this disclosure provides a closure latch assembly having a power actuator operable for actuating a latch mechanism of the closure latch assembly to provide a "powered" function, and an ECU controlling actuation of the power actuator.

In accordance with yet another aspect of the disclosure, a closure latch assembly is provided, including a ratchet and a pawl. The ratchet being moveable between a striker capture position and a striker release position. The pawl being moveable between a ratchet holding position, whereat the ratchet is maintained in the striker capture position, and a ratchet release position, whereat the ratchet is biased toward the striker release position. A power actuator is operably coupled to a drive train, with the drive train including a first driven gear and a second driven gear. The second driven gear having an actuation feature fixed thereto. A latch release mechanism operably couples the actuation feature to the pawl. The latch release mechanism having a lost motion connection with the actuation feature, wherein rotation of the gear train via energization of the power actuator causes the actuation feature to move in lost motion connection with the latch release mechanism prior to the latch release mechanism causing the pawl to move from the ratchet holding position toward the ratchet release position.

In accordance with yet another aspect of the disclosure, the closure latch assembly latch release mechanism can include a link arm operably coupling the pawl to the second driven gear.

In accordance with yet another aspect of the disclosure, the lost motion connection can be formed between the actuation feature and the link arm.

In accordance with yet another aspect of the disclosure, the link arm can be provided having a slot extending between a first drive end and a second drive end, and the actuation feature can be disposed in the slot for sliding translation between the first drive end and the second drive end.

In accordance with yet another aspect of the disclosure, the first driven gear is provided having a driven pinion gear fixed thereto. The driven pinion gear being in meshed engagement with the second driven gear.

In accordance with yet another aspect of the disclosure, the power actuator has a motor shaft with a drive gear fixed thereto. The drive gear being in meshed engagement with the first driven gear.

In accordance with yet another aspect of the disclosure, the drive gear and the first driven gear have a first gear ratio, the driven pinion gear and the second driven gear have a second gear ratio, and the worm gear and the second driven gear have a third gear ratio, with the second gear ratio being greater than the first gear ratio, and the third gear ratio being greater than the second gear ratio.

In accordance with yet another aspect of the disclosure, the motor shaft extends along a first axis, the first driven gear rotates about a second axis, and the second driven gear rotates about a third axis, the first axis extending transversely to the second axis and the third axis, thereby allowing a housing of the closure latch assembly to have a minimal width and reduced size.

In accordance with yet another aspect of the disclosure, the closure latch assembly further includes a release cable configured for manual actuation and is operably coupled to the pawl to move the pawl from its ratchet holding position to its ratchet releasing position.

It is an aspect of the present disclosure to provide a system for controlling a power release motor of a closure latch assembly. The closure latch assembly is operable in one of a normal operating mode and an emergency mode. The system includes a primary controller that is external to the closure latch assembly. The primary controller is configured to supply primary control signals to the power release motor during the normal operating mode in response to receiving a door open signal. The system also includes a secondary controller that is internal to the closure latch assembly. The secondary controller is configured to supply secondary control signals to the power release motor during the emergency mode in response to receiving the door open signal. The secondary controller is also configured not to supply secondary control signals to the power release motor during the normal operating mode.

It is another aspect of the disclosure to provide a closure latch assembly operable in one of a normal operating mode and an emergency mode. The closure latch assembly includes a power release motor configured to operate using primary control signals received from a primary controller external to the closure latch assembly during the normal operating mode of the closure latch assembly. In addition, the power release motor is configured to operate using secondary control signals received from a secondary controller internal to the closure latch assembly during the emergency operating mode of the closure latch assembly. The power release motor is configured to not operate using the secondary control signals received from a secondary controller during the normal operating mode.

It is yet another aspect of the disclosure to provide a latch controller of a closure latch assembly having power release motor. The latch controller is configured to not control the power release motor during a normal operating mode of the closure latch assembly. The latch controller is also configured to control the power release motor during an emergency operating mode of the closure latch assembly.

It is a further aspect of the disclosure to provide a door including a closure latch assembly having a power release motor. The door also includes a door node controller electrically coupled to the power release motor. In addition, the door includes a latch control electrically coupled to the power release motor. The door node controller is configured to control the power release motor in a normal operating mode of the closure latch assembly. The latch control is configured to control the power release motor in an emergency mode of the closure latch assembly.

In accordance with yet another aspect of the disclosure, a method of manufacturing a closure latch assembly includes: supporting a ratchet in a housing for movement between a striker capture position and a striker release position; supporting a pawl in the housing for movement between a ratchet holding position, whereat the ratchet is in the striker capture position, and a ratchet releasing position, whereat the ratchet is biased toward the striker release position, and biasing the pawl toward the striker release position; coupling an actuation feature to the pawl with a latch release mechanism and configuring the actuation feature having a lost motion connection with the latch release mechanism; and operably coupling a power actuator to the actuation feature with a gear train, with the gear train providing a torque multiplication between a drive gear fixed to a motor shaft of the power actuator and a driven gear of the gear train.

In accordance with yet another aspect, the method of manufacturing a closure latch assembly can include providing the gear train having a first driven gear in meshed engagement with the drive gear, a driven pinion gear fixed to the first driven gear, a second driven gear in meshed engagement with the driven pinion gear, and fixing the actuation feature to the second driven gear.

In accordance with yet another aspect, the method of manufacturing a closure latch assembly can include providing the latch release mechanism including a link arm having a slot extending between a first drive end and a second drive end and providing the actuation feature including a drive pin configured for sliding movement between the first drive end and the second drive end.

In accordance with yet another aspect, the method of manufacturing a closure latch assembly can include configuring the drive pin to move from the second drive end toward the first drive end upon energization of the power actuator and causing the pawl to initiate movement from the ratchet holding position toward the ratchet releasing position upon the drive pin engaging the first drive end.

In accordance with yet another aspect, the method of manufacturing a closure latch assembly can include configuring a release mechanism for manual actuation of a release cable to open the vehicle closure panel from inside and/or outside the motor vehicle.

In accordance with yet another aspect, the method of manufacturing a closure latch assembly can include configuring the release cable for actuation by an outside key cylinder.

In accordance with yet another aspect, the method of manufacturing a closure latch assembly can include configuring a reset device for manual actuation to engage the actuation feature and operably move the pawl from the ratchet releasing position to the ratchet holding position.

In accordance with yet another aspect, the method of manufacturing a closure latch assembly can include providing the reset device having an actuation feature configured to be accessible for manual actuation on a shut face of the closure panel of the motor vehicle.

In accordance with another aspect, there is disclosed a method of operating latch mechanism of a closure latch assembly. The method includes selectively energizing a power actuator to rotate a drive gear; driving a gear train with the drive gear; driving an actuation feature in response to the gear train being driven; and moving a pawl from a ratchet holding position to a ratchet releasing position via a lost motion connection with the actuation feature to allow a ratchet to move from a striker holding position to a striker release position.

In accordance with another aspect, the method of operating latch mechanism of a closure latch assembly can further include driving a first driven gear of the gear train with the drive gear and driving a second driven gear of the gear train with a driven pinion gear and causing the actuation feature to be driven in conjoint relation with the second driven gear.

In accordance with another aspect, the method of operating latch mechanism of a closure latch assembly can further include providing a torque multiplication between the drive gear and the second driven gear by providing the drive gear and the first driven gear with a first gear ratio, providing the driven pinion gear and the second driven gear with a second gear ratio, and providing the drive gear and the second driven gear with a third gear ratio, with the second gear ratio being greater than the first gear ratio, and the third gear ratio being greater than the second gear ratio.

It is yet a further aspect of the disclosure to provide a closure latch assembly including a ratchet and a pawl. The ratchet is moveable between a striker capture position and a striker release position. The pawl is moveable between a ratchet holding position, whereat the ratchet is maintained in the striker capture position, and a ratchet release position, whereat the ratchet is biased toward the striker release position. The closure latch assembly also includes a power actuator operably coupled to a drive train. The drive train includes at least three stages. Each stage has an input and an output to drive the input of the next stage. The input of the first stage is driven by the power actuator and the output of the last stage is coupled to the pawl to move the pawl from the ratchet holding position to the ratchet release position.

In accordance with another aspect, each stage receives a force at its input and increases the force at its output.

In accordance with another aspect, each stage has a pivot axis and the input and the output are configured to rotate about the pivot axis.

In accordance with another aspect, the pivot axis of each stage are different pivot axis.

In accordance with another aspect, at least one of the stages are provided between pairing of compound gears.

In accordance with another aspect, the first stage is provided between a worm driven by the power actuator and a worm wheel of one of the compound gears.

In accordance with another aspect, the last stage is provided as a crank mechanism.

In accordance with another aspect, the crank mechanism provides a variable force amplification between its input and it output.

In accordance with another aspect, the input of the crank mechanism is an actuation feature connected to one of the compound gears and a link connected between the actuation feature and the pawl.

In accordance with another aspect, the actuation feature is a pin configured for sliding within a lost motion slot provided in the link.

In accordance with another aspect, at least one of the stages has a variable force amplification ratio.

In accordance with another aspect, each stage is configured to reduce a speed of its input to a lower speed at it output.

It is another aspect of the disclosure to provide a closure latch assembly including a ratchet and a pawl. The ratchet is moveable between a striker capture position and a striker release position. The pawl is moveable between a ratchet holding position, whereat the ratchet is maintained in the striker capture position, and a ratchet release position, whereat the ratchet is biased toward said striker release position. The closure latch assembly also includes a power actuator operably coupled to a multiple stage drive train. One of the stages of the drive train is variable force amplification stage coupled to the pawl to move the pawl from the ratchet holding position to the ratchet release position.

It is yet a further aspect of the disclosure to provide a door system for a door. The door system includes a closure latch assembly and a door node for controlling the closure latch assembly. The door system also includes a first door release switch circuit electrically connected to the closure latch assembly. In addition, the door system includes a second door release switch circuit electrically connected to the door node. Electricity flowing in the first door release switch circuit does not flow in the second door release switch circuit.

It is a further aspect of the disclosure to provide a door system including a closure latch assembly having a backup energy source for use in an emergency condition. The door system also includes a door node electrically coupled to the closure latch assembly for controlling the closure latch assembly in a normal condition. The door node and the closure latch assembly are electrically isolated to prevent the flow of electricity from the backup energy source to the door node during the emergency condition.

It is yet another aspect of the disclosure to provide a door system for a door including a closure latch assembly for selectively securing the door and including a latch controller and having a backup energy source for use in an emergency condition. The door system also includes a door node electrically coupled to the closure latch assembly and having a door node controller configured to control the closure latch assembly in both a normal condition and in the emergency condition. The closure latch assembly is powered by a main power source in the normal condition and is configured to supply power to the door node from the backup energy source during the emergency condition.

In accordance with another aspect, the door system further includes a cinching actuator coupled to the super capacitor discharge switch of the door node for cinching the door closed. The door node controller is further configured to control the super capacitor discharge switch to condition the power from the backup energy source to the cinching actuator. The door node controller is also configured to control the cinching actuator using the power from the backup energy source during the emergency condition.

In accordance with a further aspect, there is provided a closure latch assembly, including a ratchet and a pawl, the ratchet being moveable between a striker capture position and a striker release position, the pawl being moveable between a ratchet holding position, whereat the ratchet is maintained in the striker capture position, and a ratchet release position, whereat the ratchet is biased toward the striker release position; and a power actuator operably coupled to a multistage power release chain having at least three stages of torque multiplication wherein each stage has an input and an output, wherein the application of force at an input causes a corresponding force at the output, the output from one stage drives the next stage in the release chain to release the pawl from the ratchet.

These and other aspects and areas of applicability will become apparent from the description provided herein. The description and specific examples in this summary are solely intended for purpose of illustration and are not intended to limit the scope of the present disclosure. The drawings that accompany the detailed description are described below.

BRIEF DESCRIPTION OF THE DRAWINGS

The drawings described herein are for illustrative purposes only of selected non-limiting embodiments and not all possible or anticipated implementations thereof, and are not intended to limit the scope of the present disclosure.

Corresponding reference numbers are used to indicate corresponding components throughout the several views associated with the above-identified drawings.

DETAILED DESCRIPTION OF EXAMPLE EMBODIMENTS

Figure 1:
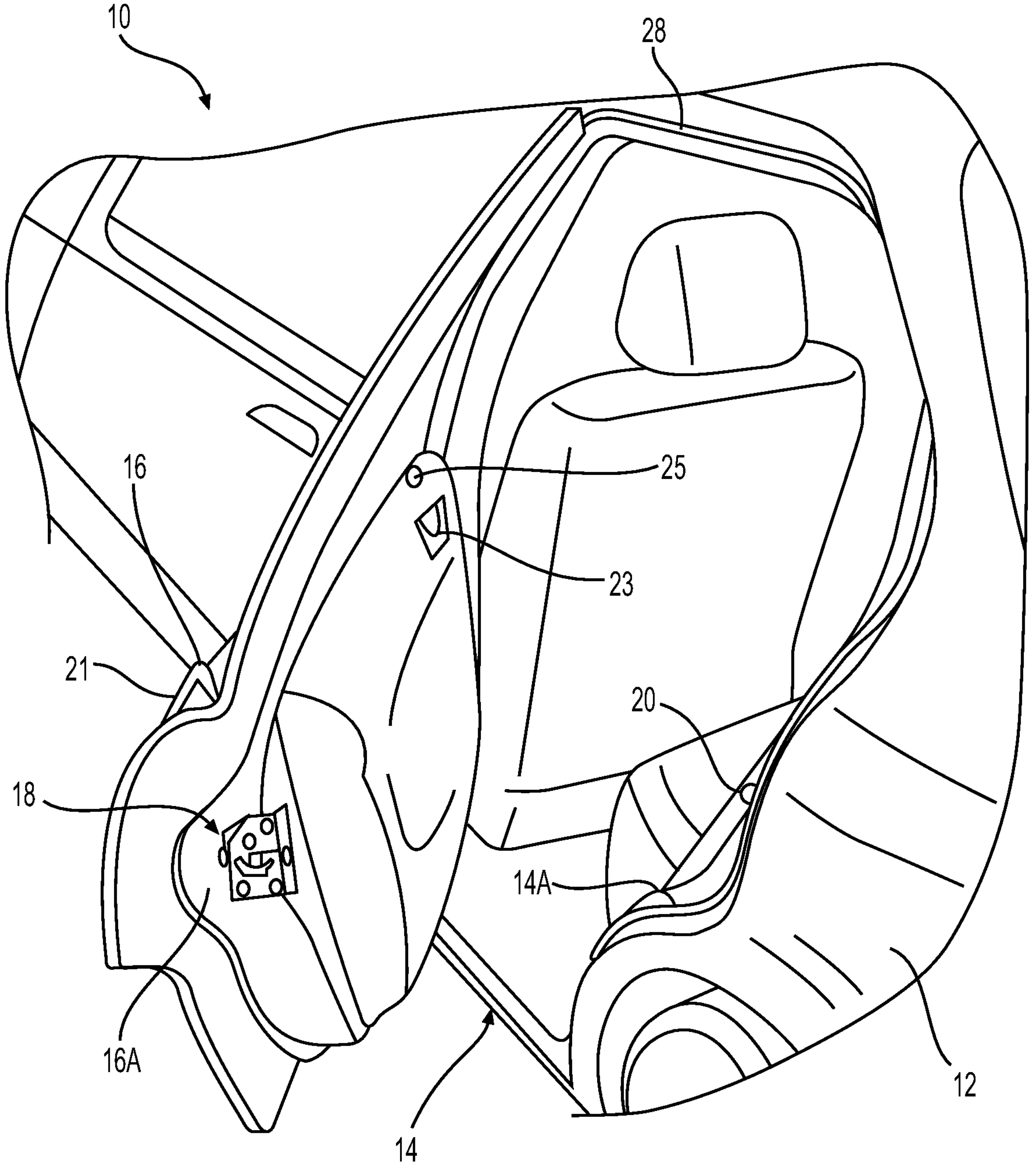
FIG. 1 is an isometric view of a motor vehicle equipped with a closure system including a closure latch assembly shown mounted to a vehicle door.

Example embodiments will now be described more fully with reference to the accompanying drawings. To this end, the example embodiments are provided so that this disclosure will be thorough, and will fully convey its intended scope to those who are skilled in the art. Accordingly, numerous specific details are set forth such as examples of specific components, devices, and methods, to provide a thorough understanding of embodiments of the present disclosure. However, it will be apparent to those skilled in the art that specific details need not be employed, that example embodiments may be embodied in many different forms, and that neither should be construed to limit the scope of the present disclosure. In some example embodiments, well-known processes, well-known device structures, and well-known technologies are not described in detail.

In the following detailed description, the expression “closure latch assembly” will be used to generally, as an illustrative example, indicate any power-operated latch device adapted for use with a vehicle closure panel to provide a “powered” (i.e. release, cinch, lock/unlock, etc.) feature. Additionally, the expression “closure panel” will be used to indicate any element moveable between an open position and at least one closed position, respectively opening and closing an access to an inner compartment of a motor vehicle and therefore includes, without limitations, decklids, tailgates, liftgates, bonnet lids, and sunroofs in addition to the sliding or pivoting side passenger doors of a motor vehicle to which the following description will make explicit reference, purely by way of example.

The terminology used herein is for the purpose of describing particular example embodiments only and is not intended to be limiting. As used herein, the singular forms “a,” “an,” and “the” may be intended to include the plural forms as well, unless the context clearly indicates otherwise. The terms “compromises,” “comprising,” “including,” and “having,” are inclusive and therefore specify the presence of stated features, integers, steps, operations, elements, and/or components, but do not preclude the presence or addition of one or more other features, integers, steps, operations, elements, and/or components, but do not preclude the presence or addition of one or more other features, integers, steps operations, elements, components, and/or groups thereof. The method steps, processes, and operations described herein are no to be construed as necessarily requiring their performance in the particular order discussed or illustrated, unless specifically identified as an order of performance. It is also to be understood that additional or alternative steps may be employed.

When an element or layer is referred to as being “on,” “engaged to,” “connected to,” or “coupled to” another element or layer, it may be directly on, engaged, connected or coupled to the other element or layer, or intervening elements or layers may be present. In contrast, when an element is referred to as being “directly on,” directly engaged to,” “directly connected to,” or “directly coupled to” another element or layer, there may be no intervening elements or layers present. Other words used to describe the relationship between elements should be interpreted in a like fashion (e.g., “between” versus “directly between,” “adjacent” versus “directly adjacent,” etc.). As used herein, the term “and/or” includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as “first,” “second,” and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as “inner,” “outer,” “beneath,” “below,” “lower,” “above,” “upper,” and the like, may be used herein for ease of description to describe one element or feature’s relationship to another element(s) or feature(s) as illustrated in the figures. Spatially relative terms may be intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated 90 degrees or at other orientations) and the spatially relative descriptors used herein interpreted accordingly.

In general, the present disclosure relates to latch assemblies of the type well-suited for use in many applications. More specifically, a closure latch assembly, door, latch controller, and system for a motor vehicle and methods of operating the system are disclosed herein. The closure latch assembly, door, latch controller, and system of this disclosure will be described in conjunction with one or more example embodiments. However, the specific example embodiments disclosed are merely provided to describe the inventive concepts, features, advantages and objectives will sufficient clarity to permit those skilled in this art to understand and practice the disclosure.

Referring initially to FIG. 1 of the drawings, a motor vehicle 10 is shown to include a vehicle body 12 defining an opening 14 to an interior passenger compartment. A vehicle closure panel, shown as a passenger swing door, also referred to as door 16, is pivotably mounted to body 12 for movement between an open position (shown), a partially-closed position, and a fully-closed position relative to opening 14. A closure latch assembly 18 is rigidly secured to door 16 adjacent to an edge portion 16A thereof and is releasably engageable with a striker 20 that is fixedly secured to a recessed edge portion 14A of opening 14. As will be detailed, closure latch assembly 18 is generally comprised of a power release assembly 24 and a latch mechanism 32 operable to engage striker 20 and releasably hold closure panel 16 in one of its partially-closed and fully-closed positions. An outside handle 21 and an inside handle 23 are provided for actuating (i.e. mechanically and/or electrically) closure latch assembly 18 to release striker 20 and permit subsequent movement of closure panel 16 to its open position. An optional lock knob 25 is shown which provides a visual indication of the locked state of closure latch assembly 18 and which may also be operable to mechanically change the locked state of closure latch assembly 18. A weather seal 28 is mounted on edge portion 14A of opening 14 in vehicle body 12 and is adapted to be resiliently compressed upon engagement with a mating sealing surface on closure panel 16 when closure panel 16 is held by closure latch assembly 18 in its fully-closed position so as to provide a sealed interface therebetween which is configured to prevent entry of rain and dirt into the passenger compartment while minimizing audible wind noise.

Figure 2:
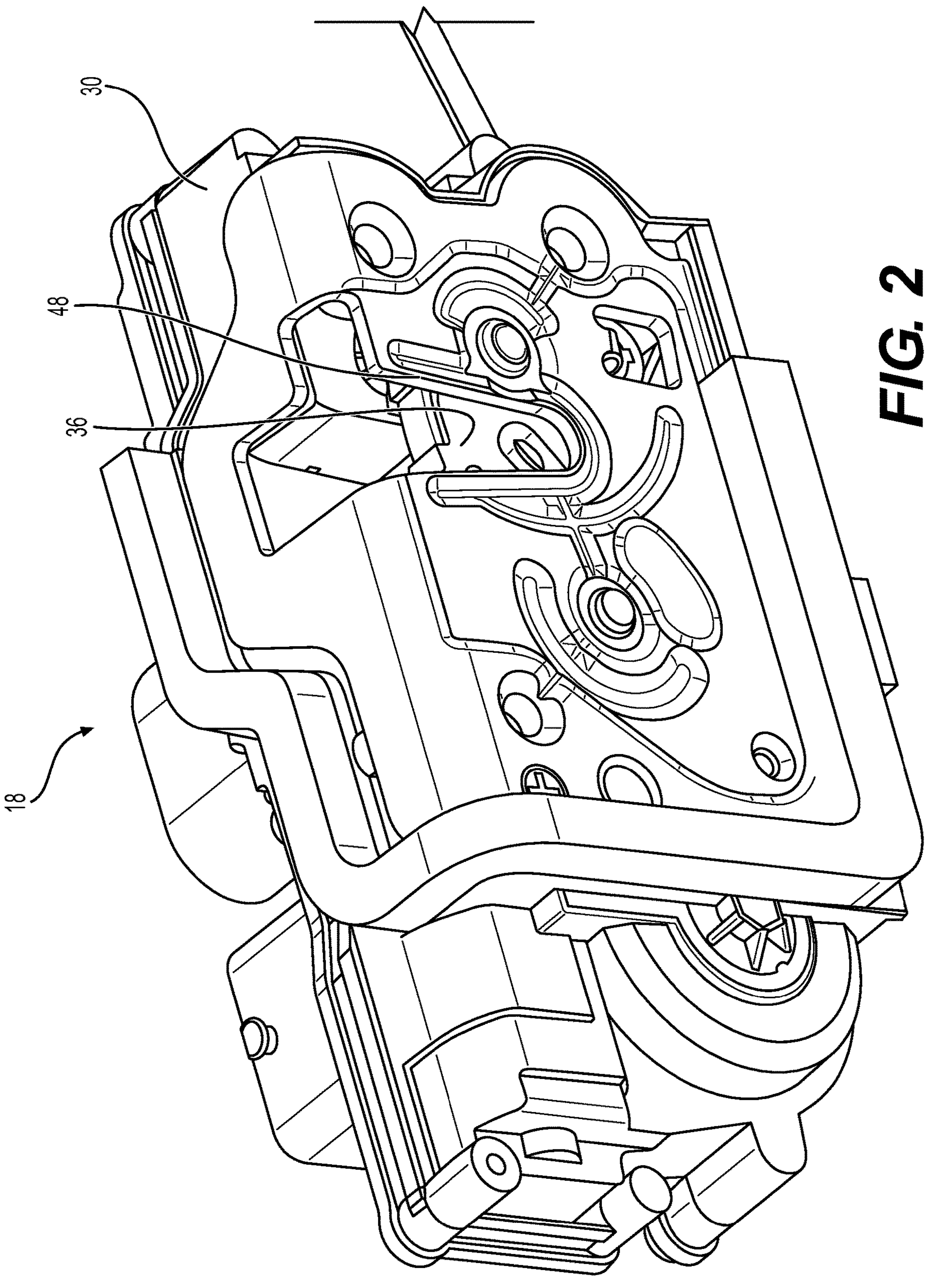
FIG. 2 is an isometric view of a closure latch assembly adapted for use in the closure system shown in FIG. 1 and which is configured to include a latch module and an actuator module constructed to embody the inventive concepts of the present disclosure.
Figure 5A:
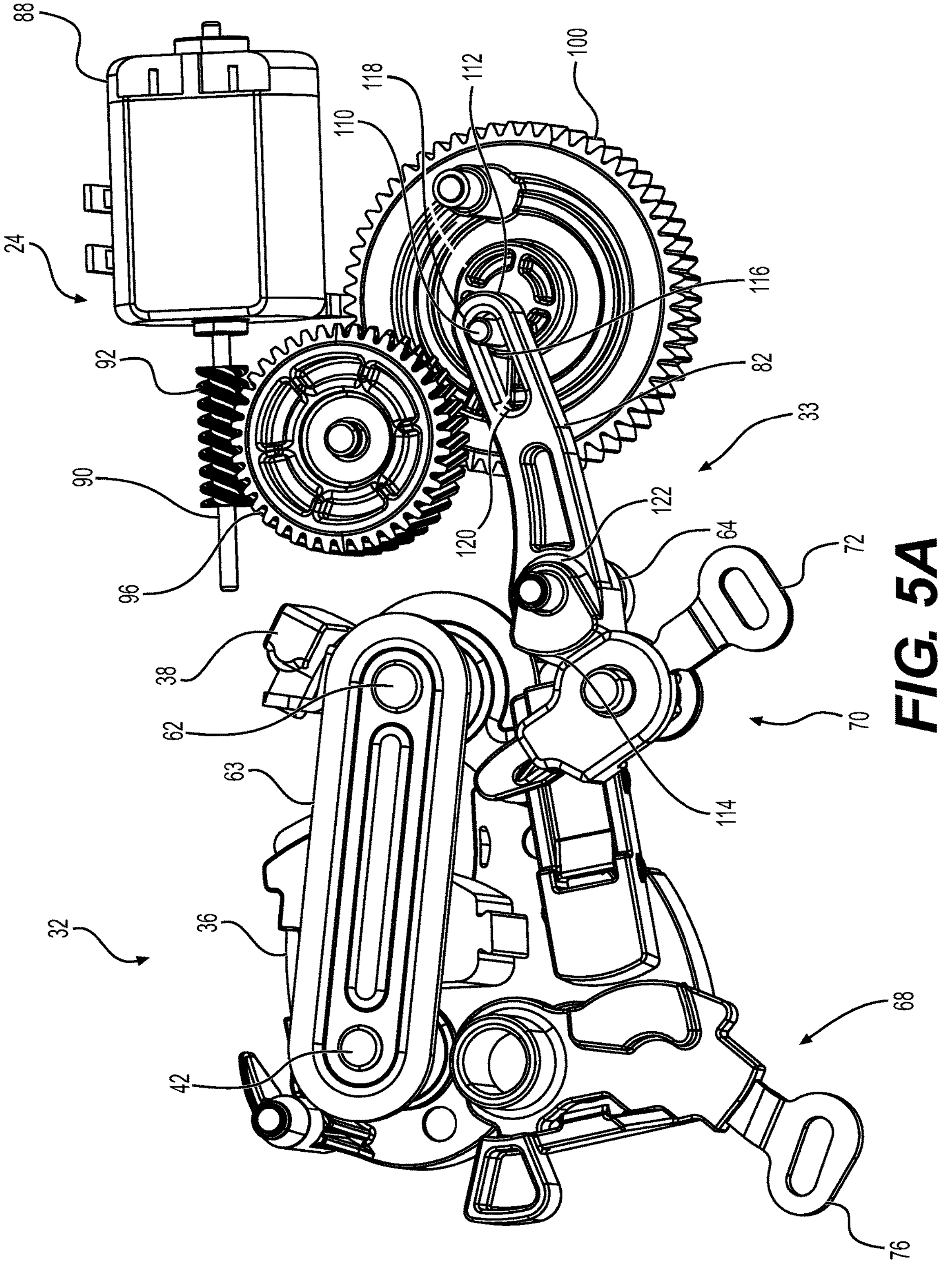
FIG. 5A is a rear side view of the closure latch assembly while in a fully latched position with a latch release mechanism and various components shown in a latched, rest position.

Closure latch assembly 18 generally includes a latch housing 30 within which the various components of latch mechanism 32, latch release mechanism 33 and power release assembly 24 are supported. Latch mechanism 32, as best seen in FIGS. 5A-8B, includes a ratchet 36, and a pawl 38, shown by way of example and without limitation as having a roller-type engagement device, referred to hereafter as roller 40. Examples of roller and associated guide structures (e.g. a carrier, arm(s), cage) are shown in US20190242163A1 entitled "Closure latch assembly with latch mechanism having roller pawl assembly" and in U.S. Pat. No. 10,745,947B2 entitled "Automotive latch including bearing to facilitate release effort", the entire contents of both are incorporated herein by reference. Ratchet 36 is operably supported on latch housing 30 by a ratchet pivot post 42 for movement between a released or "striker release" position (FIGS. 8A and 8B), a soft close or "secondary striker capture" position (not shown), and a hard close or "primary striker capture" position (FIGS. 5A and 5D). Ratchet 36 includes a striker guide channel 44 terminating in a striker retention cavity 46. As seen in FIG. 2, latch housing 30 includes a fishmouth slot 48 aligned to accept movement of striker 20 relative thereto upon movement of door 16 toward its closed positions. Ratchet 36 includes a primary latch notch 50, a secondary latch notch 52, and an edge surface 54. Arrow 58 (FIG. 5B) indicates a ratchet biasing member that is arranged to normally bias ratchet 36 toward its striker release position.

Figure 5B:
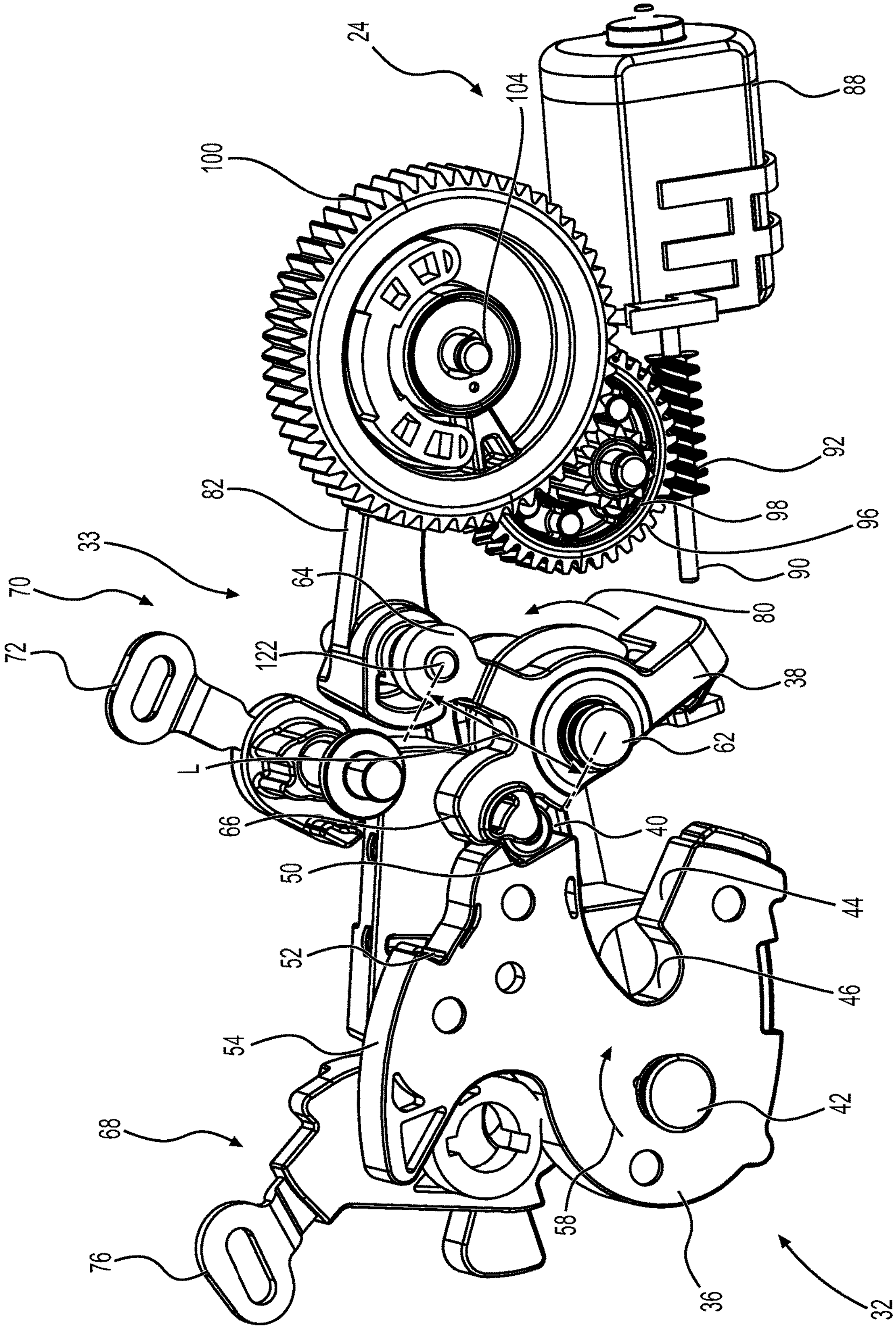
FIG. 5B is a front side view of FIG. 5A.

Pawl 38 is shown operatively mounted to latch housing 30 for pivotal movement about a pawl pivot post 62 and includes a first pawl leg segment 64 and a second pawl leg segment 66 defining a pawl engagement surface 68. The length of first pawl leg segment 64 is greater than the length of the second pawl leg segment 66. First pawl leg segment 64 and second pawl leg segment 66 may be formed as a unitary structure as illustrated and mounted about a common pivot point, that is at pawl pivot post 62. Roller-type engagement device 40 is secured to second pawl leg segment 66 of pawl 38, for rolling contact with a distal end 39 (see FIG. 6B) of second pawl leg segment 66. Pawl 38 is pivotable between a ratchet releasing position (FIG. 8B) and a ratchet holding position (FIG. 5B). Pawl 38 is normally biased toward its ratchet holding position by a pawl biasing member, indicated by arrow 80 (FIG. 5B). Pawl pivot post 62 and ratchet pivot post 42, as shown in FIGS. 3A, 5A, 6A, 7A, and 8A, can be supported within housing 30 by a support plate 63. Pawl 38 is shown as illustratively configured as bellcrank adapted to receive a force input at first pawl leg segment 64 from previous torque multiplication stages, and further provide torque multiplication via connection with shorter second pawl leg segment 66 having a ratchet engaging surface (for direct contact with the ratchet 36 or for interaction with roller 40) at distal end 39. Pawl 38 configured as part of a bell crank assembly provides for further torque multiplication of the release force received from the link arm 82. Pawl 38 configured as a bell crank also allows for changes in motion through an angle (for example less than 90 degrees, and shown in FIG. 6B as approximately 45 degrees as but one illustrative example of a provided change in angle) between the first pawl leg segment 64 of pawl 38 and second pawl leg segment 66 of pawl 38 providing further packaging advantages of the latch assembly 18, such as for providing a shorter link arm 82, positioning of the gear train in line with the component pivot points 42, 92, 98, 104 providing a packaging of latch 18 that is elongated and narrow. Pawl 38 is therefore actuated by a multistage power release chain actuated by the motor 88, the multistage power release chain having least three stages of torque multiplication or speed reduction, where each stage has an input and an output, where the application of force at an input of each stage causes a corresponding force at the output the respective stage, the output from one stage driving the next stage in the release chain to release the pawl from the ratchet. Configurations described herein provide for a compact latch assembly attributed at least to reduction in the size of the motor 88 due to the multiple gear stages and torque reduction increasing the motor's 88 output force as well as stage interconnectcions through use of crank mechanisms, as opposed to the use of levers requiring additionally mounting pivot points to a frame plate of the latch assembly 18 for a lever chain transferring forces to one another. For example link arm 82 is connected directly to the pawl 38 and to the geartrain as opposed to directly pivotally connected to a frame plate or housing of the latch assembly 18. For example, pawl assembly 18 configured as a bellcrank commonizes a mounting point of arms 64, 66. Pawl 38 may also be provided as a single pawl configuration due to the high release force it receives from the multi-stage power release chain, as compared to more complex and space consuming pawl configurations having multiple pawls and multiple mounting pivot points, such as a double pawl assembly, or a double pawl double ratchet assembly.

Figure 8A:
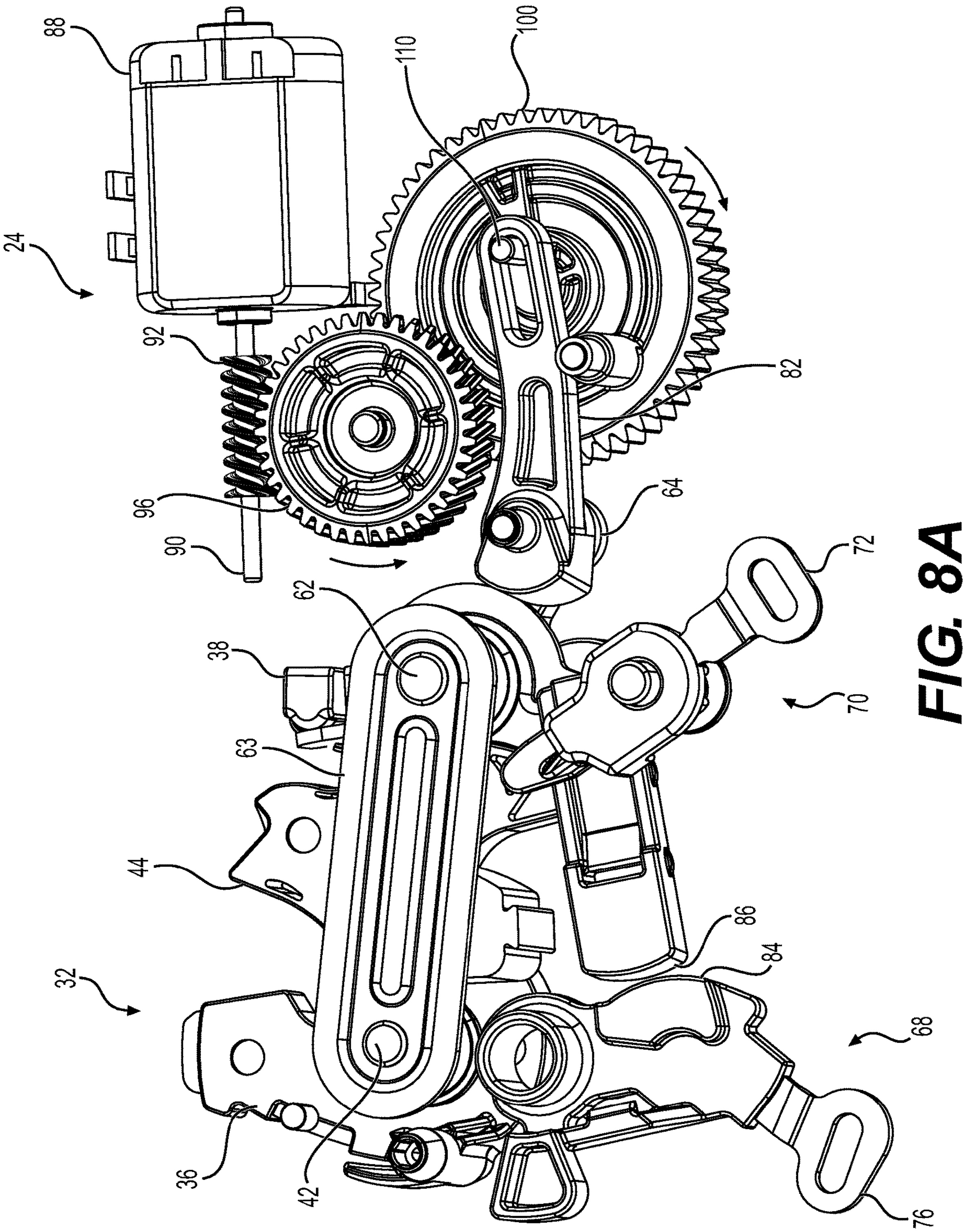
FIG. 8A is a rear side view of the closure latch assembly similar to FIG. 7A illustrating the latch release mechanism and the various components in a fully unlatched position.
Figure 8B:
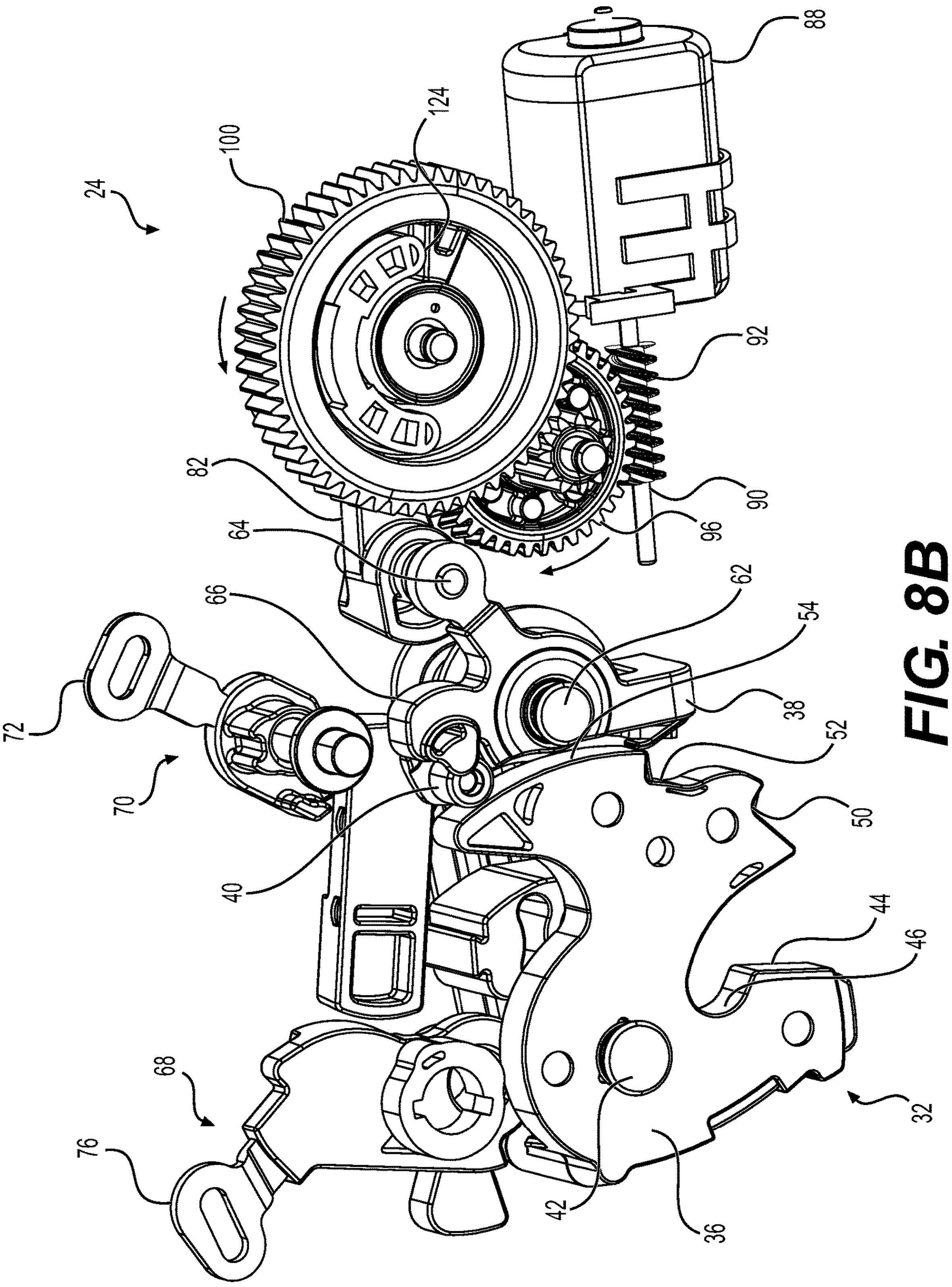
FIG. 8B is a front side view of FIG. 8A.

As shown in FIG. 8B, pawl 38 is held in its ratchet releasing position when ratchet 36 is located in its striker release position due to engagement of roller 40 with edge surface 54 on ratchet 36, whereby a released operating state for latch mechanism 32 is established. FIG. 5B illustrates pawl 38 located in its ratchet holding position with roller 40 in engagement with primary latch notch 50 on ratchet 36 such that pawl 38 holds ratchet 36 in its primary striker capture position so as to hold door 16 in its fully-closed position and establish a primary latched operating state for latch mechanism 32.

Latch release mechanism 33 is shown connected to first pawl leg segment 64 of pawl 38. Latch release mechanism 33 functions to cause movement of pawl 38 from its ratchet holding position into its ratchet releasing position when it is desired to shift latch mechanism 32 into its released operating state. An inside latch release mechanism 68 operably couples inside handle 23 to latch release mechanism 33 to permit manual release of latch mechanism 32 from inside the passenger compartment of vehicle 10. Likewise, an outside latch release mechanism 70 operably couples outside handle 21 to latch release mechanism 33 to permit manual release of latch mechanism 32 from outside of vehicle 10. Outside latch release mechanism 70 is an example of a manual release latch mechanism and may also be operated as an inside latch release mechanism 70 operably coupled to an inside handle.

Outside latch release mechanism 70 includes an outside latch release lever, referred to hereafter as outside latch lever 72, an outside link lever 74, an outside link biasing member, shown as an outside link spring member 73, and an outside lever biasing member, shown as an outside lever spring member 75. In a rest position, outside link biasing member 73 imparts a bias on outside link lever 74 in a direction opposite arrow D1 (FIG. 3) toward outside latch lever 72 and outside lever biasing member 75 biases outside latch lever 72 in a counterclockwise direction, as viewed in FIGS. 3-3B.

Inside latch release mechanism 68 includes an inside latch release lever, referred to hereafter as inside latch lever 76, and an inside lever biasing member, shown as an inside lever spring member 78. In a rest position, inside lever biasing member 78 imparts a bias on inside latch lever 76 in a direction opposite arrow D2 to bias inside latch lever 76 in a clockwise direction, as viewed in FIG. 3.

During use, outside latch lever 72 is moved along a direction D3 (FIG. 3), such as via being actuated by outside handle 21 via a rod or Bowden cable 21', by way of example and without limitation. As outside latch lever 72 is moved against the bias of outside lever biasing member 75, outside latch lever 72 rotates clockwise in the direction indicated by arrow R1, which in turns, causes outside link lever 74 to translate in the direction indicated by arrow D1 against the bias imparted by outside link biasing member 73. As outside link lever 74 is translated in the direction D1, the outside link lever 74 acts pawl 38, such as via a link arm 82 of latch release mechanism 33, by way of example and without limitation, to cause pawl 38 to rotate in the direction indicated by R2 (FIG. 3), thereby causing pawl 38 to move from the ratchet holding position to the ratchet releasing position.

In similar fashion, inside latch lever 76 is moved along a direction D2 (FIG. 3), such as via being actuated by inside handle 23 via a rod or Bowden cable 23', by way of example and without limitation. As inside latch lever 76 is moved against the bias of inside lever biasing member 78, inside latch lever 76 rotates counterclockwise in the direction indicated by arrow R3, which brings a drive surface 84 of inside latch lever 76 into forcible engagement with a lug or driven surface 86 of outside link lever 74, thereby causing outside link lever 74 to translate in the direction indicated by arrow D1 against the bias imparted by outside link biasing member 73, thereby causing pawl 38 to move from the ratchet holding position to the ratchet releasing position, as discussed above for actuation of outside latch lever 72.

In addition to the manual actuation of latch mechanism 32 discussed above for outside and inside latch levers 72, 76, power release assembly 24 provides powered actuation of latch mechanism 32 via selective energization of a power release actuator, such as an electrically actuatable motor, referred to as motor 88, of power release assembly 24. Motor 88, upon being energized, causes latch release mechanism 33 to move pawl 38 from its ratchet holding position into its ratchet releasing position.

In this non-limiting configuration, motor 88 interacts with latch mechanism 32 to provide a "power release" function by actuating latch release mechanism 33 to cause pawl 38 to move from its ratchet holding position to its ratchet releasing position. However, motor 88 could additionally, or alternatively, be configured to provide one or more other "powered" functions provided by latch mechanism 32, such as, for example, power cinch or power lock/unlock.

Motor 88 has a motor shaft 90 extending along a first axis, also referred to as motor axis A1, and driving a drive gear, shown as a worm gear 92 fixed to the motor shaft 90, for rotation about the motor axis A1. Worm gear 92 is configured in operable driving engagement with a gear train 94 that provides a gear reduction that increases the output torque, thereby resulting in a torque multiplication of power release assembly 24. As a result of the torque multiplication provided by the stages of the power release chain described, the size and power output of motor 88 can be minimized, thus, reducing the size of closure latch assembly 18.

Figure 3:
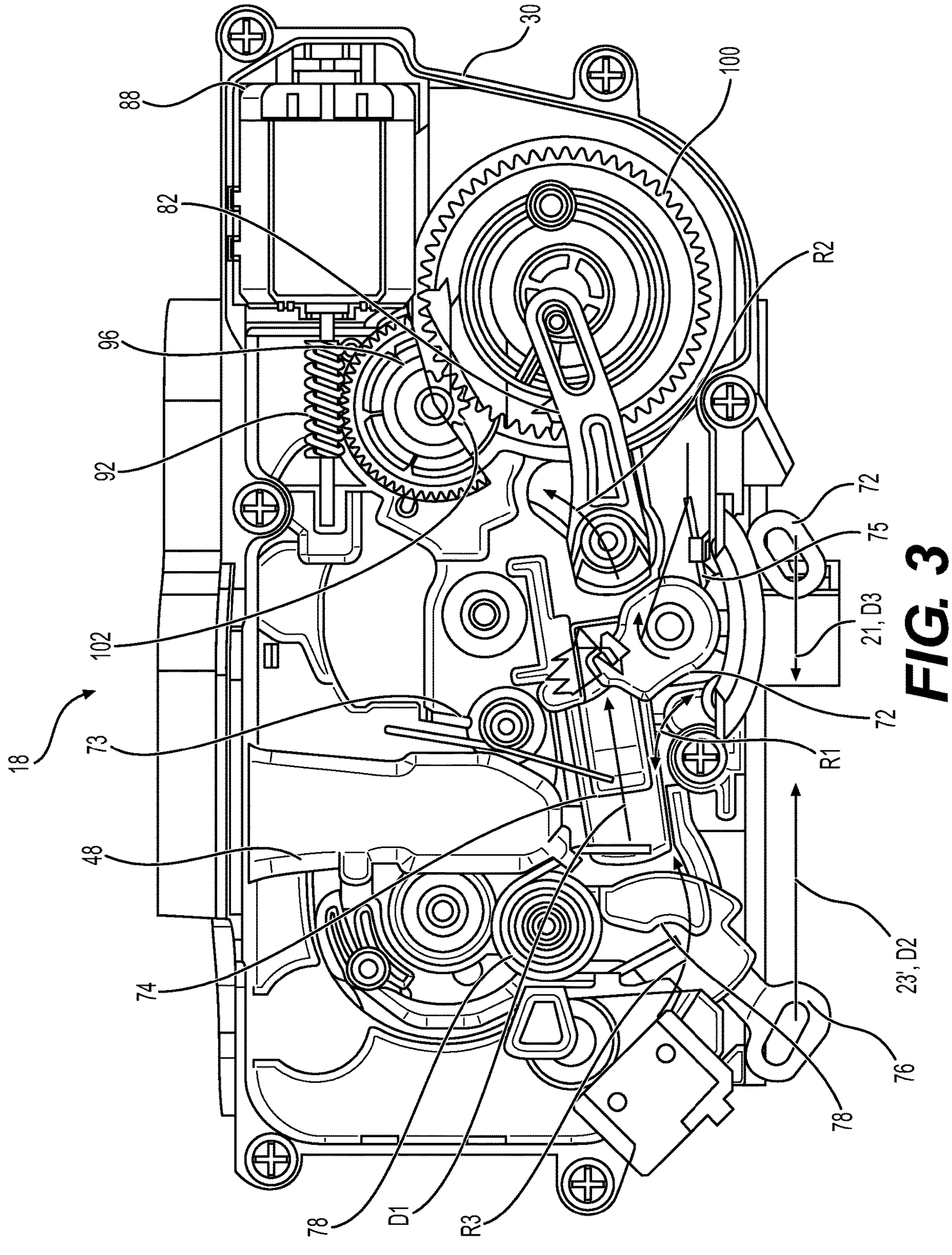
FIG. 3 is a rear side view of the closure latch assembly shown in FIG. 2 with a cover removed for viewing of internal latch components.

A first driven gear 96 of gear train 94 is arranged in constant meshed engagement with worm gear 92 for rotation about a second axis, also referred to as first driven gear axis A2, extending in transverse relation with first axis A1. Accordingly, first driven gear 96 is support by an axle, also referred to as first pin 98, which extends along second axis A2. First driven gear 96 is configured in operable driving relation with a second driven gear 100 via a driven pinion gear 102 (FIG. 3). Pinion gear 102 is fixed in concentric relation with first driven gear 96 for conjoint rotation therewith about second axis A2. Pinion gear 102 is arranged in constant meshed engagement with second driven gear 100 to drive second driven gear 100 for rotation about a third axis, also referred to as second driven gear axis A3. Accordingly, second driven gear 100 is support by an axle, also referred to as second pin 104, which extends along third axis A3. First pin 98 and second pin 104 are parallel with one another, and thus, so too are second and third axes A2, A3, which extend in transverse relation to motor axis A1. As such, motor 88 extends along a plane of latch housing 30, thereby providing closure latch assembly 18 with a narrow profile looking along the plane of latch housing 30.

Figure 4:
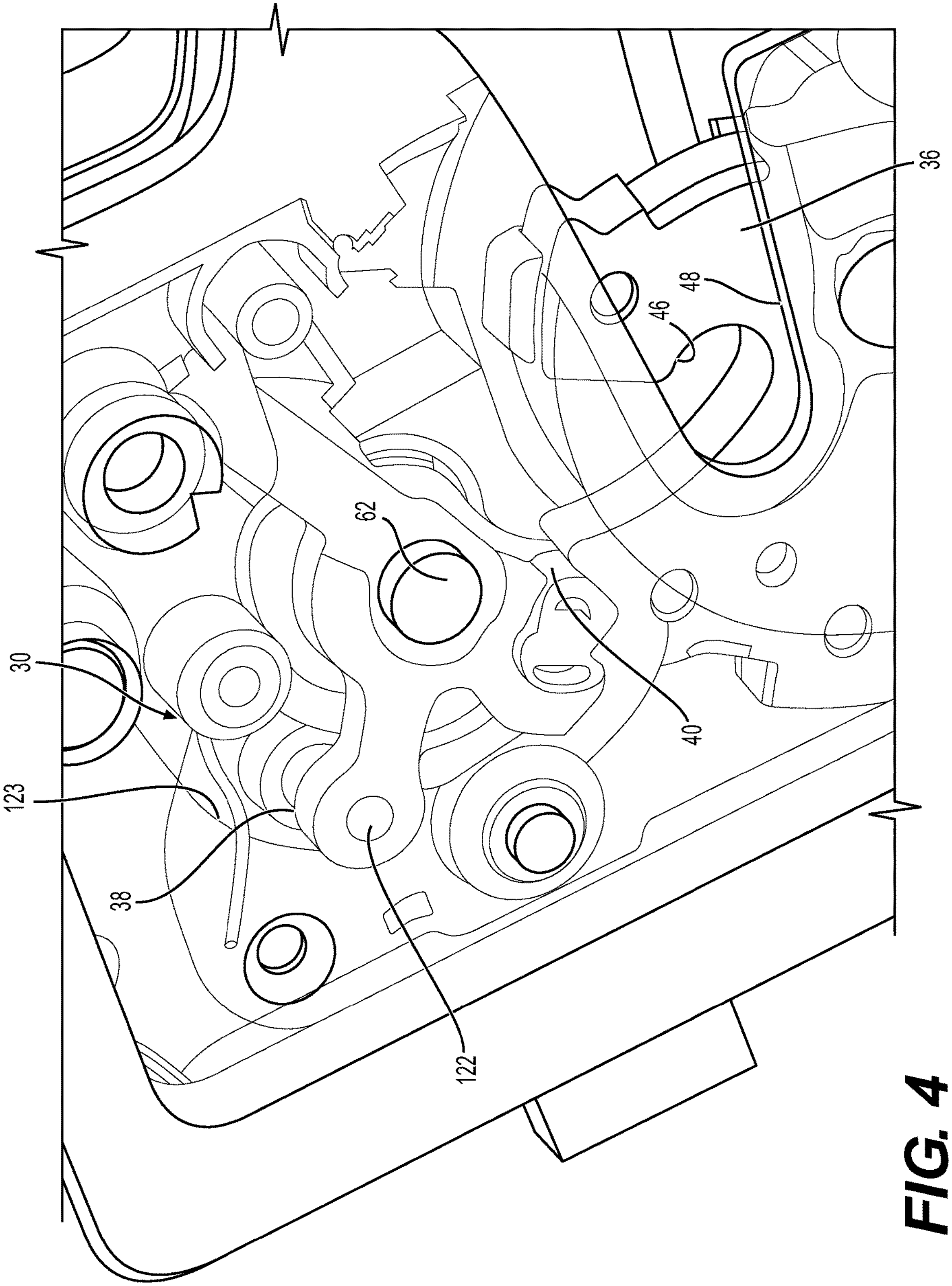
FIG. 4 is an enlarged transparent view of a portion of the closure latch assembly shown in FIG. 2 illustrating a slot within a housing of the closure latch assembly for movement of a pin therein.
Figure 4A:
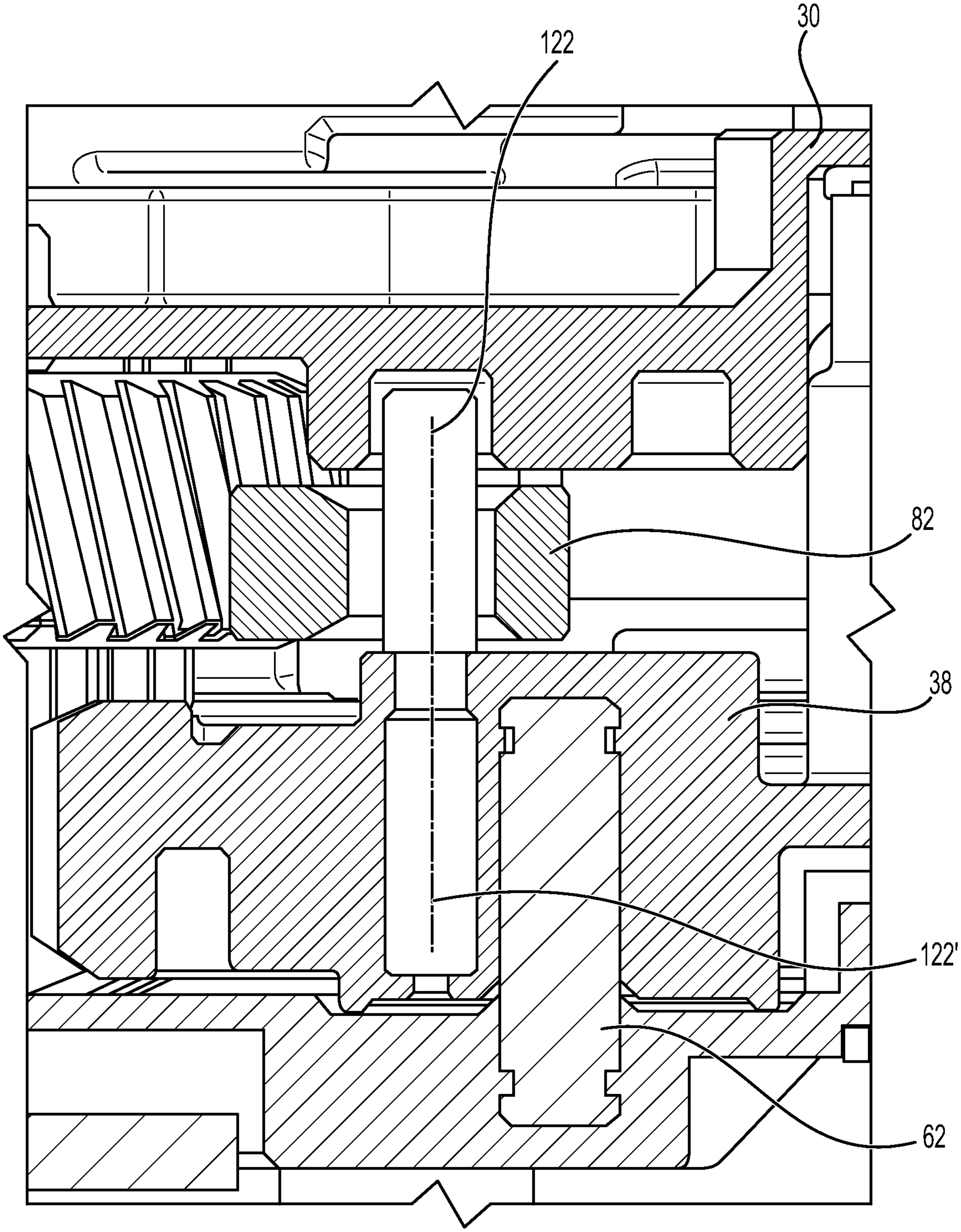
FIG. 4A is a cross-sectional view taken through the slot of FIG. 4.

The torque multiplication can be provided by controlling the gear ratios between worm gear 92 and first driven gear 96 and between driven pinion gear 102 and second driven gear 100, and between second drive gear 100 and drive pin 110 as desired. Illustratively gears 92, 96, 102, 100 form a gear train having at least three torque multiplication stages and an output shown illustratively as drive pin 110 coupled to the pawl 38. In a non-limiting example, as illustrated in FIG. 4, worm gear 92 has 2 teeth, first driven gear 96 has 40 teeth, driven pinion gear 102 has 11 teeth, and second driven gear 100 has 55 teeth. As such, the resulting ratio between worm gear 92 and first driven gear 96 is 1:20 and between driven pinion gear 102 and second driven gear 100 is 1:5. Accordingly, the total ratio is 1:100, thereby significantly multiplying the output torque of motor 88.

Figure 3A:
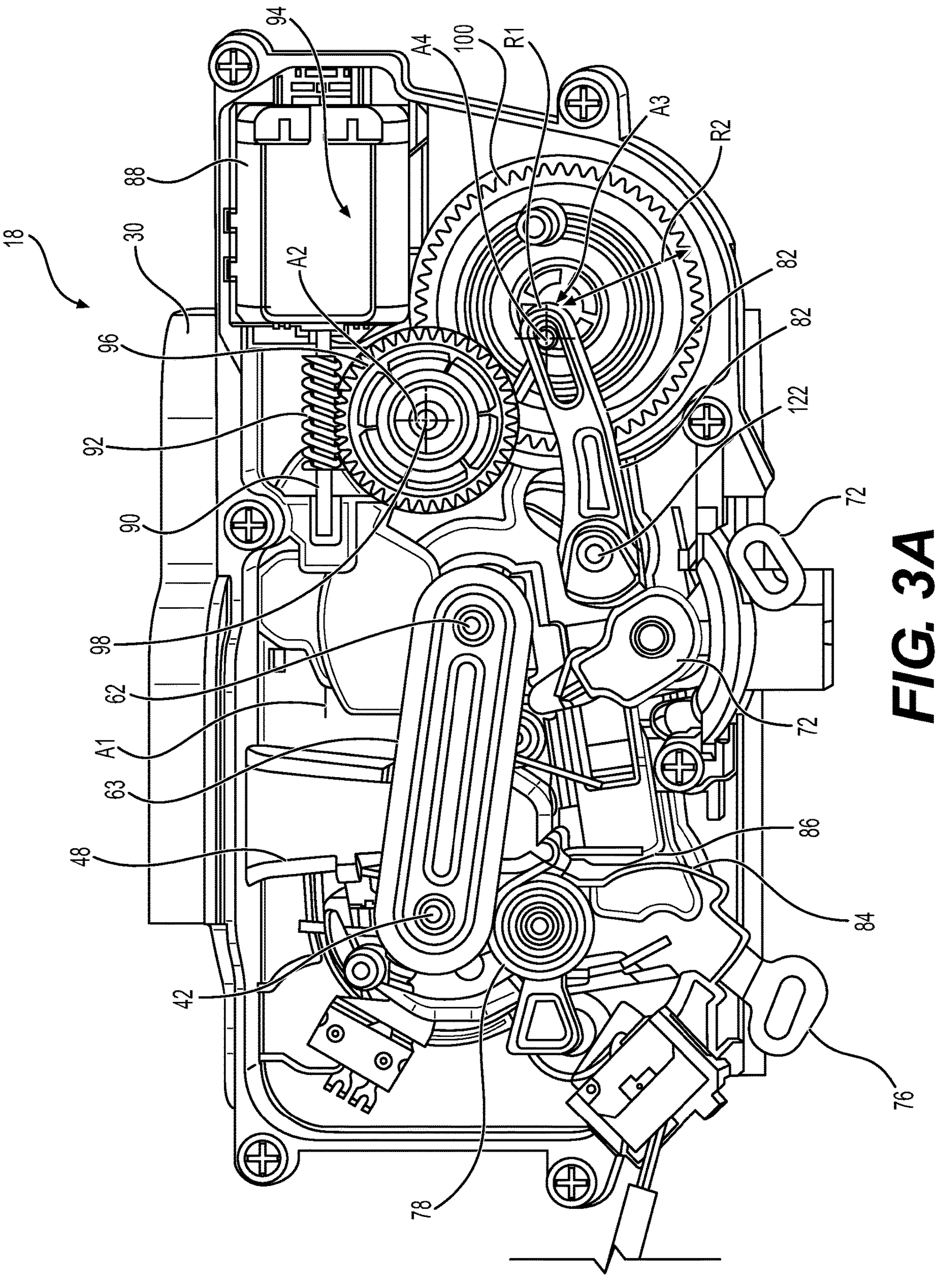
FIG. 3A is a slightly enlarged view of the closure latch assembly as shown in FIG. 3.
Figure 3B:
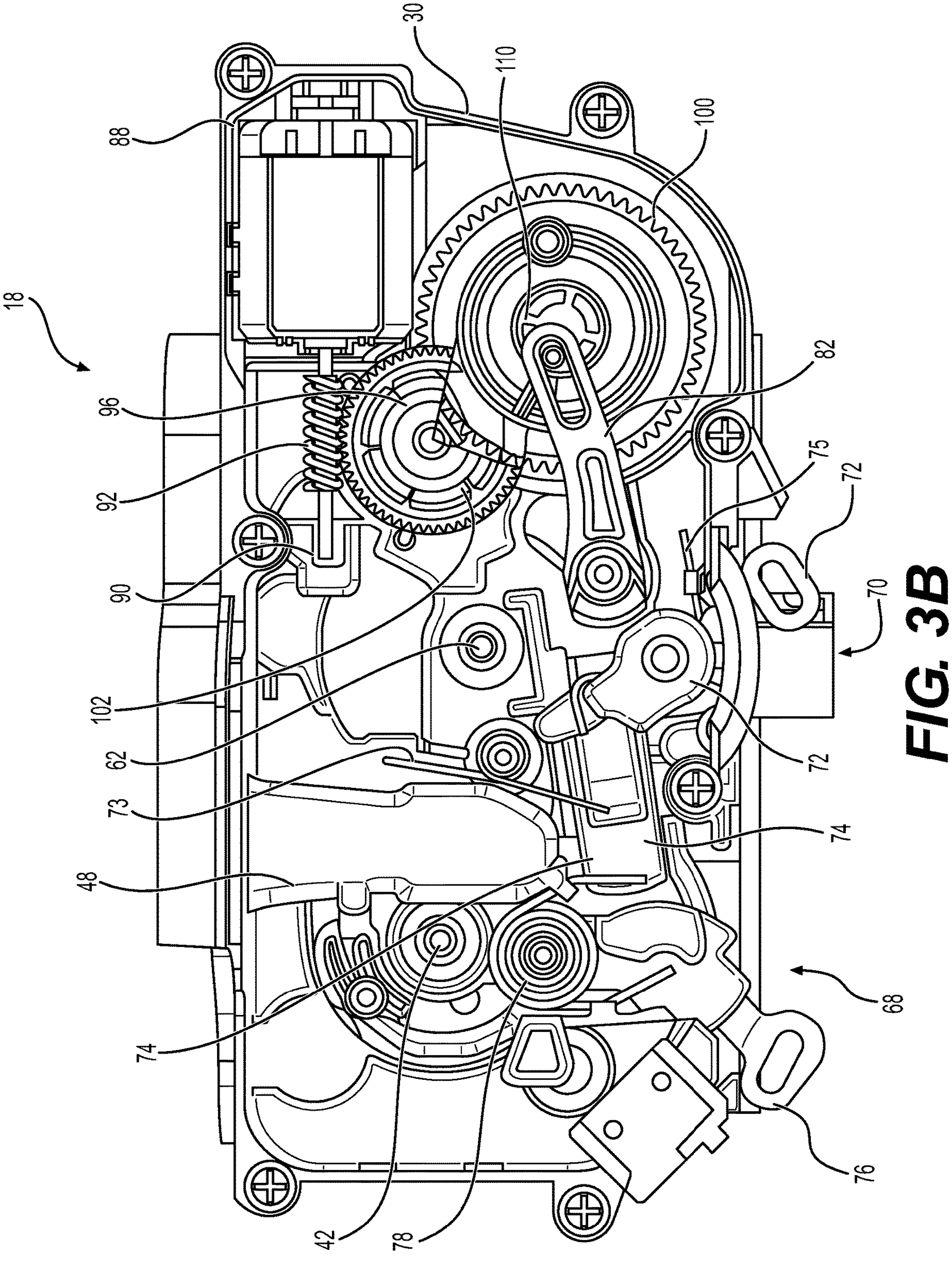
FIG. 3B is a view similar to FIG. 3A with a pin support plate removed for viewing of latch components there beneath.
Figure 9A:
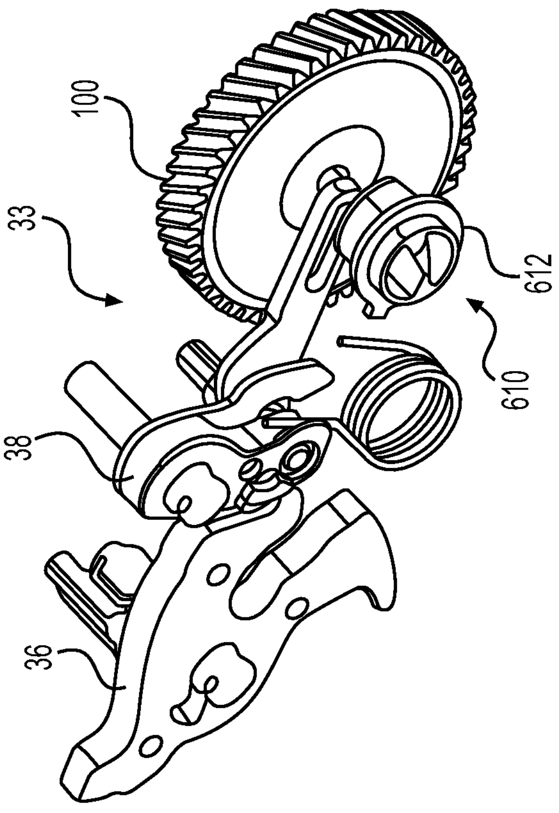
FIG. 9A is a perspective view illustrating a manually actuatable reset device configured in operable communication with the latch module of FIGS. 21A and 21B for returning a pawl from a ratchet releasing position to a ratchet holding position to allow a vehicle closure panel to be moved from an open position to a closed position via selective manual actuation of a manual actuation feature.
Figure 9B:
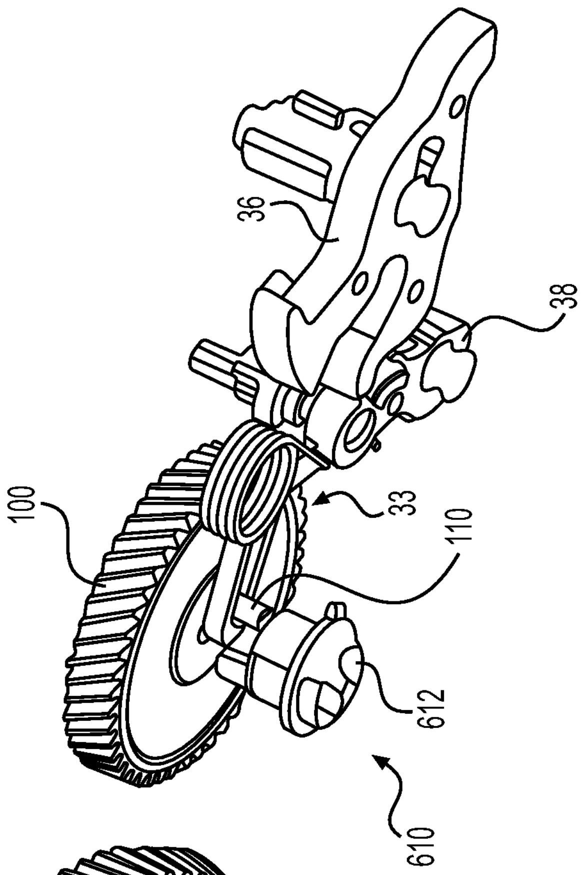
FIG. 9B is another perspective view of the manually actuatable reset device of FIG. 9A.

An actuation feature, also referred to as drive pin 110, extends laterally outwardly from a generally planar side face of second driven gear 100 along a fourth axis, also referred to as drive pin axis A4. Drive pin axis A4 is parallel with, and shown as being in close, adjacent relation with second driven gear axis A3. As discussed further, the close proximity of drive pin axis A4 to second driven gear axis A3 facilitates smooth, reliable operation of closure latch assembly 18. Drive pin 110 is configured in a non-limiting arrangement as an elongate drive pin which is oriented in relation to a link arm 82, wherein link arm 82 operably connects pawl 38 with drive pin 110. Link arm 82 and drive pin 110 is illustratively configured as a crank mechanism providing a variable torque multiplication stage between the output pin 110 and the pawl 38, and more illustratively the first leg segment 64 as will be described in more details herein below. Crank mechanism as actuated by the output of the geartrain (e.g. by drive pin 110), provides for an initial infinite gear ratio and a high torque output for moving the pawl 38 from its initial ratchet holding position, whereat the release efforts are greatest. Crank mechanism provides for initial high release forces transferred to the pawl 38 for overcoming high release forces due to seal load for example, which may be in the five kilo-newton range, followed by a reduction in torque and corresponding increase in release movement of the pawl 38 for rapidly thereafter moving the pawl to a released position. Crank mechanisms 82, 38 also provides packaging flexibility by providing a bridging interconnection configuration between the geartrain output provided on one side of the latch assembly 18 and the pawl 38 and ratchet 36 provided adjacent to the geartrain and on another side of the latch assembly 18, as well as may provide space savings (e.g. through elimination of extra levers, pivot connections of the lever, swing paths of levers) which may be occupied in turn by the additional gear train size. The close proximity of drive pin axis A4 to second driven gear axis A3 is illustrated for example in FIG. 3A showing a smaller radius r1 of the drive pin axis A4 away from the drive gear axis A3 compared to the radius r2 of the outer circumference of the second driven gear 100. The radius r1 may be, for example, less than 50 percent of the radius r2, and in another non-limiting example, less than 25 percent of the radius R2. The close proximity of drive pin axis A4 to second driven gear axis A3 may also further limit the range of motion or swing of link arm 82, thus, allowing for other latch components to occupy the space which would otherwise not be available in a configuration where the drive pin 110 is positioned closer to the outer circumference of the second driven gear 100 and further away from the second driven gear axis A3 causing a larger swing of the link arm 82, or may allow the latch housing 30 to be reduced in size as a result of not having to accommodate for such a larger swing or motion of the link arm 82 during power release. Still further, the close proximity of the drive pin axis A4 to second driven gear axis A3, or in other words the closer radial position or distance of the drive pin axis A4 to second driven gear axis A3, than to the outer circumference of the second driven gear 100 reduces the moment arm developed between the drive pin 110 and the second driven gear axis A3 during the rotation of the second driven gear 100, and thus, motor 88 does not need to overcome the larger increase in moment arm due to a farther proximity of drive pin axis A4 from the second driven gear axis A3 as would be where the drive pin 110 is positioned closer to the outer circumference of the second driven gear 100 and further away from the second driven gear axis A3. Specifically, as shown in FIGS. 5A-8A, rotation of second driven gear 100 in a clockwise direction CW from a home position to a released position via energization of electric motor 88 in response to a power release command causes drive pin 110 to move link arm 82 and drive pawl 38 from its ratchet holding position to its ratchet releasing position. Following a power release command, electric motor 88 is commanded to rotate second driven gear 100 in the opposite counterclockwise direction CCW back to its home position so as to reset latch release mechanism 33 to subsequently allow pawl 38 to move back into its ratchet holding position. In accordance with a further aspect of the disclosure, a mechanically actuatable reset device 610, as an example of an override device in addition to the power release motorized based power release chain, (FIG. 9A, looking from an opposite direction from FIGS. 5A-8A) can be provided to facilitate rotating second driven gear 100 back to its home position so as to reset latch release mechanism 33 of latch mechanism 32 to allow pawl 38 to move back into its ratchet holding position, should, for any reason, pawl 38 be stuck in the ratchet releasing position. Reset device 610 is supported for mechanically actuated rotation via a support housing, such as latch housing 30. Reset device 610 has an actuation feature 612, such as a knob, lever, handle, or the like, that can be manually grasped by hand and/or accessed via a tool to affect mechanical rotation of the reset device 610, when desired. Actuation feature 612 can be made accessible along the edge portion, also referred to as shut face 16A, of closure panel 16, by way of example and without limitation. Accordingly, when the closure panel 16 is moved to an open position, and if the pawl 38 is prevented from returning from the ratchet release position to the ratchet holding position, whereupon ratchet 36 could be prevented from being maintained in a striker capture position, thereby preventing vehicle closure panel 16 from being closed, such as may occur if motor 88 become inoperable for any reason, by way of example and without limitation, the actuation feature 612 may be mechanically actuated by hand and/or tool via ready access to the shut face 16A to return pawl 38 to the ratchet holding position, thereby allowing closure panel 16 to be moved from the open position to the closed and latched position.

Figure 4B:
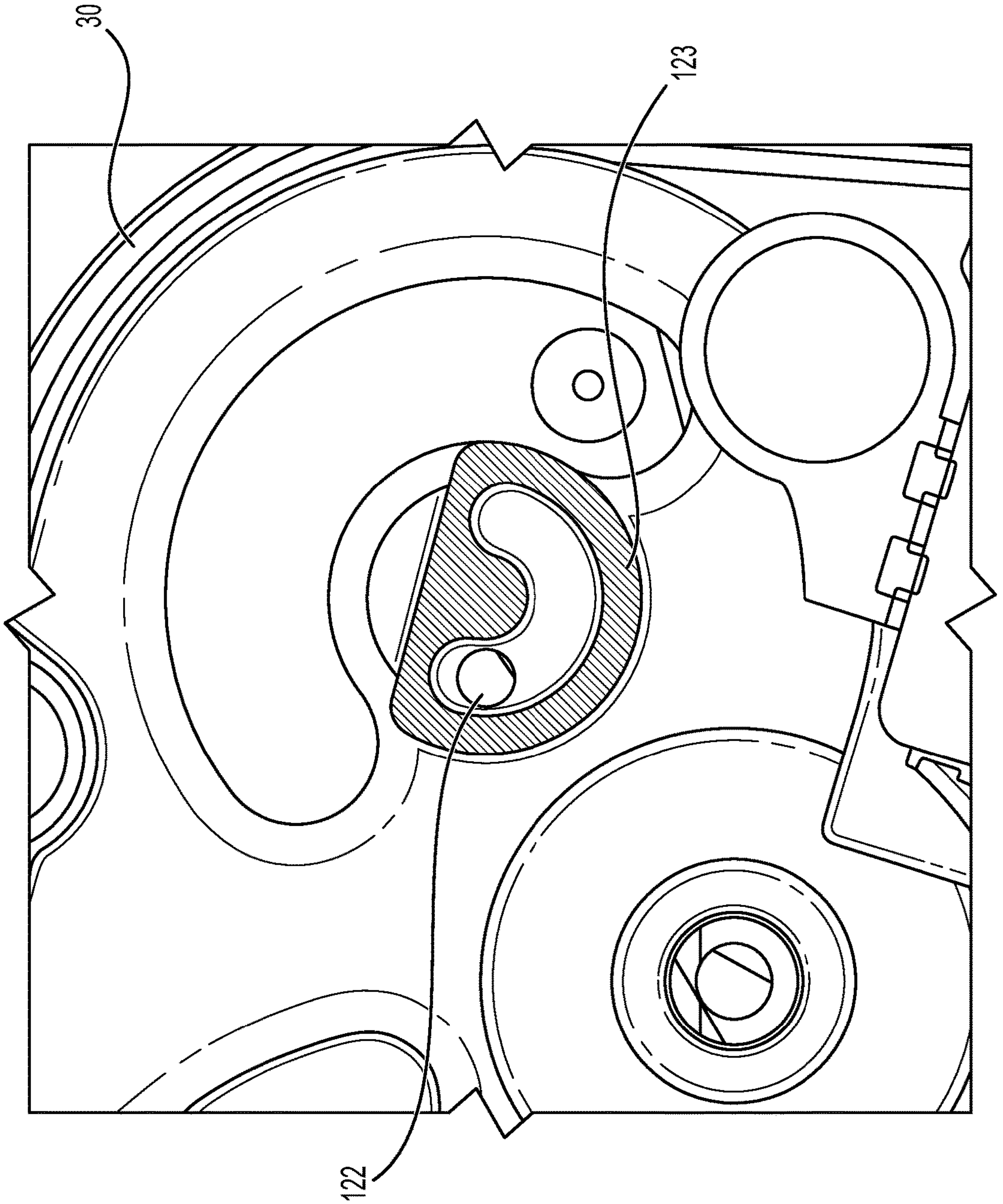
FIG. 4B is a plan view of the slot of FIG. 4.

Link arm 82 is shown as directly coupling drive pin 110 to first pawl leg segment 64 of pawl 38 to form a lost motion connection therebetween; however, it is contemplated that by operably connecting pawl 38 with drive pin 110 that addition levers or mechanisms could be incorporated therebetween. One example of a latch provided with a link arm is shown in WO2021062541A1 entitled "Closure latch assembly", the entire contents of which is incorporated herein by reference. Link arm 82 is elongate and extends lengthwise between opposite first and second ends 112, 114. To facilitate forming the lost motion connection between second driven gear 100 and pawl 38, link arm 82 has an elongate slot 116 extending lengthwise between opposite first and second drive ends 118, 120 intermediate the opposite first end 112 and second end 114 of link arm 82. Elongate slot 116 is illustratively shown as a linearly extending elongated slot, or a linear slot, and not a curved slot. Second driven gear 100 is operably coupled to link arm 82 proximate first end 112 of link arm 82 via drive pin 110 being disposed in slot 116 for sliding movement therealong, wherein the length of slot 116 is greater than the diameter of drive pin 110, thereby creating a lost motion connection, meaning that drive pin 110 can translate within slot 116 until it comes into engagement with one of the ends of slot 116. Pawl 38 is operably coupled to link arm 82 proximate second end 114, such as via a pin 122, by way of example and without limitation. It is to be recognized that pin 122 could be a rivet or otherwise, and be attached to and extend from pawl 38 about which link arm 82 may be allowed to rotate. For example a receptacle such as a bore in the link arm 82 may be configured to receive pin 122 therein and allow rotation of link arm 82 about the pin 122. Alternatively, pin 122 may be attached to and extend from link arm 82 for receipt within a receptacle or bore provided in pawl 38. As shown in FIGS. 4-4B, pin 122 is supported for movement along a direction transverse to its lengthwise extending axis within an arcuate slot 123 of housing 30. Slot 123 helps support the pin 122 in case it bends due to a high torque loading on the pin 122 to move the link arm 82. A Hall effect sensor/magnet can be associated with link arm 82, such as via being fixed adjacent second end 114 and/or on pin 122 to facilitate direct position information to a sensor for determination of the precise location of pawl 38, as will be understood by one possessing ordinary skill in the art.

In use, with the roller 40 producing minimal friction against pawl 38, low release effort (force) is required to move pawl 38 relative to ratchet 36, and as a result, in combination with the increased torque provided by gear train 94, the size of motor 88 and magnitude of torque output therefrom can be reduced relative to known powered release actuators. Further yet, as noted above, the proximity of drive pin 110 and axis A4 thereof to rotational axis A3 of second driven gear 100 thereof can be minimized, due in part to the reduce torque needed to move and release pawl 38' from ratchet 36'. With drive pin 110 being located near a center rotational axis (drive gear axis A3) of second driven gear 100, throughout the rotational movement of second driven gear 100 during a latch release operation, as shown in FIGS. 5A-8A, the radial movement of link arm 82 relative to second driven gear axis A3 is minimized. Further, at least a portion of the movement of link arm 82 is linear (traversing radially relative to pawl pivot post 62), thereby pulling on pawl 38 against the bias imparted on pawl 38 by pawl biasing member 80 during a release operation, which results in a smooth and consistent release motion of pawl 38. Additionally, with the length L (FIG. 5B; extending between pawl pivot post 62 of pawl 38 and pin 122) of pawl 38 extending generally transversely to the direction of pulling force F (FIG. 6A) imparted by link arm 82 on free end of first pawl leg segment 64, a high torque force is applied to pawl 38 to facilitate ease of release.

Figure 6A:
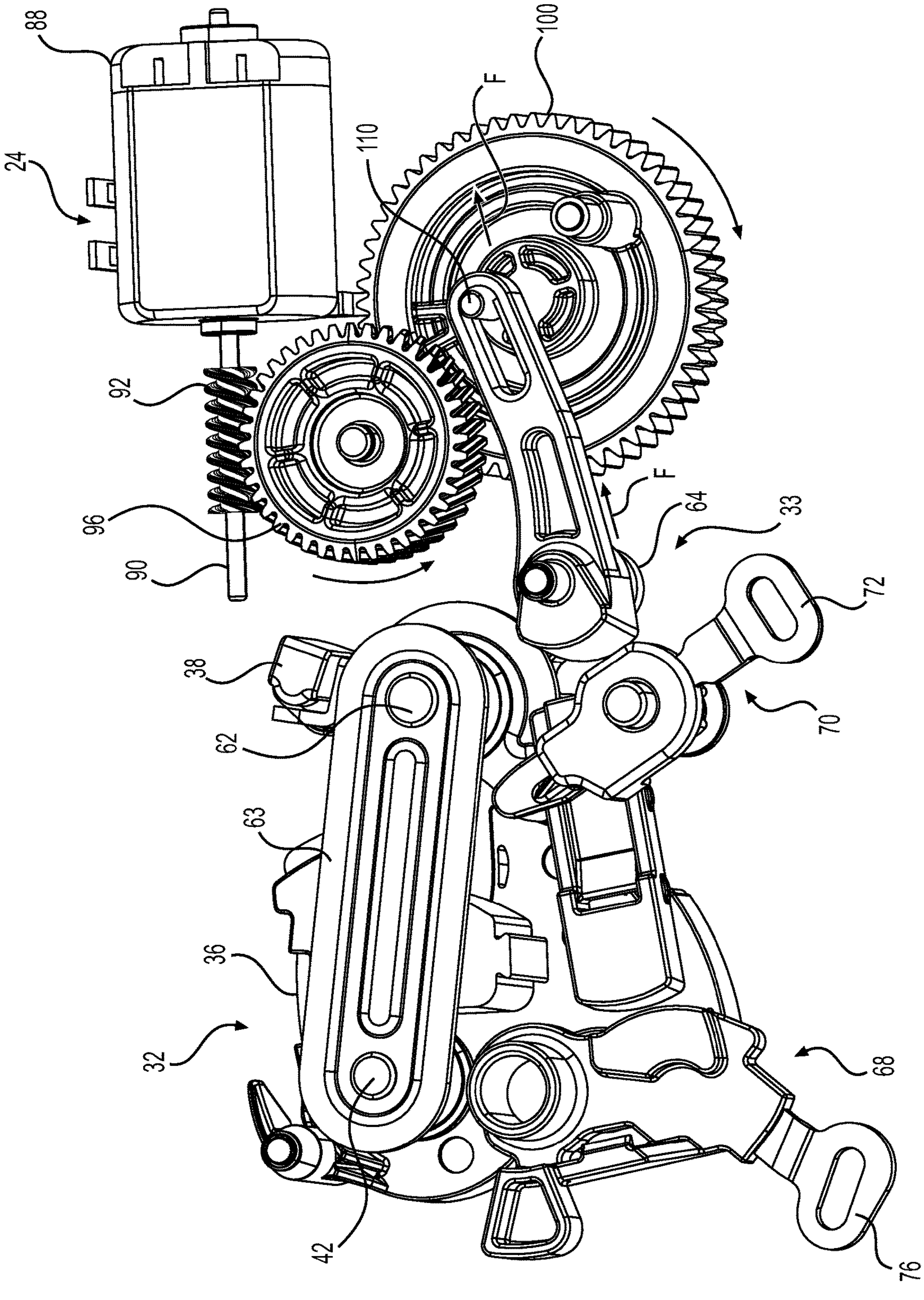
FIG. 6A is a rear side view of the closure latch assembly similar to FIG. 5A while the latch release mechanism is initiating movement of the various components toward an unlatched position.
Figure 6B:
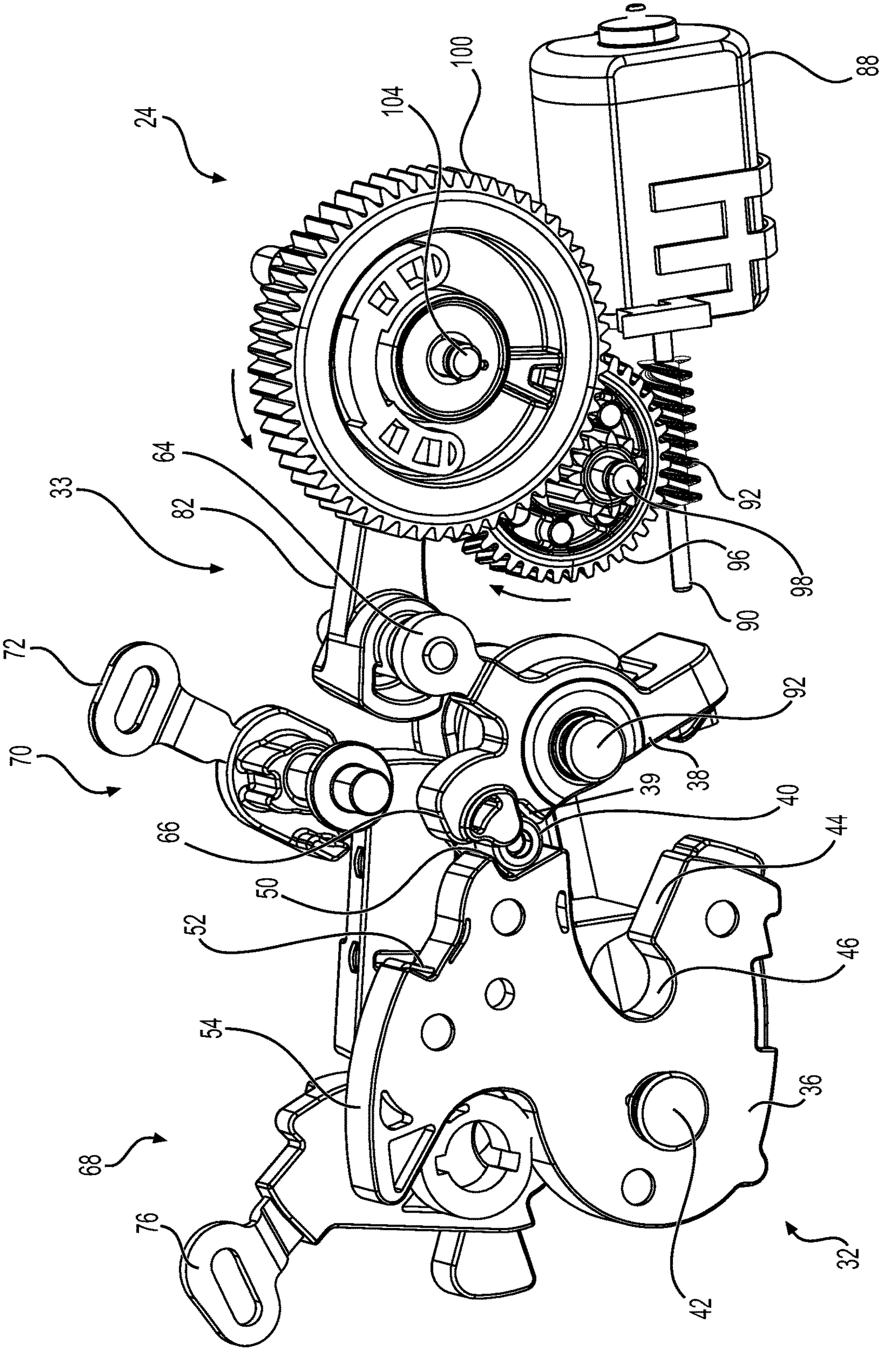
FIG. 6B is a front side view of FIG. 6A.
Figure 6C:
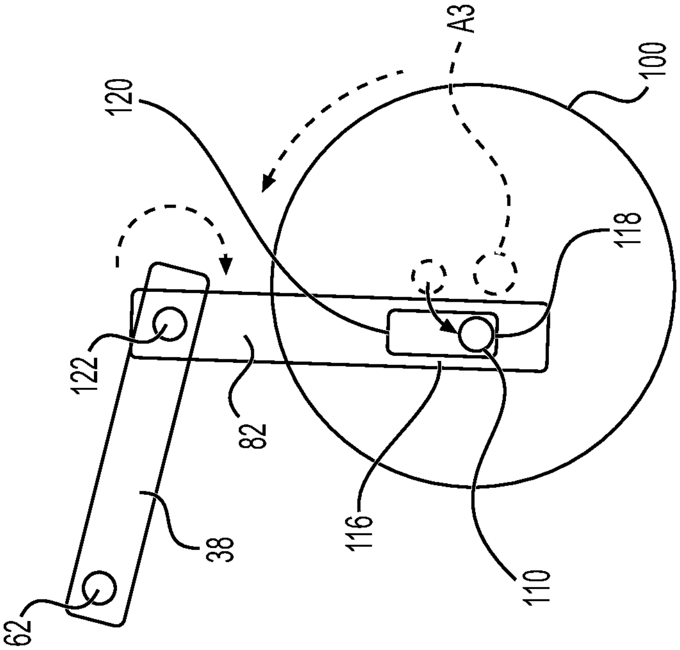
FIG. 6C is a schematic view illustrating the actuation feature in a position between the home position and an actuated position having been brought into engagement with the first end of the slot in the link arm.
Figure 5C:
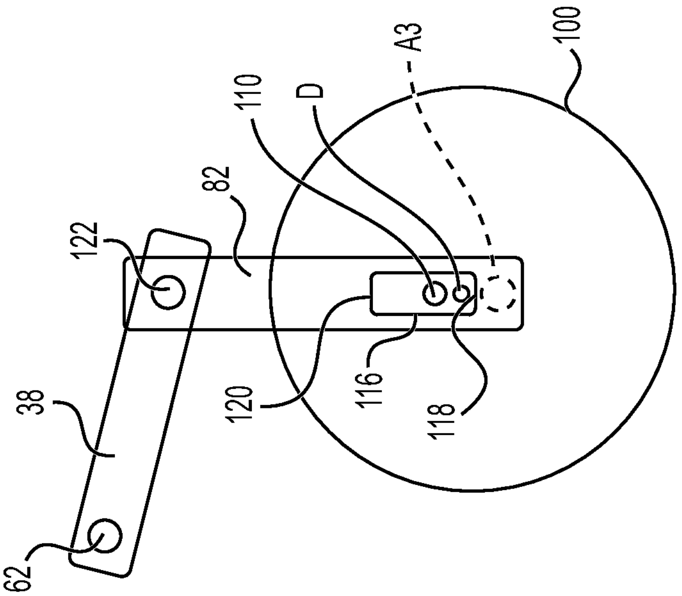
FIG. 5C is a schematic view illustrating an actuation feature of the closure latch assembly in a home position displaced from a first end of a slot provided in a link arm of the closure latch assembly.
Figure 7A:
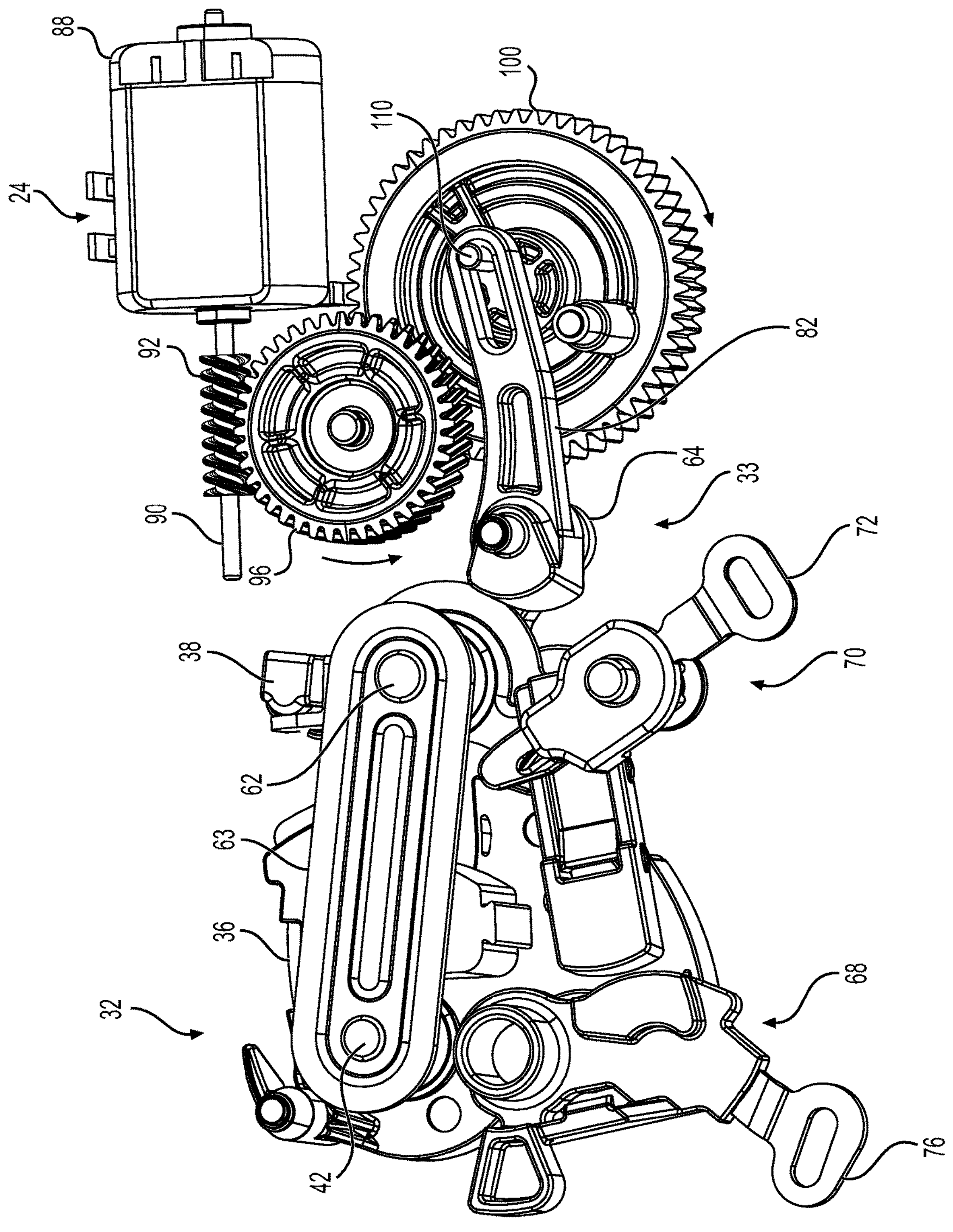
FIG. 7A is a rear side view of the closure latch assembly similar to FIG. 6A while the latch release mechanism is continuing movement of the various components toward the unlatched position.
Figure 7B:
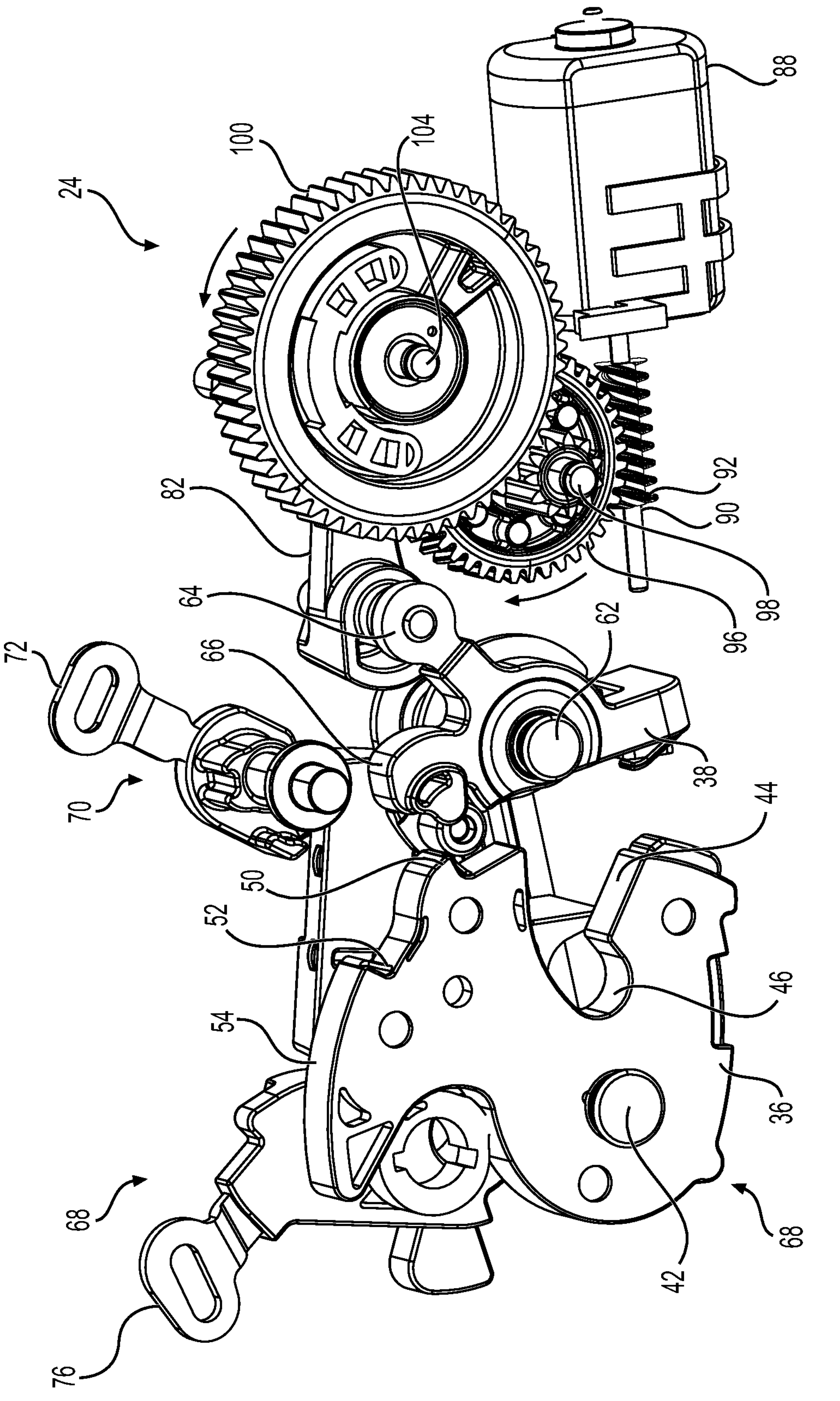
FIG. 7B is a front side view of FIG. 7A.

Further yet, as discussed above, lost motion is provided between movement of second driven gear 100 and movement of pawl 38 due to the travel of drive pin 110 in slot 116 which, in turn, results in enhanced release efficiency and reduced size of motor 88 required due to a buildup of inertia of gear train 94, including first driven gear 96 and second driven gear 100 and motor 88 prior to initiating movement of pawl 38. As shown in FIGS. 6A and 6B, upon selectively energizing motor 88 and driving second driven gear 100 rotatably about drive gear axis A3, drive pin 110 is allowed to slide freely within slot 116 in lost motion fashion prior to driving link arm 82 as shown schematically in more detail in FIG. 5C which shows the drive pin 110 in its home position and displaced from first drive end 118 by a distance D and not in contact with first drive end 118, and in FIG. 6C, in a disengagement position with the lost motion connection, which shows the drive pin 110 engaged with the first drive end 118 in one illustrative example. During such an initial free motion of drive pin 110, drive pin 110 is not yet in contact with the first drive end 118 providing a safety function by disassociating an initial movement of drive pin 110 caused by a radial movement of the second driven gear 100 with the movement of pawl 38, for example caused by any minor unintended motions of second driven gear 100, for example due to shock or inertia, or any temporary unintended energizations of motor 88 not during a power release function. Pawl 38 is not moved during this initial pre-travel of the drive pin 110. Furthermore, prior to initial engagement of drive pin 110 against first drive end 118 of slot 116 the inertia of the gear train 94 and/or motor 88 is allowed to develop and increase without encountering resistance due to a contact with the first drive end 118. Such an increase may be a substantial increase in the inertia of the power actuator 88, such as when the motor is still increasing above 20% of its rotational speed before impact of the pin 110 with the first drive end 118. When drive pin 110 eventually enters into contact with the first drive end 118 in an intermediary position, or is in an engagement position with the lost motion connection, between the home position and actuated position as shown in FIG. 6C, the drive pin 110 does enter into contact with the first drive end 118 with a velocity and momentum developed during the prior free play travel and imparts an impulse or jolt to the link arm 82 causing a corresponding impulse or jolt on the pawl 38. Such an impulse or jolt may assist with overcoming the resting inertia of the pawl 38 and/or with overcoming static friction between the pawl 38 and ratchet 36 or between the roller 40 and the pawl 38 and/or ratchet 36. Therefore, the release efforts acting to move the pawl 38 via the pin 110 acting on the first drive end 118 subsequent the intermediary position shown in FIG. 6C is not only the force generated by the motor 88, but also the force due to the momentum of the motor 88 and the gear train 94 generated during the initial pre-travel phase. The force of motor 88 during this pre-travel phase is also used to overcome the static inertia of the motor 88 and second driven gear 100 prior to acting on the pawl 38, link arm 82 and any other intervening release chain components if provided. Such a configuration is in comparison to a configuration where a power release motor upon energization immediately begins to move a pawl such that the motor has to overcome static inertia of not only its own mass, but also simultaneously overcome the static inertia state of the pawl and any intervening release chain components which requires a more powerful motor than the motor 88 described herein. In the configuration of the latch assembly 18, the lost motion connection allows an increase in momentum in the drive system (e.g. motor 88 and second driven gear 100) leading to an impact of the pin 110 against the first drive end 118 to assist with overcoming the static friction of the roller 40 at the contact point(s) between the roller 40 and the pawl 38 and the ratchet 36 surfaces when the roller 40 is in a non-rolling state to assist with transitioning the roller 40 into a rolling state such that the contact points between the roller 40 and the pawl 38 and the ratchet 36 surfaces experience rolling friction, lower than the static friction. Therefore, motor 88 does not have to simultaneously overcome the static friction of the roller 40 and the resting inertia of the motor 88, the drive train 94, the link arm 82 and pawl 38, but rather the lost motion connection allows the inertia of the resting bodies of the motor 88, the drive train 94, the link arm 82 and the pawl 38 to be overcome in separated stages of actuation, where the resting inertia of the components upstream the lost motion connection (e.g. the motor 88, the drive train 94) is overcome during a first release stage prior to coupling of the drive pin 110 with the first drive end 118 before the resting inertia and the static friction of the components downstream the lost motion connection (e.g. the link arm 82, the pawl 38 and roller 40) is overcome during a second release stage. Therefore motor 88 does not need to overcome simultaneously the inertia and friction of the entire release chain and can therefore be provided with lower power output and a smaller motor size having.

When engagement of drive pin 110 against first drive end 118 of slot 116 occurs, the lost motion connection transitions from a disengaged state or position to an engaged state or engaged position such that continued motion of the drive pin 110 causes motion of the link arm 82. And then, during initial engagement of drive pin 110 against first drive end 118 of slot 116, the initial movement of link arm 82 is pivotal about pin 122, and thus, does not pull on pawl 38, which all together allows inertia to further build in motor 88 and drive train 94. Then, upon initial driving of link arm 82 linearly relative to pawl pin 62, with drive pin 110 engaging and pulling on first drive end 118, the build-up or run-up of inertia, for example rotational inertia via speed increase or acceleration of motor 88 prior to the transition of the lost motion connection from the disengaged state or disengaged position to an engaged state or engaged position, and other rotating components such as the first driven gear 96 and the second driven gear 100, facilitates moving pawl 38 from its ratchet holding position, against the bias of pawl biasing member 80, toward its ratchet release position. A time delay between the moment the motor 88 is energized and the moment the pawl 38 is caused to move is therefore provided due to the drive pin 110 being displace from the first drive end 118 by distance D and not being positioned in a home position where it would be already engaging, or closely in position to engage with the first drive end 118 such that drive pin 110 would immediately pull on first drive end 118 upon energization of the motor 88. In other words, when the drive pin 110 is in its home position, upon energization of the motor 88 the drive pin 110 would freely move within the slot 116 over a predetermined range of travel to traverse distance D before entering into contact with first drive end 118. Upon reaching a full travel position (FIGS. 8A and 8B), second driven gear 100 has been driven between about 180-190 degrees, whereat drive pin 110 has been rotated to an over-center position relative to alignment with drive gear axis A3 and pin 122, and thus, pawl biasing member 80 is effectively holding second driven gear 100 in its full travel position against gear stop bumper 124, and without requiring motor 88 to be continuously energized in this over-center position to resist link arm 82 under influence of the pawl biasing member 80 from tending to rotate second driven gear 100 back towards its position. Stop bumper 124 is provided on the first gear 100 to reduce the torque impact of the stop bumper 124 against a hardstop, such as a stop provided on the latch housing. In other words, when the actuation feature 110 is in its actuated position, the link arm 82 is in an over-center position relative to the axis A3 of the second driven gear 100. Motor 88 may be next de-energized upon reaching the full travel position and the over-center position of the drive pin 110 and link arm 82 maintains the pawl 38 in its ratchet release position and in tension between the drive pin 110 by the pawl biasing member 80. Thus, no additional levers or components are needed to provide a full travel position or snow load function, nor is a continuous powering of the motor 88 required, nor is a larger, more robust motor 88 required to withstand stall operating condition to execute full travel position or snow load holding function. To transition out of the full travel position or snow load function, the motor 88 may be powered in an opposite return direction to cause the pin drive 110 to move the link arm 82 out of the over-center position at which point the pawl biasing member 80 may be allowed to assist the pawl 38 to return towards the ratchet holding position and the link arm 82 allowed to correspondingly move back towards its position shown in FIGS. 5A and 5B. During the powering of the motor 88 in the return direction, the motor 88 may in a configuration not act to move any other components other than the gear train 94 and link arm 82 as described herein, and for example the output power of the motor 88 is not used to cinch the ratchet 36 to cause the ratchet 36 to move a striker retained by the ratchet 36 to the primary latching position. The power output from a motor for performing a cinch function compared to a power release function may be larger, therefor requiring a larger motor for performing both a cinch and power release operation. A cinching function associated with the closure latch assembly 18 of the present disclosure may be powered by a separate actuator or motor other than the motor 88 not located within the housing of the closure latch assembly 18, but remote and separate from the housing closure latch assembly 18 provided in a distinctly mounted housing and as interconnected by a cinching cable connected between the cinch actuator and a cinch mechanism mounted within the housing of the closure latch assembly 18, the cinch mechanism being in operable connection with the ratchet 36 for moving the ratchet 36 towards a primary closed position as part of a cinching operation.

Figure 10A:
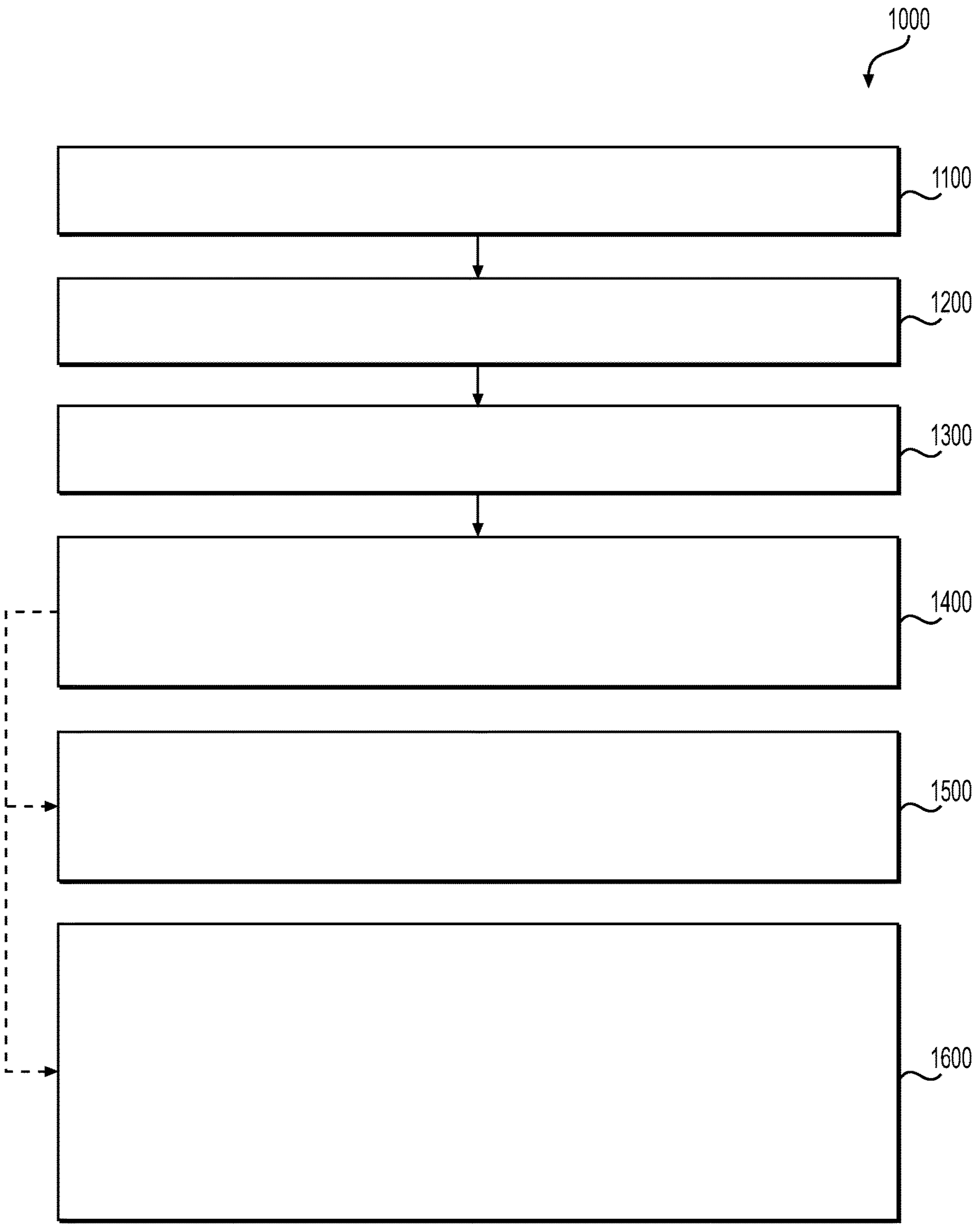
FIG. 10A illustrates a method of operating a latch mechanism of a closure latch assembly in accordance with another aspect of the disclosure.

In accordance with another aspect of the disclosure, as shown in FIG. 10A, a method 1000 of operating a latch mechanism 32 of a closure latch assembly 18 is provided. The method 1000 includes: a step 1100 of selectively energizing a power actuator 88 to rotate a drive gear 92; a step 1200 of driving a gear train 94 with the drive gear 92; a step 1300 of driving an actuation feature 110 in response to the gear train 94 being driven; and a step 1400 of moving a pawl 38 from a ratchet holding position to a ratchet releasing position via a lost motion connection with the actuation feature 110 to allow a ratchet 36 to move from a striker holding position to a striker release position.

The method 1000 can further include a step 1500 of driving a first driven gear 96 of the gear train 94 with the drive gear 92 and driving a second driven gear 100 of the gear train 94 with a driven pinion gear 102 and causing the actuation feature 110 to be driven in conjoint relation with the second driven gear 100.

The method 1000 can further include a step 1600 of providing a torque multiplication between the drive gear 92 and the second driven gear 100 by providing the drive gear 92 and the first driven gear 96 with a first gear ratio, providing the driven pinion gear 102 and the second driven gear 100 with a second gear ratio, and providing the drive gear 92 and the second driven gear 100 with a third gear ratio, with the second gear ratio being greater than the first gear ratio, and the third gear ratio being greater than the second gear ratio.

Figure 10B:
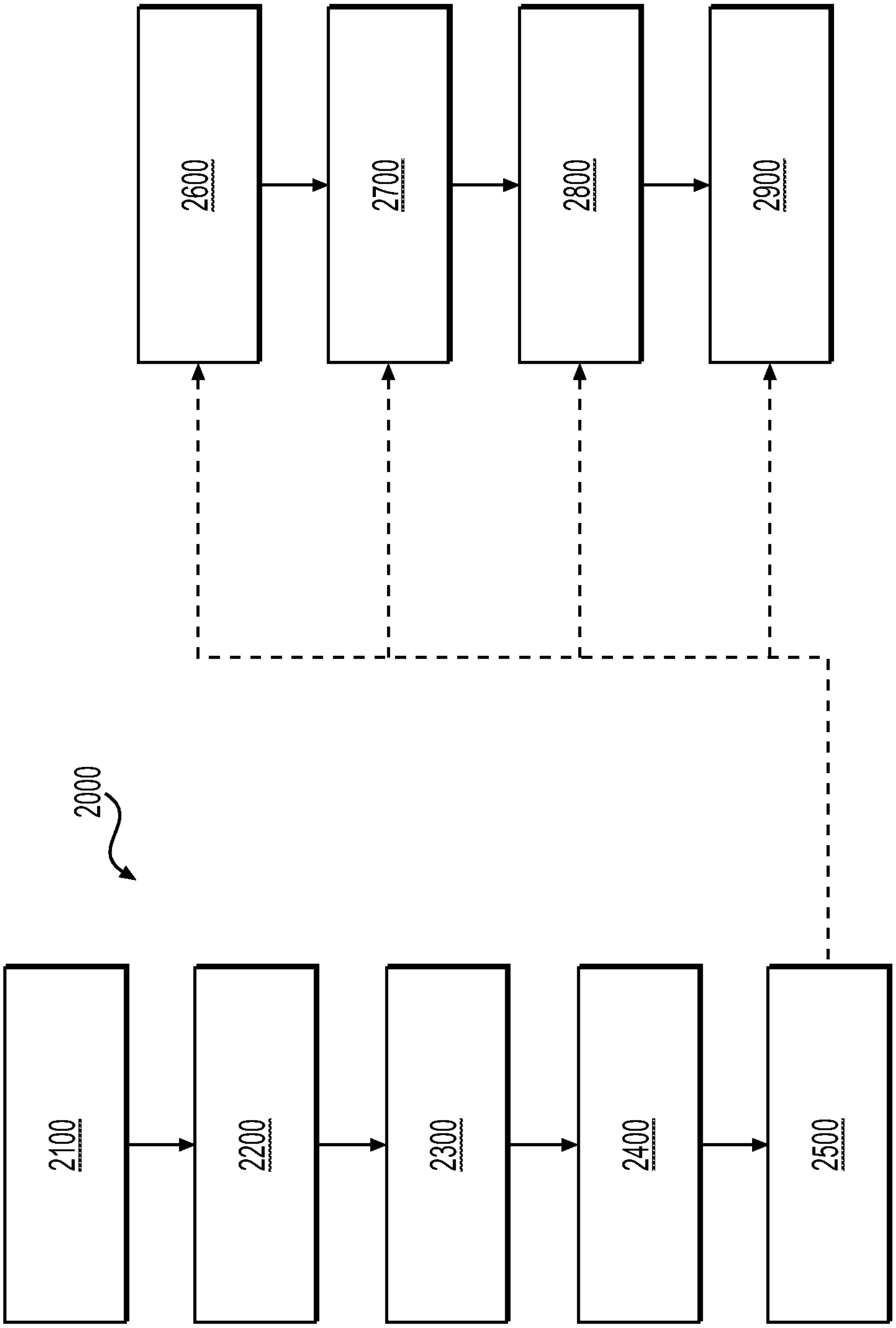
FIG. 10B illustrates a method of manufacturing a closure latch assembly in accordance with another aspect of the disclosure.

In accordance with another aspect of the disclosure, as shown in FIG. 10B, a method 2000 of manufacturing a closure latch assembly 18 includes: a step 2100 of supporting a ratchet 36 in a housing for movement between a striker capture position and a striker release position; a step 2200 of supporting a pawl 38 in the housing for movement between a ratchet holding position, whereat the ratchet 36 is in the striker capture position, and a ratchet releasing position, whereat the ratchet 36 is biased toward the striker release position, and biasing the pawl 38 toward the striker release position; a step 2300 of coupling an actuation feature to the pawl 38 with a latch release mechanism 33; a step 2400 of configuring an actuation feature 110 having a lost motion connection with the latch release mechanism 33; and a step 2500 of operably coupling a power actuator 88 to the actuation feature 110 with a gear train 94, with the gear train 94 providing a torque multiplication between a drive gear 92 fixed to a motor shaft 90 of the power actuator 88 and a driven gear 100 of the gear train 94.

The method 2000 can further include a step 2600 of configuring the latch release mechanism 33 to provide a lost motion connection between the actuation feature 110 and the pawl 38.

The method 2000 can further include a step 2700 of providing the latch release mechanism 33 including a link arm 82 having a slot 116 extending between a first drive end 118 and a second drive end 120 and providing the actuation feature 110 including a drive pin 110 configured for sliding movement between the first drive end 118 and the second drive end 120.

The method 2000 can further include a step 2800 of configuring the drive pin 110 to move from the first drive end 118 toward the second drive end 120 upon energization of the power actuator 88 and causing the pawl 38 to initiate movement from the ratchet holding position toward the ratchet releasing position upon the drive pin 110 engaging the second drive end 120.

The method 2000 can further include a step 2900 of operably coupling a release cable 23' to the pawl 38 and configuring the release cable 23' for manual actuation, whereupon the lost motion connection prevents the power actuator 88 from being backdriven.

Figure 11:
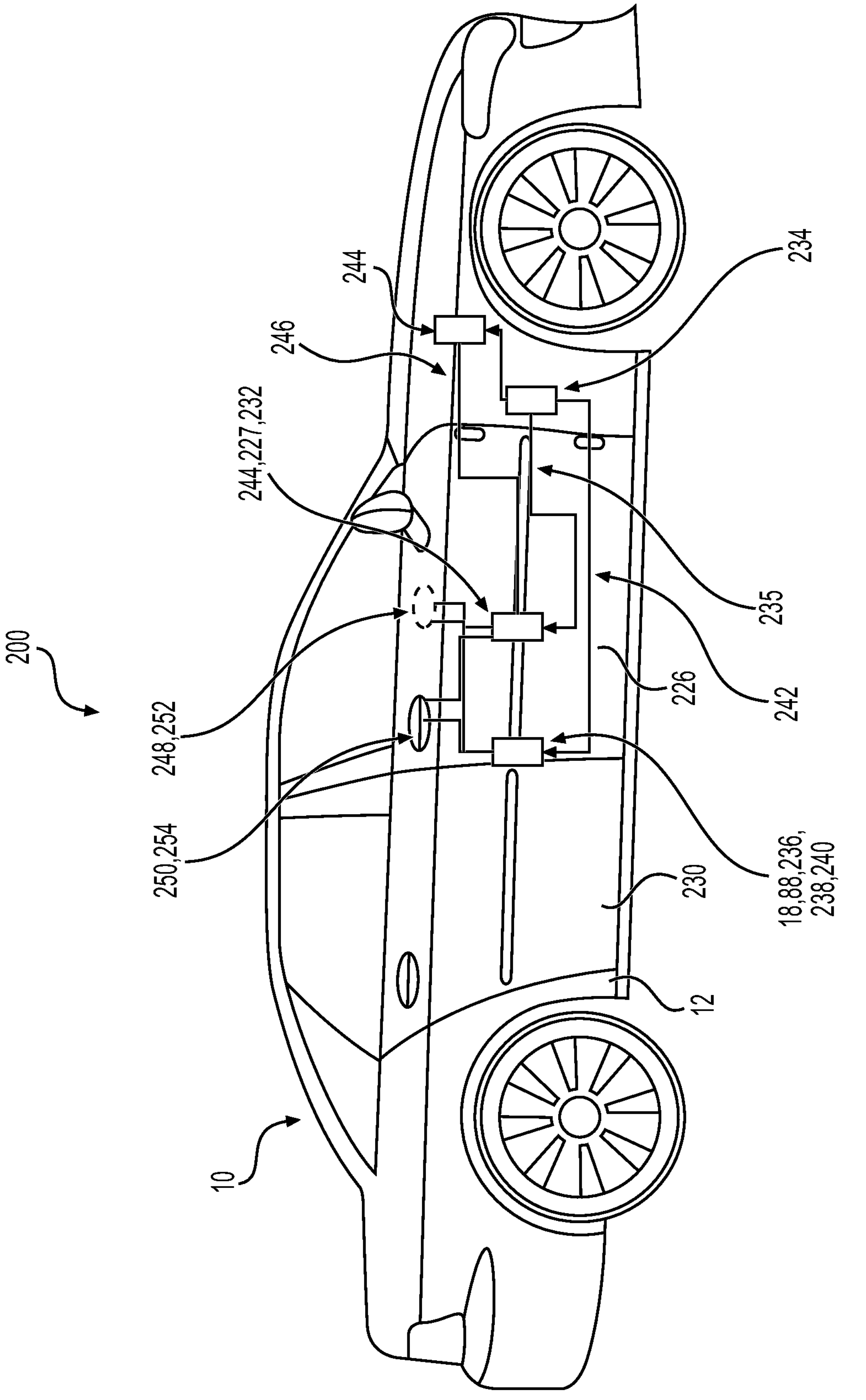
FIG. 11 is a perspective view of the motor vehicle equipped with a system including a closure latch assembly and door node according to aspects of the disclosure.
Figure 12:
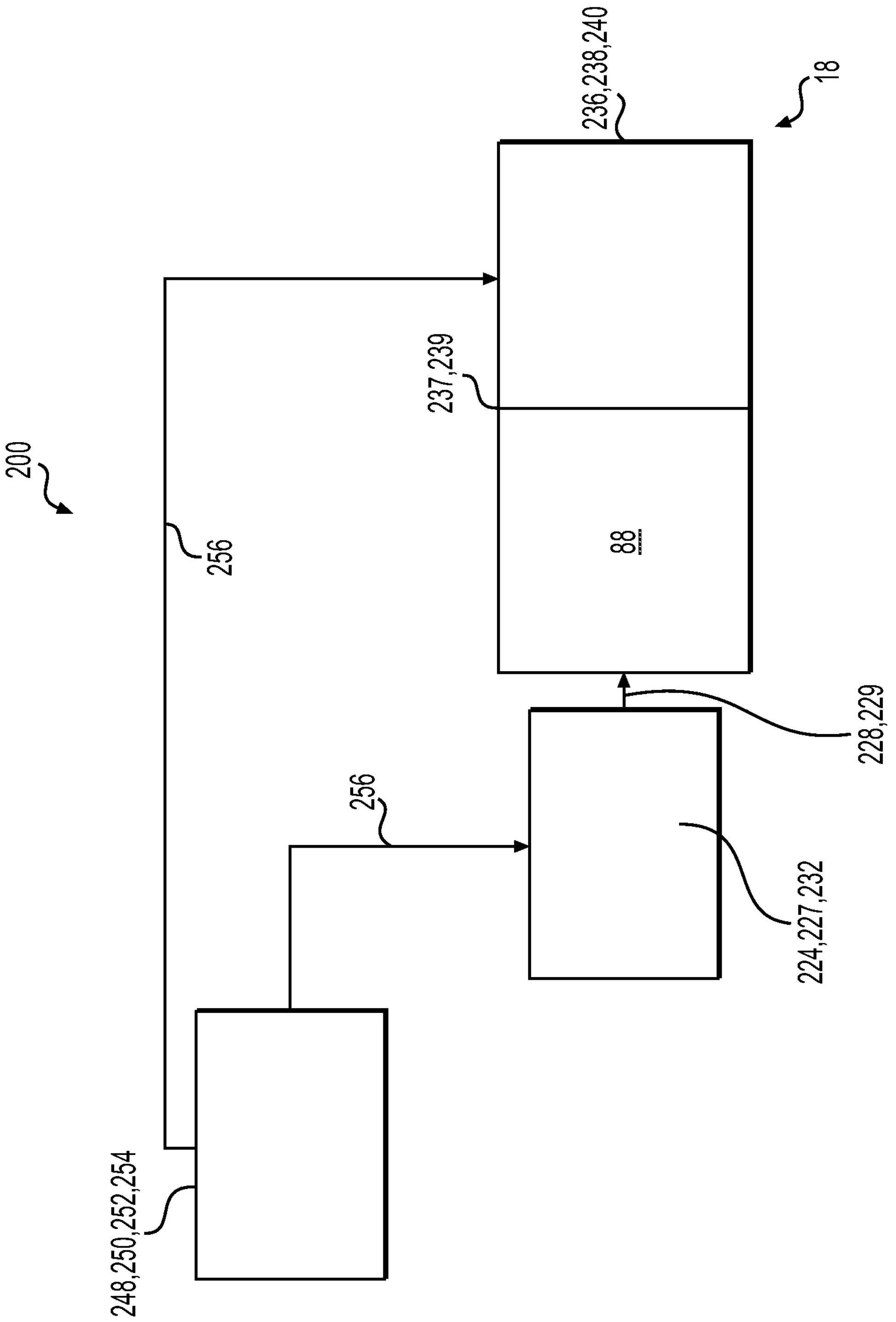
FIG. 12 is a perspective view of the motor vehicle equipped with the system according to aspects of the disclosure.

Now referring initially to FIGS. 11 and 12, a system 200 for controlling a power release motor (i.e., motor 88) of a closure latch assembly (e.g., closure latch assembly 18) is shown. Specifically, FIG. 11 is a perspective view of the motor vehicle 10 equipped with the system 200. In system 200, the closure latch assembly 18 is operable in one of a normal operating mode and an emergency mode. As discussed above, the closure latch assembly 18 includes a power release motor 88. The system 200 includes a primary controller that is external to the closure latch assembly 18. For example, the primary controller can be door node 224 for a first closure member (e.g., front passenger door 226). So, the power release motor 88 is configured to operate using primary control signals received from the primary controller during the normal operating mode of the closure latch assembly 18. It should be appreciated that the primary controller could be disposed elsewhere on the motor vehicle 10 besides front passenger door 226 or another closure member. FIG. 12 is a more detailed block diagram of the system 200 showing the primary controller (e.g., door node 224) of the system 200 including a primary motor driver 227.

The primary controller is configured to supply primary control signals 228 to the power release motor 88 (using the primary motor driver 227) via primary release motor driving line 229 during the normal operating mode in response to receiving a door open signal. Although not shown, the system 200 can include a rear door node for a second closure member (e.g., rear passenger door 230). The front door node 224 includes a primary electronic control unit 232 (e.g., processor) that has a plurality of input-output terminals adapted to connect to a main power source (e.g., battery 234) via door node power supply line 235 and to a vehicle bus (e.g., CAN or controller area network) (not shown).

The system 200 also includes a secondary controller that is internal to the closure latch assembly 18. The secondary controller is configured to supply secondary control signals 237 (using a secondary motor driver 236) via secondary release motor driving circuit 239 to the power release motor 88 during the emergency mode in response to receiving the door open signal. The secondary controller is also configured not to supply the secondary control signals to the power release motor 88 during the normal operating mode. For example, the secondary controller can be a latch controller 238 of the closure latch assembly 18 that includes a secondary electronic control unit 240 (e.g., processor) that is in communication with the primary electronic control unit 232 for latching the first closure member 226 relative to the motor vehicle 10 (e.g., to the vehicle body 12 of the motor vehicle 10). So, the power release motor 88 is configured to operate using the secondary control signals received from the secondary controller during the emergency operating mode of the closure latch assembly 18, but will not operate using the secondary control signals received from the secondary controller during the normal operating mode. As discussed in more detail below, the closure latch assembly 18 also includes a backup energy source (e.g., supercapacitors), which is coupled to the battery 234 for charging via supercap charging supply line 242.

The system 200 additionally includes a body control module 244 (BCM) in communication with the primary controller (e.g., door node 224) and secondary controller (e.g., latch controller 238). As shown in FIG. 12, a crash/post crash signal line or crash signal line 246 extends between the BCM and the door node 224 and latch controller 238 to communicate if the BCM detects that motor vehicle 10 is involved in a crash via a crash signal 247. Specifically, a post crash status is sent also in case of undervoltage (e.g., the voltage of the battery 234 is less than an expected voltage range). In case of crash with rollover post crash status is sent after 5 seconds. In case of front or rear crash TCR ON is sent after the crash.

Figure 13:
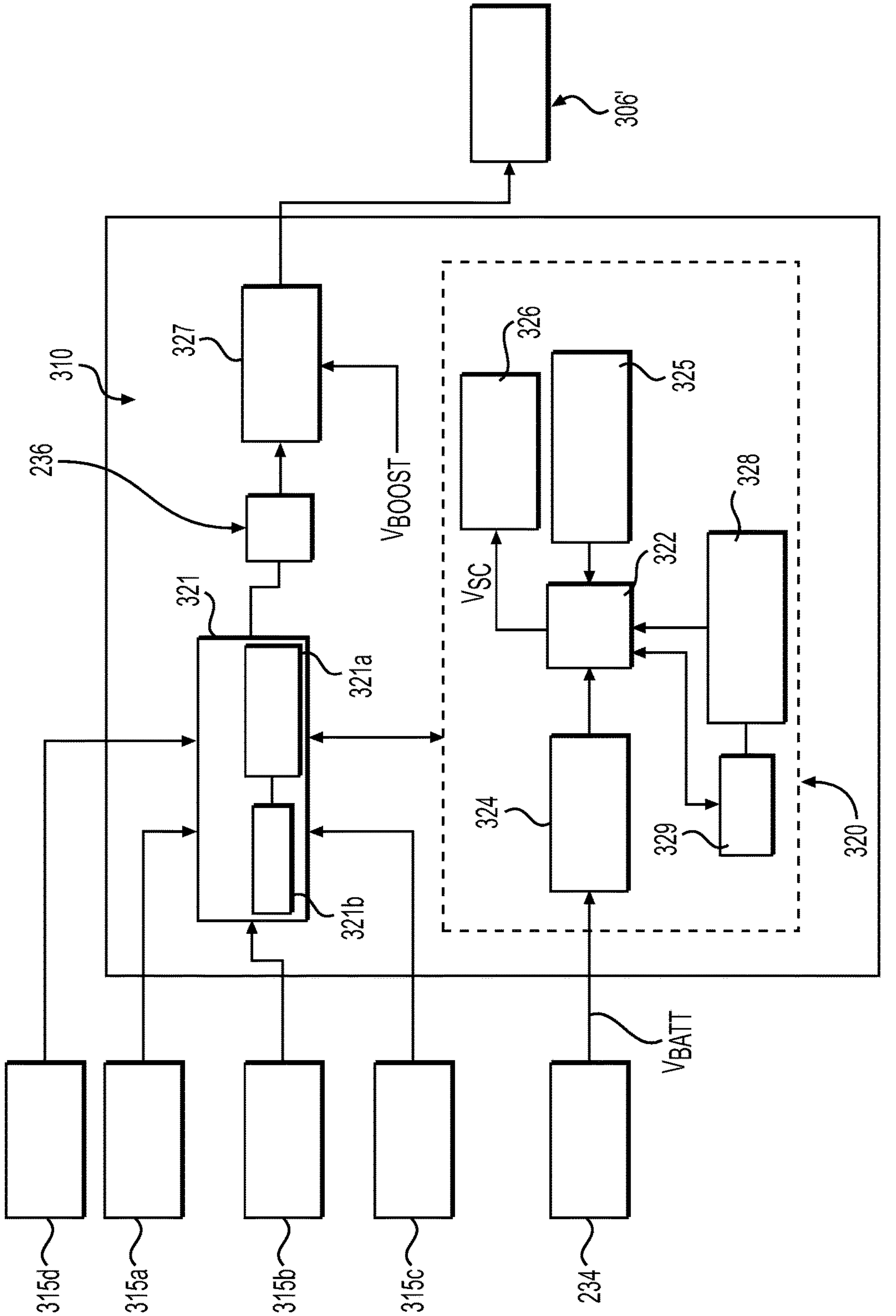
FIG. 13 (PRIOR ART)
FIG. 13 is a block diagram of a known electronic control circuit that may be used to control the closure latch assembly.

At least one first handle switch (e.g., first inside and outside switches 248, 250 respectively associated with first inside and outside handles 252, 254 of the front passenger door 226) is coupled to both the primary electronic control unit 232 and the secondary electronic control unit 238 for detecting operation of the first inside and outside handles 252, 254 of the first closure member 226. According to an aspect, each handle 252, 254 may include two switches (instead of each switch 248, 250 being connected to both the primary electronic control unit 232 and the secondary electronic control unit 238, each of the primary electronic control unit 232 and the secondary electronic control unit 238 are separately coupled to its own handle switch in the handle 252, 254). Inside and outside switches 248, 250 on the front passenger door 226 may be used to indicate that a user is attempting to move the door 226. So, as shown in FIG. 13, the door open signal 256 can, for example, be from the inside and outside switches 248, 250. The closure latch assembly 18 (latch controller 238) knows when there is a crash (via crash signal line 246) If there is no crash, the closure latch assembly will ignore the open signal 256. However, in the normal mode, the open signal 256 causes wakeup and power release of the closure latch assembly 18 via the door node 224 (primary control signals 228).

FIG. 13 is a block diagram of a known electronic control circuit 310 that may be used in conjunction with the closure latch assembly 18. As shown, the electronic control circuit 310 is (directly, and/or indirectly via the vehicle management unit 312 (e.g., BCM 244)) coupled to several different sensors 315 (shown schematically) of the motor vehicle 10, such as: the at least one first handle switch **315*a* (e.g., first inside and outside switches 248, 250 respectively associated with first inside and outside handles 252, 254 of the front passenger door 226), crash sensors 315*b* (e.g., from the BCM 244), lock switch sensors 315*c*, and the like; conveniently, the electronic control circuit 310 also receives feedback information about the latch actuation from position sensors 315*d*, such as Hall sensors, configured to detect the operating position, for example of the ratchet 36 and/or pawl 38**.

The electronic control circuit 310 is also coupled to the main power source (e.g., battery 234) of the motor vehicle 10, so as to receive the battery voltage Vbatt. The electronic control circuit 310 is thus able to check if the value of the battery voltage Vbatt decreases below a predetermined threshold value, to promptly determine if an emergency condition (when a backup energy source may be needed) occurs.

The electronic control circuit 310 includes an embedded and integrated backup energy source 320, which is configured to supply electrical energy to an actuation group 306' (e.g., ratchet 36, pawl 38) including latch electric motor 309 (e.g., power release motor 88), and to the same electronic control circuit 310, in case of failure or interruption of the main power supply from the main power source of the motor vehicle 10.

In more detail, the electronic control circuit 310 includes a control unit 321 (e.g., secondary controller), for example provided with a microcontroller, microprocessor or analogous computing module **321*a* (e.g., secondary electronic control unit), coupled to the backup energy source 320 and the actuation group 306' of the closure latch assembly 18, to control their operation. So, the control unit 321 can include power release functions including monitoring latch sensors (e.g., configured to monitor positions of the ratchet 36 and pawl 38), controlling the lock motor 309 (e.g., power release motor 88), and controlling the motor driver 236** during normal operation and emergency or crash operation.

The control unit 321 has an embedded memory **321*b*, for example a non-volatile random access memory, coupled to the computing module 321*a*, storing suitable programs and computer instructions (for example in the form of a firmware). It is recognized that the control unit 321 may alternatively comprise a logical circuit of discrete components to carry out the functions of the computing module 321_a_ and memory 321**_b_.

According to an aspect, the backup energy source 320 includes a group of low voltage supercapacitors 322 (hereinafter supercap group 322), as an energy supply unit (or energy tank) to provide power backup to the closure latch assembly 18, even in case of power failures. Supercapacitors may include electrolytic double layer capacitors, pseudocapacitors or a combination thereof.

Supercapacitors advantageously provide high energy density, high output current capability and have no memory effects; moreover, supercapacitors have small size and are easy to integrate, have extended temperature range, long lifetime and may withstand a very high number of charging cycles. Supercapacitors are not toxic and do not entail explosive or fire risks, thus being suited for hazardous conditions, such as for automotive applications.

The backup energy source 320 further includes a charge module 324; an equalization module 325 and a boost module 326. The charge module 324 is electrically coupled to the supercap group 322 and is configured to recharge, starting from the battery voltage Vbatt, whenever power from the main power source (e.g., battery 234) is available, the supercap group 322, so that the same supercap group 322 may offer a full energy storage for emergency situations and any leakage currents are compensated.

An equalization module 325 is electrically coupled to the supercap group 322, and is configured to ensure that both supercapacitor cells have a desired cell voltage value, in particular a same cell voltage value during operation (to achieve a balanced operating condition). The equalization module 325 also avoids that supercapacitor cells have a cell voltage over a maximum desired cell voltage level, protecting the supercapacitors against overcharging.

The boost module 326 receives at its input the supercap voltage Vsc generated by the supercap group 322, and is configured to boost, that is to increase, its value up to automotive standard voltages (for example 9 V-16 V), and to provide enough output current capability to drive standard automotive electric motors, such as the power release motor 88 of the closure latch assembly 18. Indeed, the supercap voltage Vsc may be too low to provide an effective back-up power source to directly drive the power release motor 88 in emergency situations, like lost or insufficient power supply from main power source of the motor vehicle 10.

The boost module 326 thus provides at its output (that is also the output of the backup energy source 320) a boosted voltage Vboost, as a function of the supercap voltage Vsc. The boosted voltage Vboost is then received by an output module of the electronic control circuit 10, for example including an integrated H-bridge module 327, whose output drives the power release motor 88 of the closure latch assembly 18.

The backup energy source 320 further includes a diagnostic module 328, which is operatively coupled to the supercap group 322 and is configured to monitor the health status of the supercapacitors during the charging process and based on the same charging process, by measuring their voltage value, capacitance value, and internal equivalent resistance (DCR—Direct Current Resistance), for example.

A temperature sensor 329 is configured to monitor the operating temperature of the supercap group 322, and it is coupled to the diagnostic module 328 to provide the detected temperature information; for example, temperature sensor 329 may include an NTC (Negative Temperature Coefficient) resistor arranged in the proximity of the supercap group 322.

The diagnostic module 328 is operatively coupled to the control unit 321, to provide diagnostic information thereto, for example including the value of the supercap voltage Vsc. In a possible embodiment, not shown, the diagnostic module 328 may be implemented in the control unit 321, as a diagnostic routine run by the microprocessor or microcontroller thereof. Also the diagnostic module 328 may be configured for detection of the internal series resistance (DCR) and capacitance (C) of the backup energy source as diagnostic information. So, the control unit 321 of FIG. 13 includes power release functions including monitoring latch sensors, controlling a lock motor, and controlling the motor driver (using secondary motor driver 236) in the normal mode as well as the emergency mode (i.e., crash operation).

Figure 14:
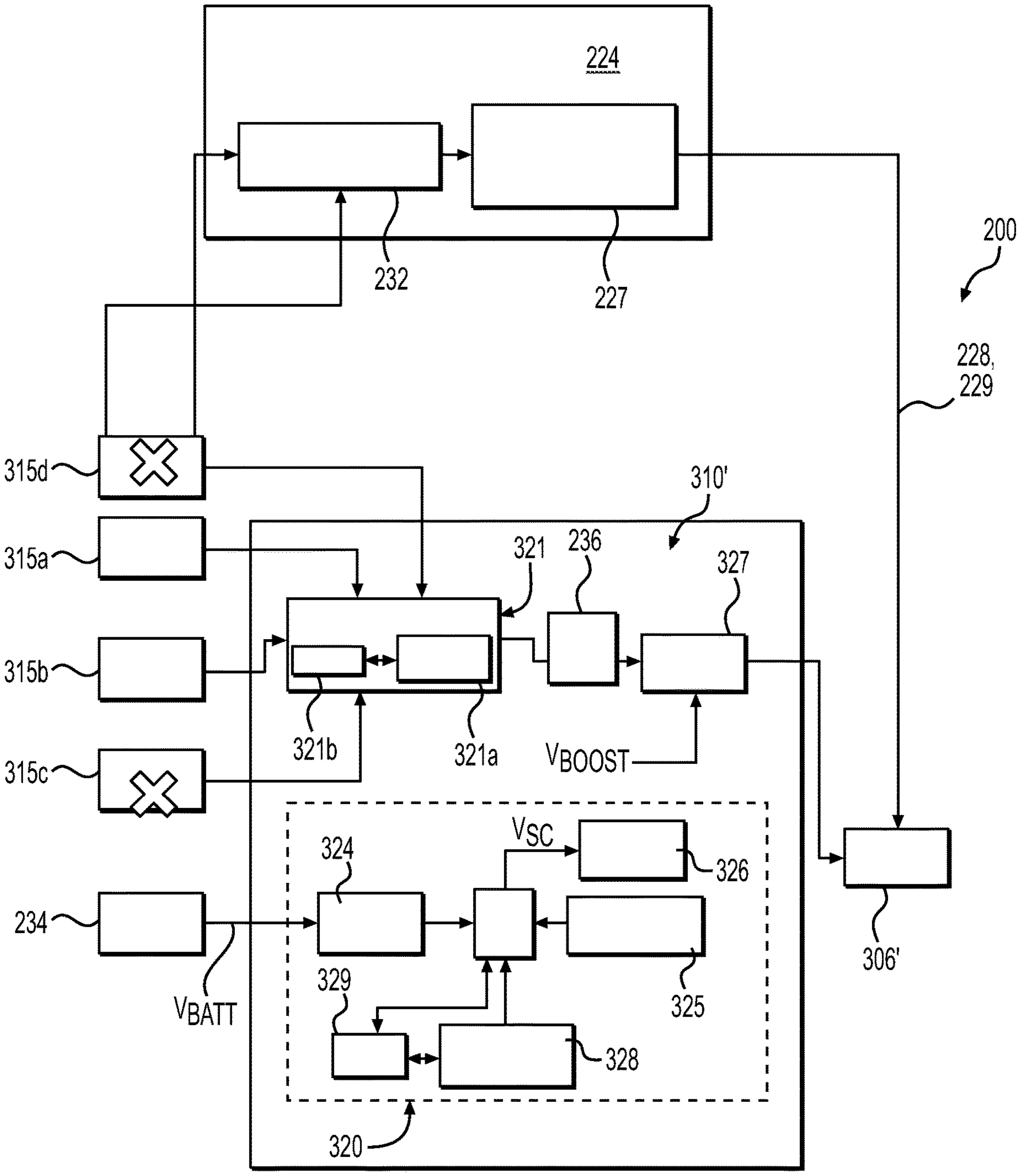
FIG. 14 is a block diagram of an electronic control circuit of the closure latch assembly according to aspects of the disclosure.
Figure 15:
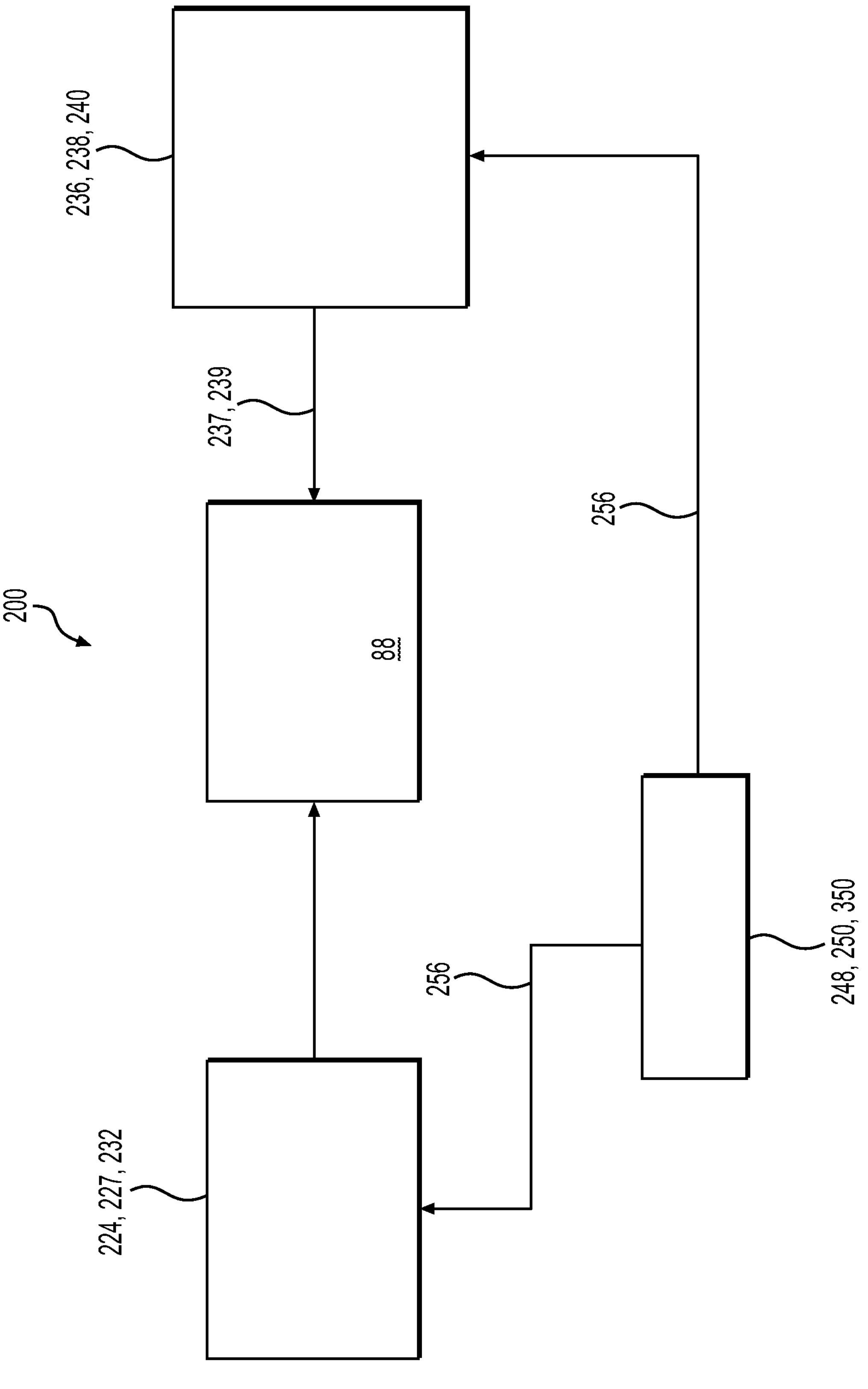
FIGS. 15-21 show additional block diagrams of the system according to aspects of the disclosure.

FIG. 14 is a block diagram of another electronic control circuit 310' that may be used for closure latch assembly 18. Although very similar in operation to FIG. 13 described above, the latch functionality of the control unit 321 (e.g., latch controller 238) is reduced. Specifically, the latch controller 238 does not monitor latch sensors (e.g., position sensors 315_d_). Furthermore, the latch controller 238 does not control the lock motor, except for crash unlock. The latch controller 238 only controls the secondary motor driver 236 in the emergency mode (i.e., backup/crash mode). In contrast, the latch functionality of the door node 224 (primary controller 232) is enhanced and includes additional connections as shown (e.g., to receive signals from the position sensors 315_d_ and lock sensors 315_c_ instead of the control unit 321 or latch controller 238 receiving them). In more detail, the primary controller 232 of the door node 224 monitors latch sensors, controls unlock function, and controls primary motor driver 227 in the normal mode, and optionally crash with power mode (during a crash in which power from the battery 234 is still available to the door node 224).

Figure 16:
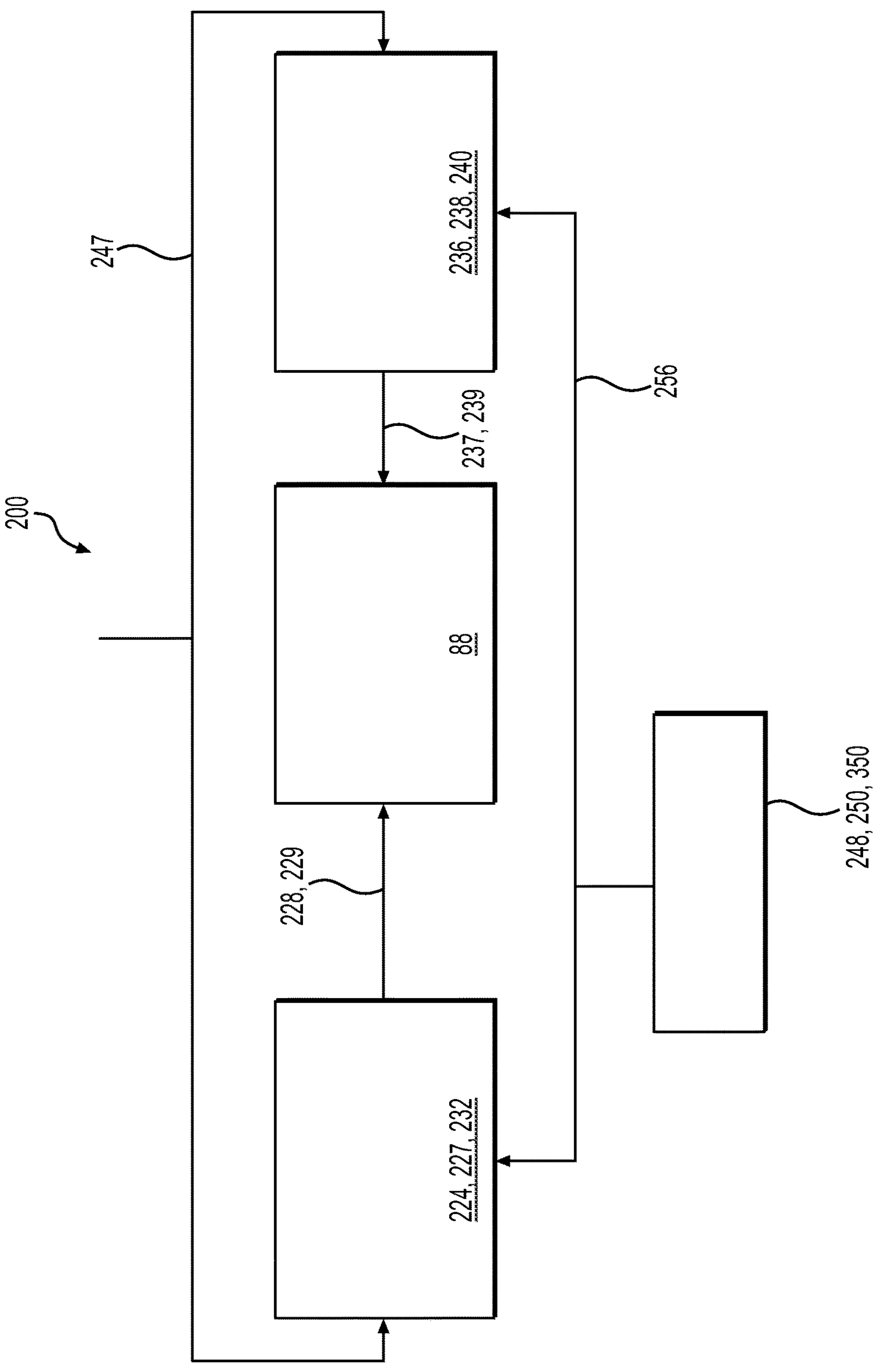
Figure 17:
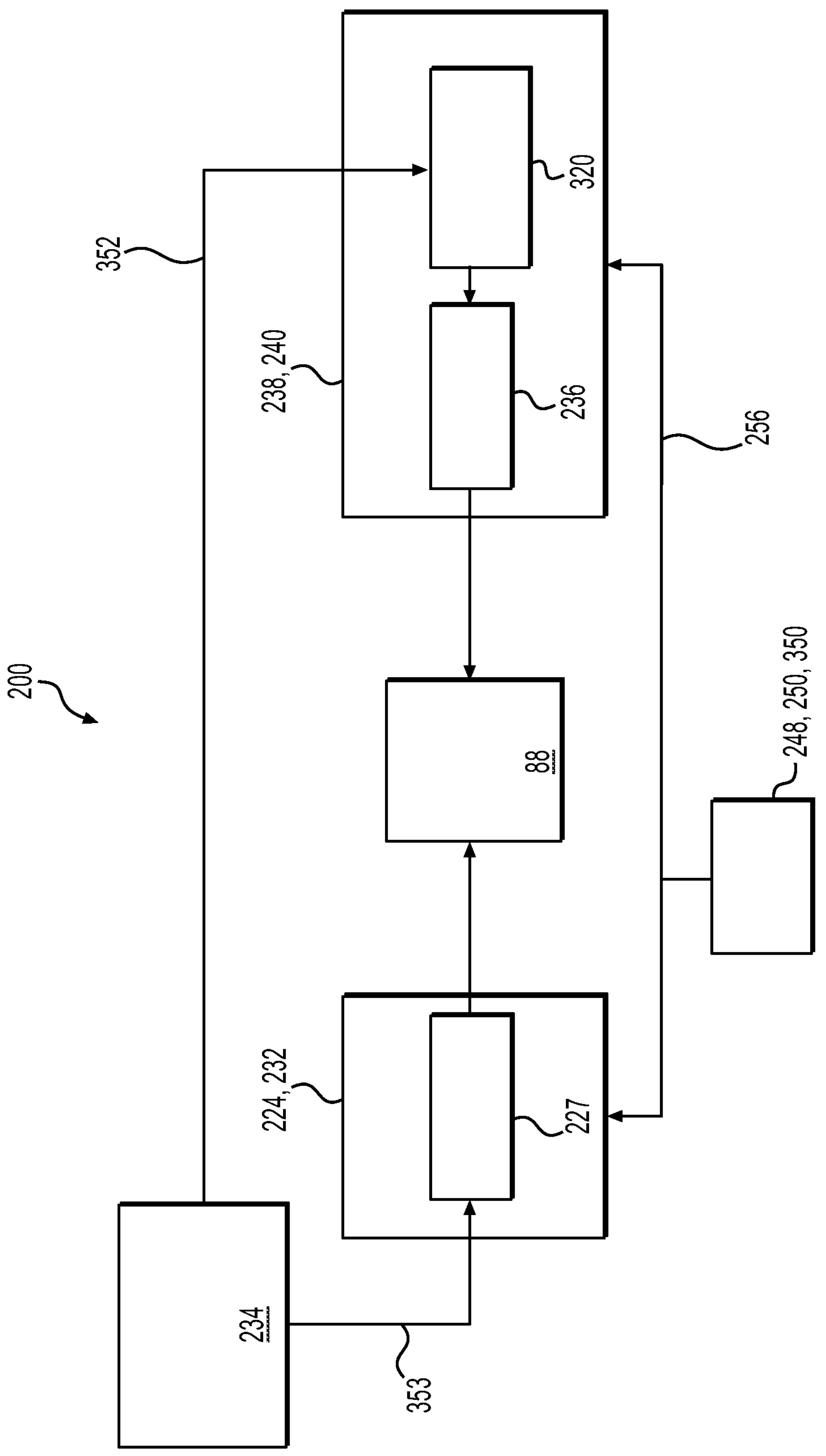
Figure 18:
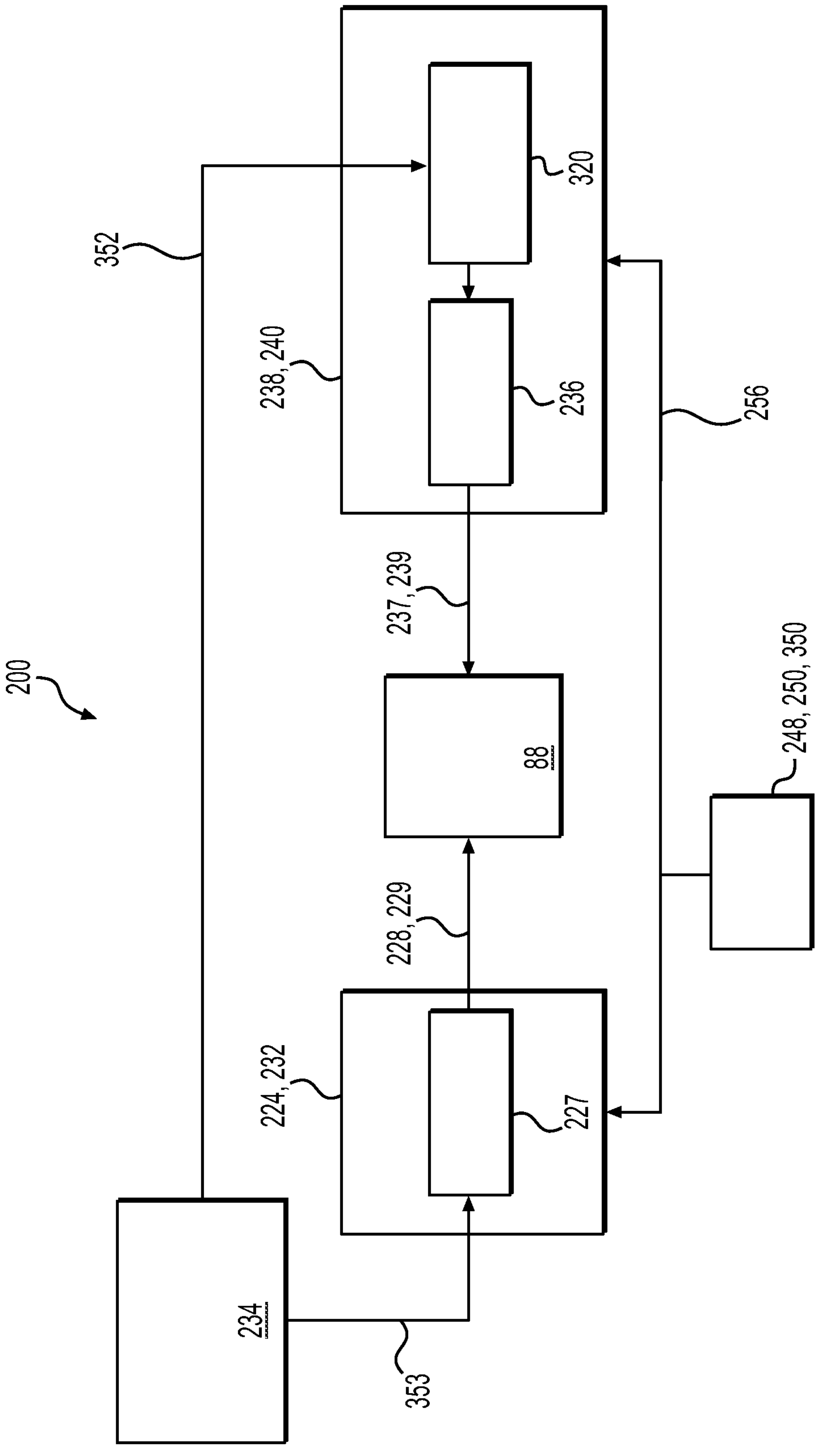
Figure 19:
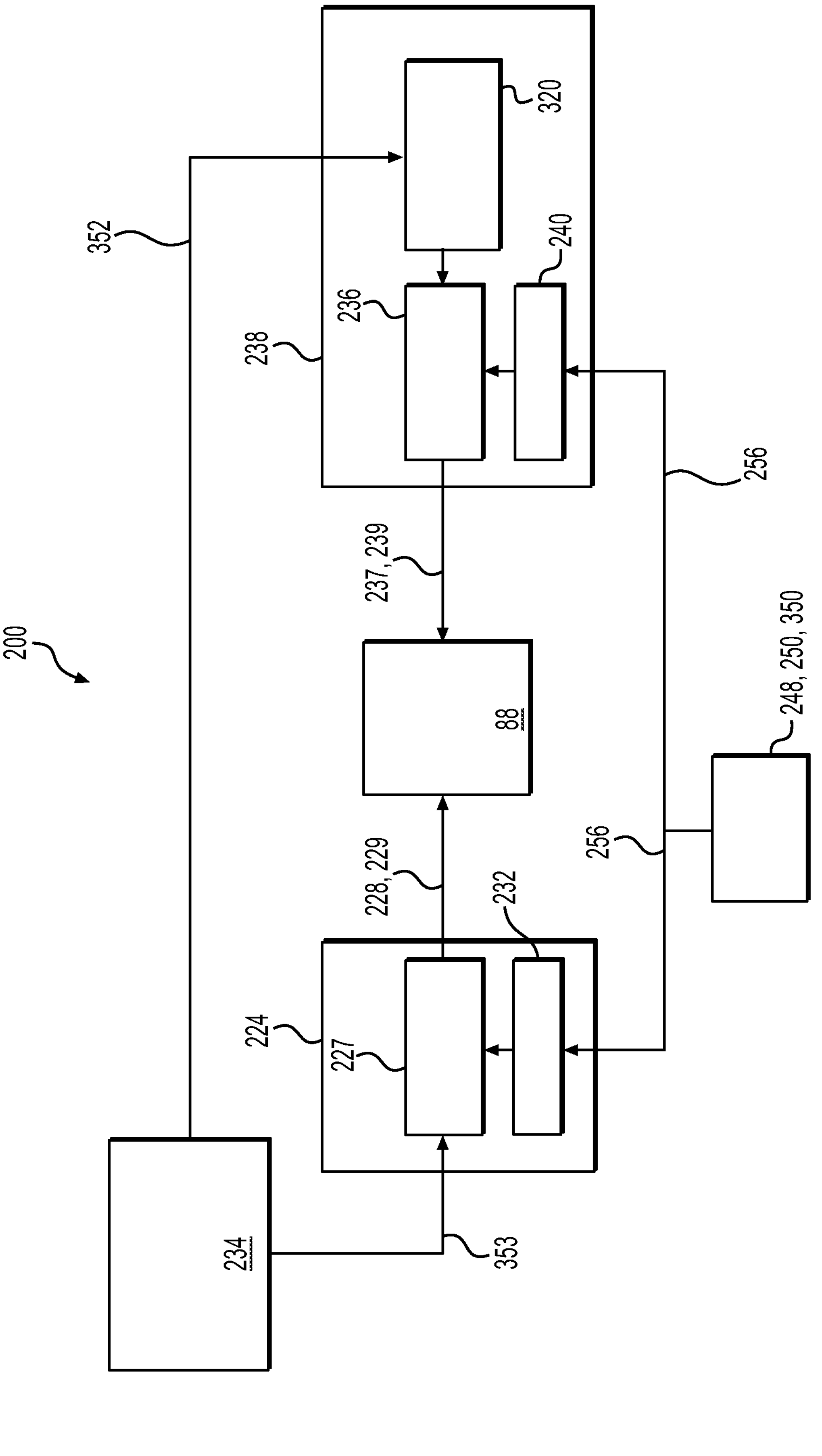
Figure 20:
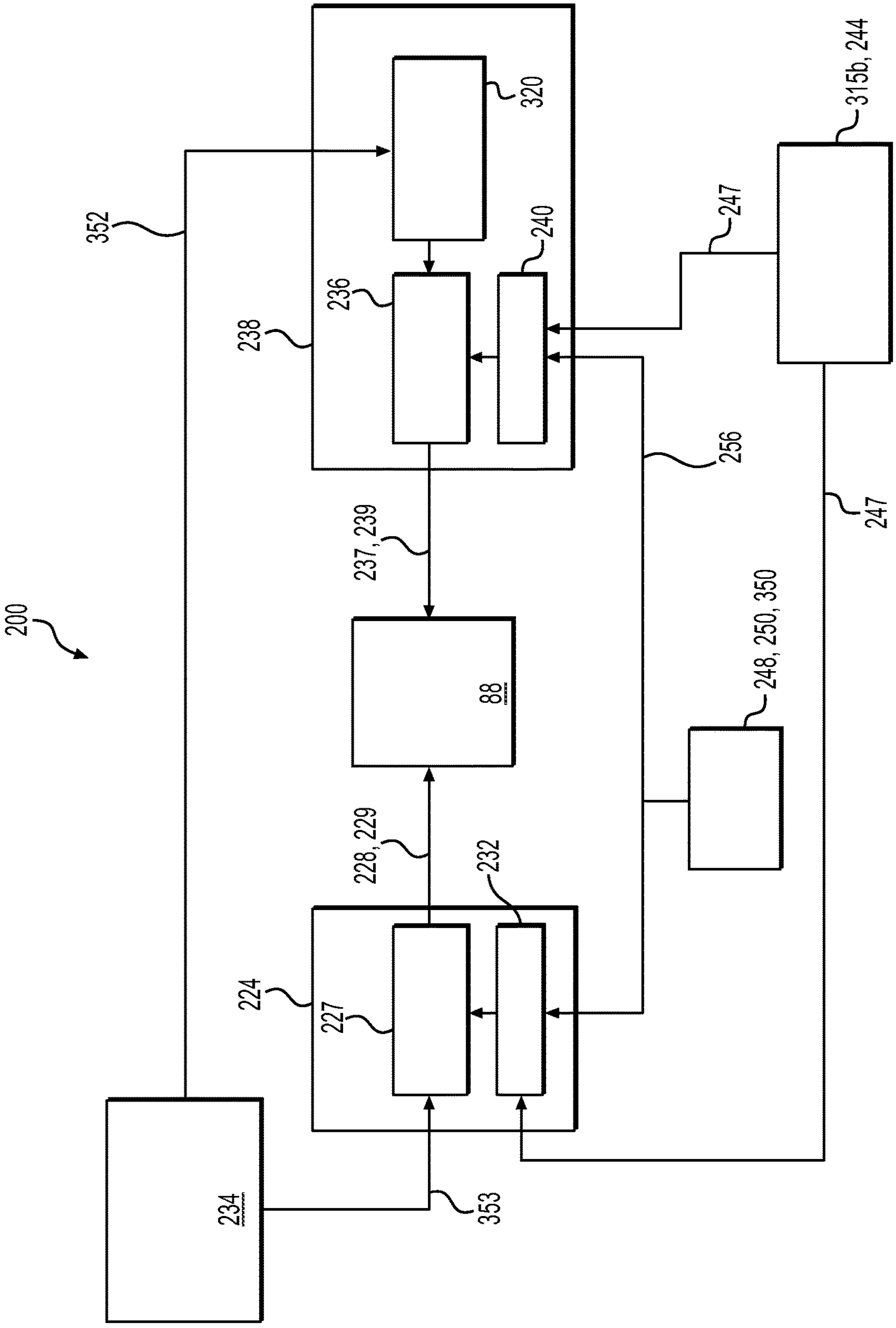

FIGS. 15-21 show additional block diagrams of the system 200. While the inside and outside switches 248, 250 can comprise a user interface 350 for providing the door open signal 256. It should be appreciated that the user interface 350 can, for example, include various other components, such as, but not limited to a key fob and/or other control switches or buttons on the door 226 or elsewhere in the motor vehicle 10. As shown in FIG. 16, the crash signal 247 is simultaneously provided to both the primary controller (e.g., door node 224) and secondary controller (e.g., latch controller 238) to allow both to coordinate control of the power release motor 88 in response to the door open signal 256 from the user interface 350. Specifically, in FIG. 17, the door open signal 256 is communicated from the user interface 350 to the primary electronic control unit 232 (i.e., door node controller) and the secondary control unit 240 (of the latch controller 238). Also, as shown in FIGS. 16-19, power and the main power voltage level from the main power source (e.g., battery 234) is provided to the backup energy source 320 via a main power voltage level line 352. Furthermore, power and the main power voltage level from the main power source (e.g., battery 234) is provided to the motor driver 227 of the door node 224 via a second main power voltage level line 353. As best shown in FIG. 20, both the primary electronic control unit 232 (i.e., door node controller) and the secondary control unit 240 are coupled directly to the crash sensor 315_b_ or coupled to the BCM 244 to receive the crash signal 247. In addition, main power voltage level line 352 connects to the secondary control unit

Figure 21:
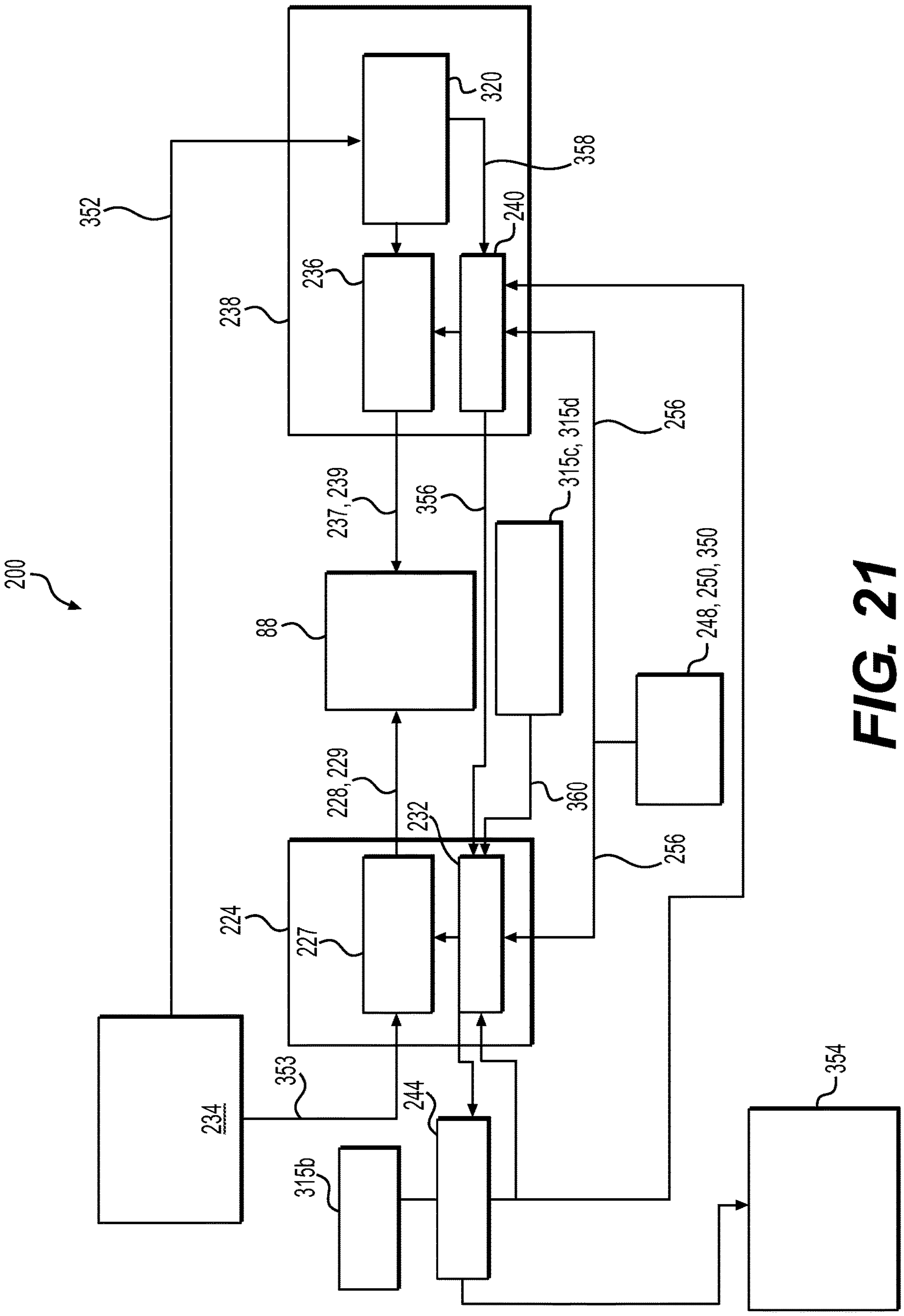

240 to receive power and the main power voltage level. FIG. 21 additionally shows the BCM 244 in communication with the primary electronic control unit 232 (i.e., door node controller). The BCM is additionally coupled to a user warning device 354 to have the closure latch assembly 18 serviced (e.g., warning light on instrument panel or digital readout) based on latch diagnostic information 355 communicated from the primary electronic control unit 232. In more detail, the primary electronic control unit 232 receives a backup energy status from the secondary control unit 240 (of the latch controller 238) via a latch diagnostic line 356. The secondary control unit 240 in turn receives a diagnostic status from the backup energy source 320 (e.g., from and determined by the diagnostic module 328) via a status line 358. Also, in order for the primary electronic control unit 232 to send the latch diagnostic information 355 to the BCM 244, it also receives latch status signals 360 from latch sensors (e.g., position sensors 315*d*).

Figure 22:
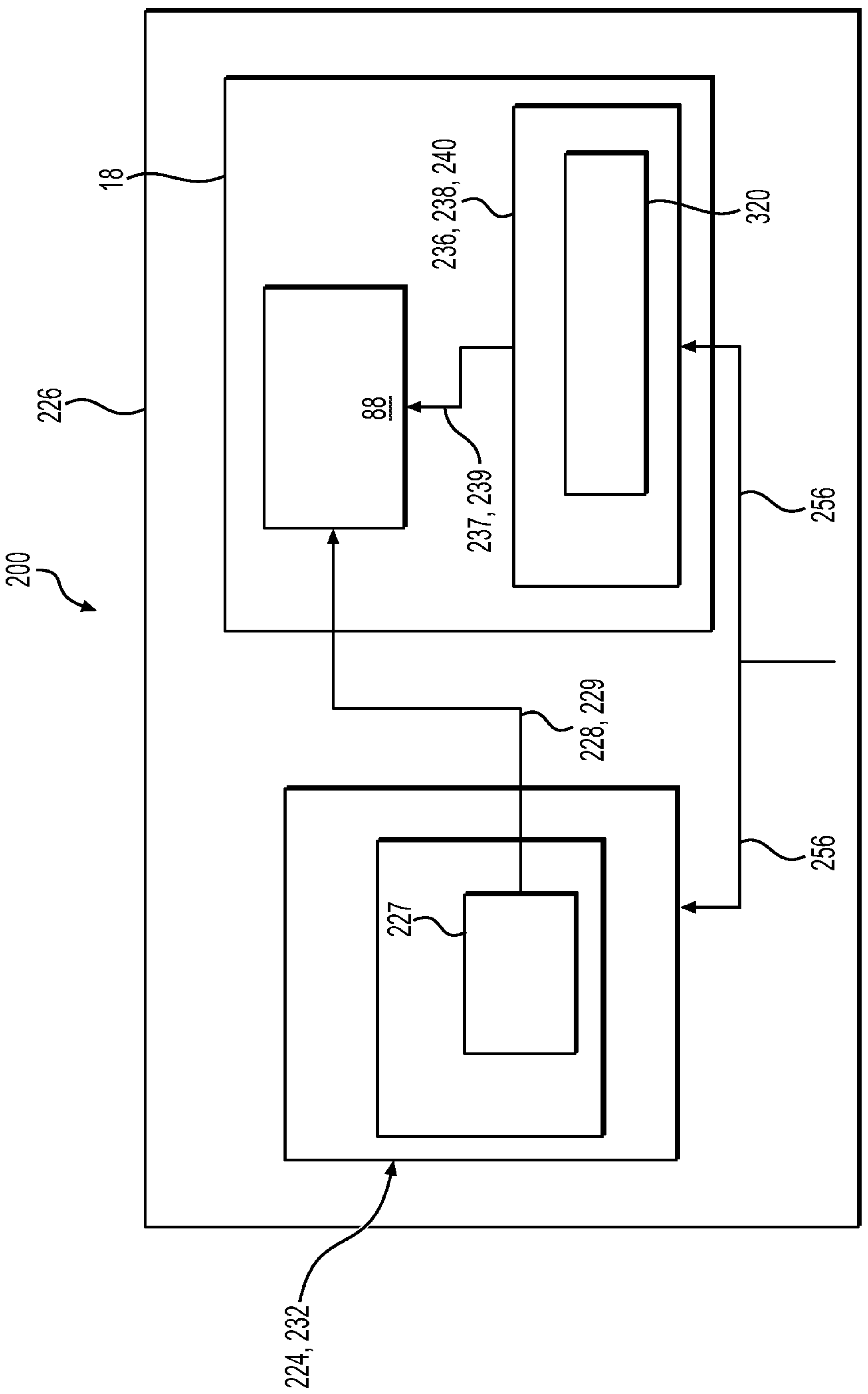
FIGS. 22-24 show block diagrams of the system on a door according to aspects of the disclosure.
Figure 23:
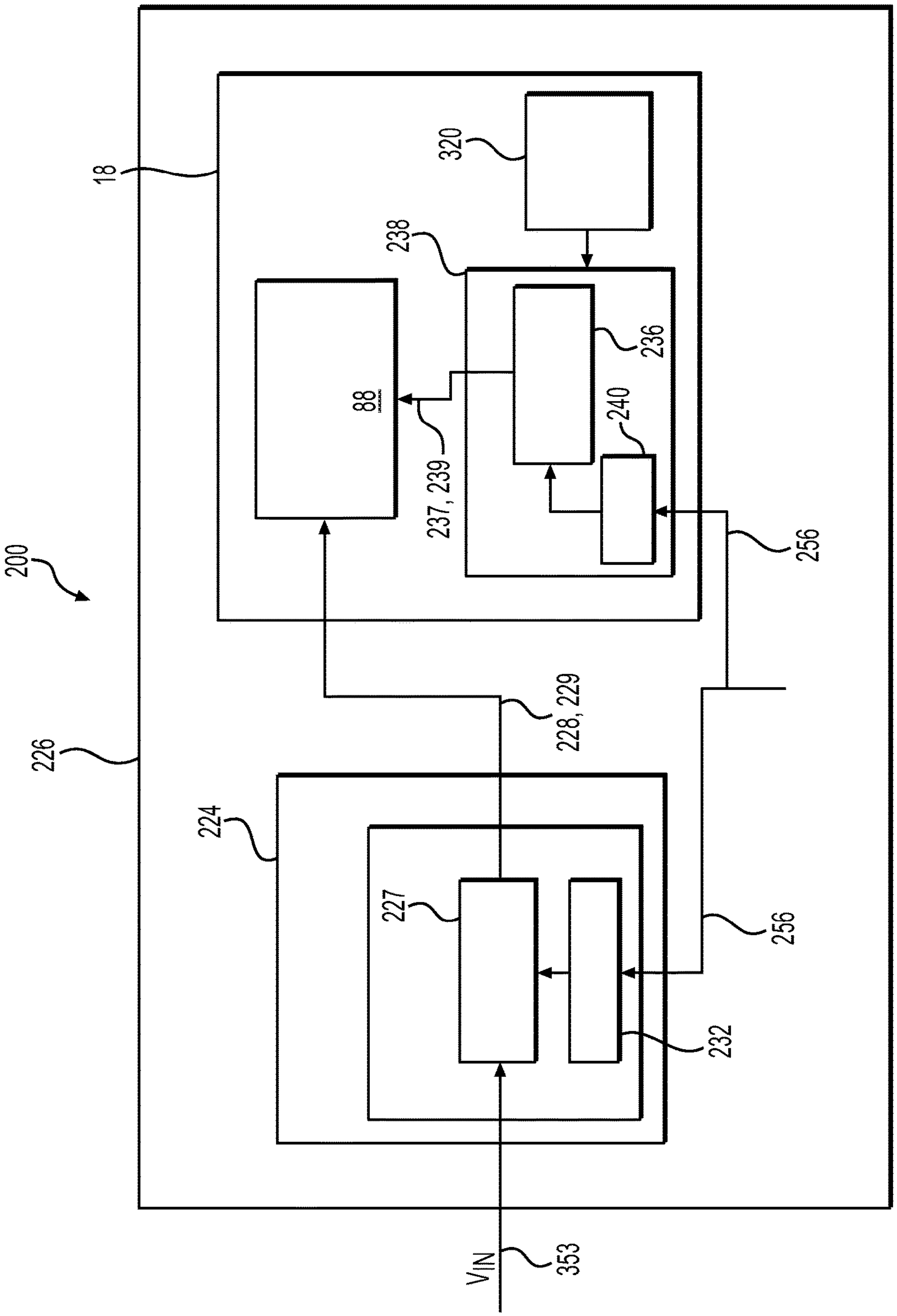
Figure 24:
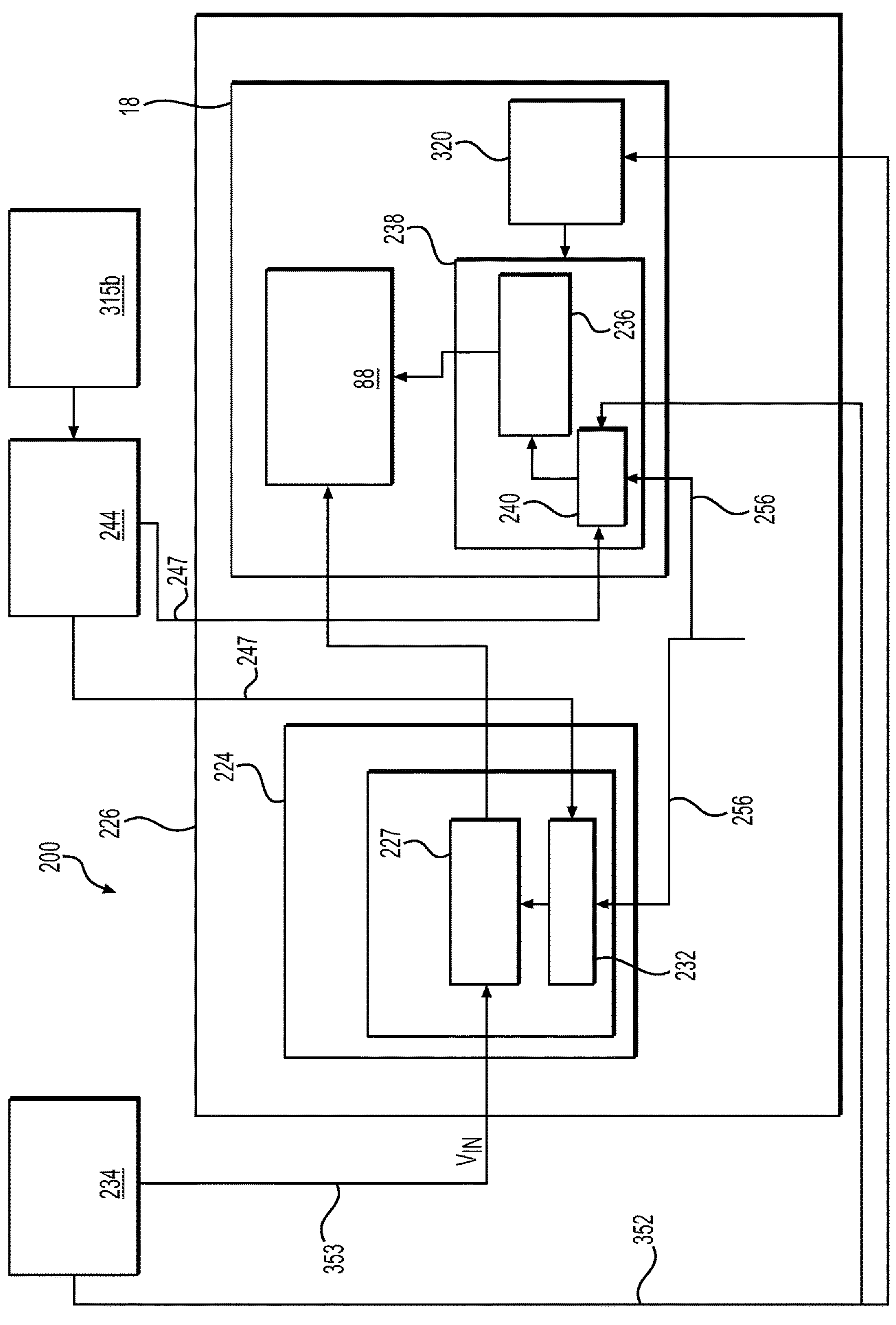

FIGS. 22-24 show block diagrams of the system 200 on a door (e.g., front passenger door 226). So, referring to FIGS. 22-24 and back to FIGS. 11-12, and 14, the door 226 includes the closure latch assembly 18 having the power release motor 88. As best shown in FIG. 23, the door 226 also includes the primary electronic control unit 232 (i.e., door node controller) electrically coupled to the power release motor 88. In addition, the door 226 includes the secondary control unit 240 (i.e., latch control) electrically coupled to the power release motor 88. The primary electronic control unit or door node controller 232 is configured to control the power release motor 88 in a normal operating mode of the closure latch assembly 18. The latch control 240 is configured to control the power release motor 88 in an emergency mode of the closure latch assembly 18. FIG. 24 shows that the main power source (e.g., battery 234) provides voltage Vin to the primary motor driver 227 as well as to the secondary control unit or latch control 240 and backup energy source 320. In addition, the BCM 244 is coupled to the crash sensors 315*b* and provides the crash signal 247 to both the primary electronic control unit 232 (i.e., door node controller) and the secondary control unit 240.

Figure 25:
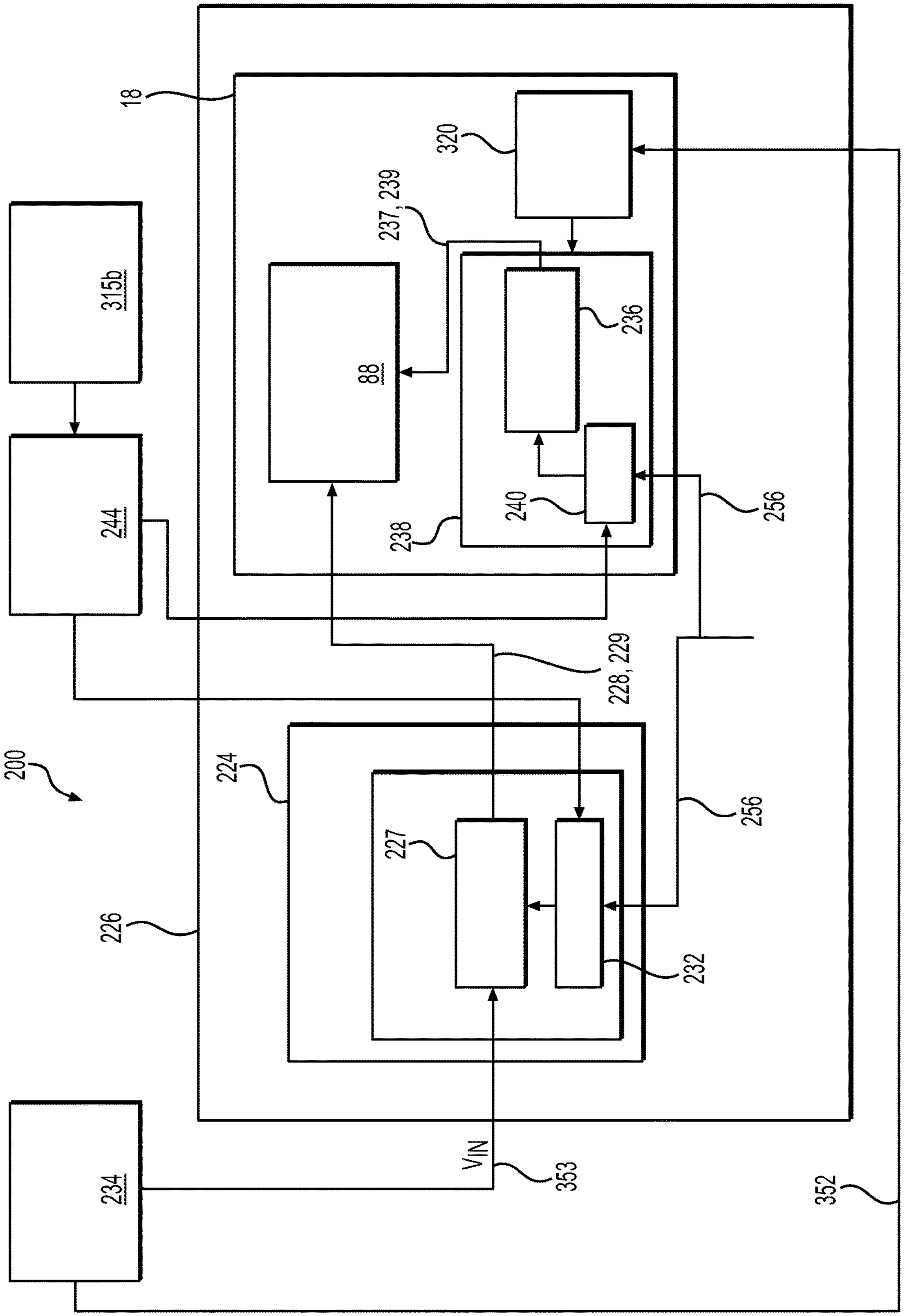
FIG. 25 shows the system in operation in a normal mode of the closure latch assembly according to aspects of the disclosure.

FIG. 25 shows the system 200 in operation in a normal mode of the closure latch assembly 18. The power source (e.g., battery 234) provides power to the primary motor driver 227. Consequently, the primary motor driver 227 can provide the primary control signals 228 to the power release motor 88 (using the primary motor driver 227) via primary release motor driving line 229 in response to the door node controller 232 receiving the door open signal 256. While the secondary control unit 240 also receives the door open signal 256, the secondary control unit 240 ignores the door open signal 256, since the power levels from the battery 234 are normal and no crash signal 247 is sent from the BCM 244.

Figure 26:
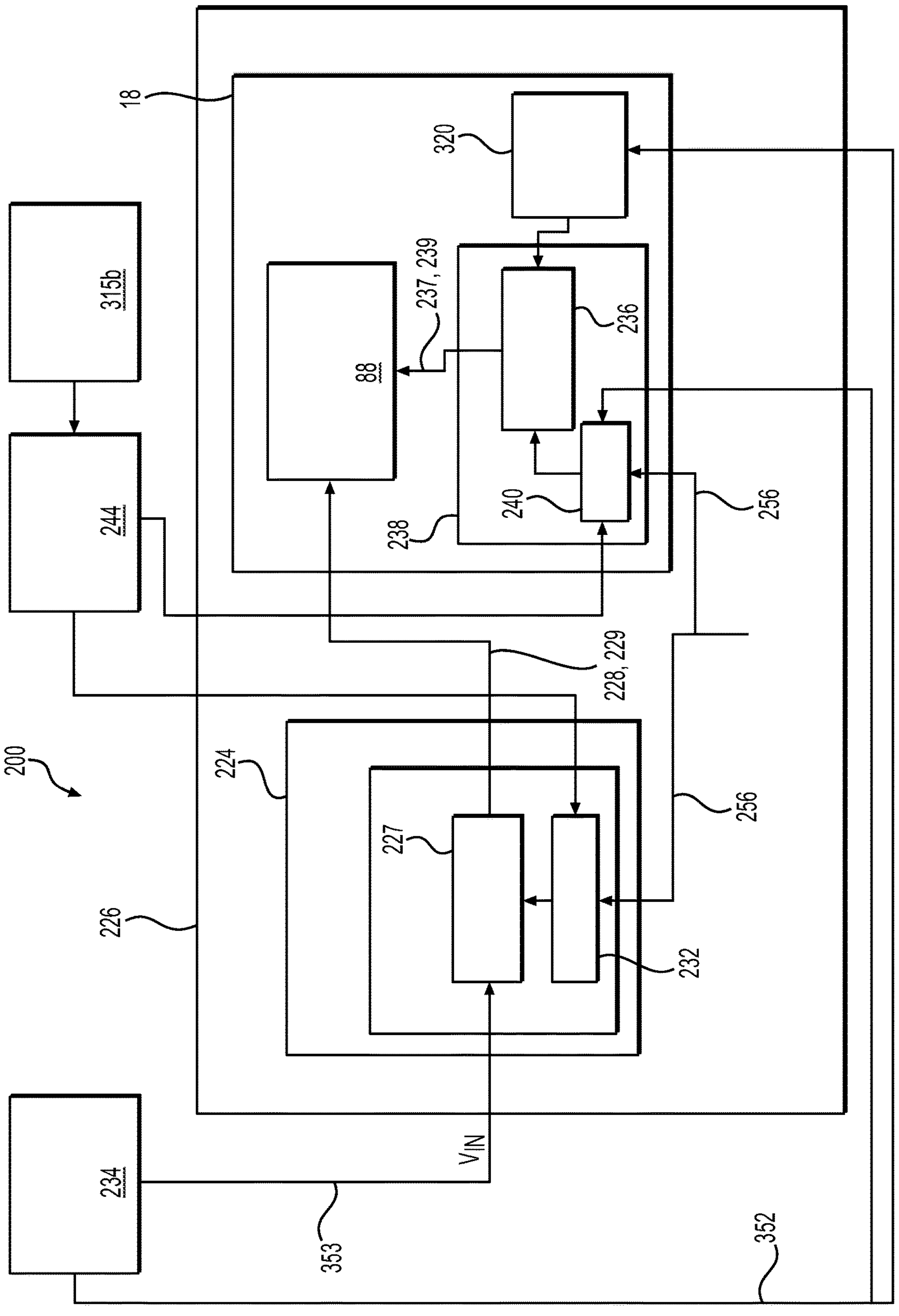
FIG. 26 shows the system in operation in an emergency mode of the closure latch assembly with power loss to the door node according to aspects of the disclosure.

FIG. 26 shows the system 200 in operation in an emergency mode of the closure latch assembly 18 with power loss to the door node 224. While the power source (e.g., battery 234) provides power to the primary motor driver 227, it is less than an expected voltage level or disconnected (i.e., under voltage condition). Therefore, the primary motor driver 227 cannot provide the primary control signals 228 to the power release motor 88 (using the primary motor driver 227) via primary release motor driving line 229 in response to the door node controller 232 receiving the door open signal 256. In more detail, the door node controller 232 cannot act on the door open signal 256, since it is not powered. However, the secondary control unit 240 also receives the door open signal 256, so the secondary control unit 240 acts based on the door open signal 256, since the power levels from the battery 234 are not normal and/or the crash signal 247 is sent from the BCM 244.

Figure 27:
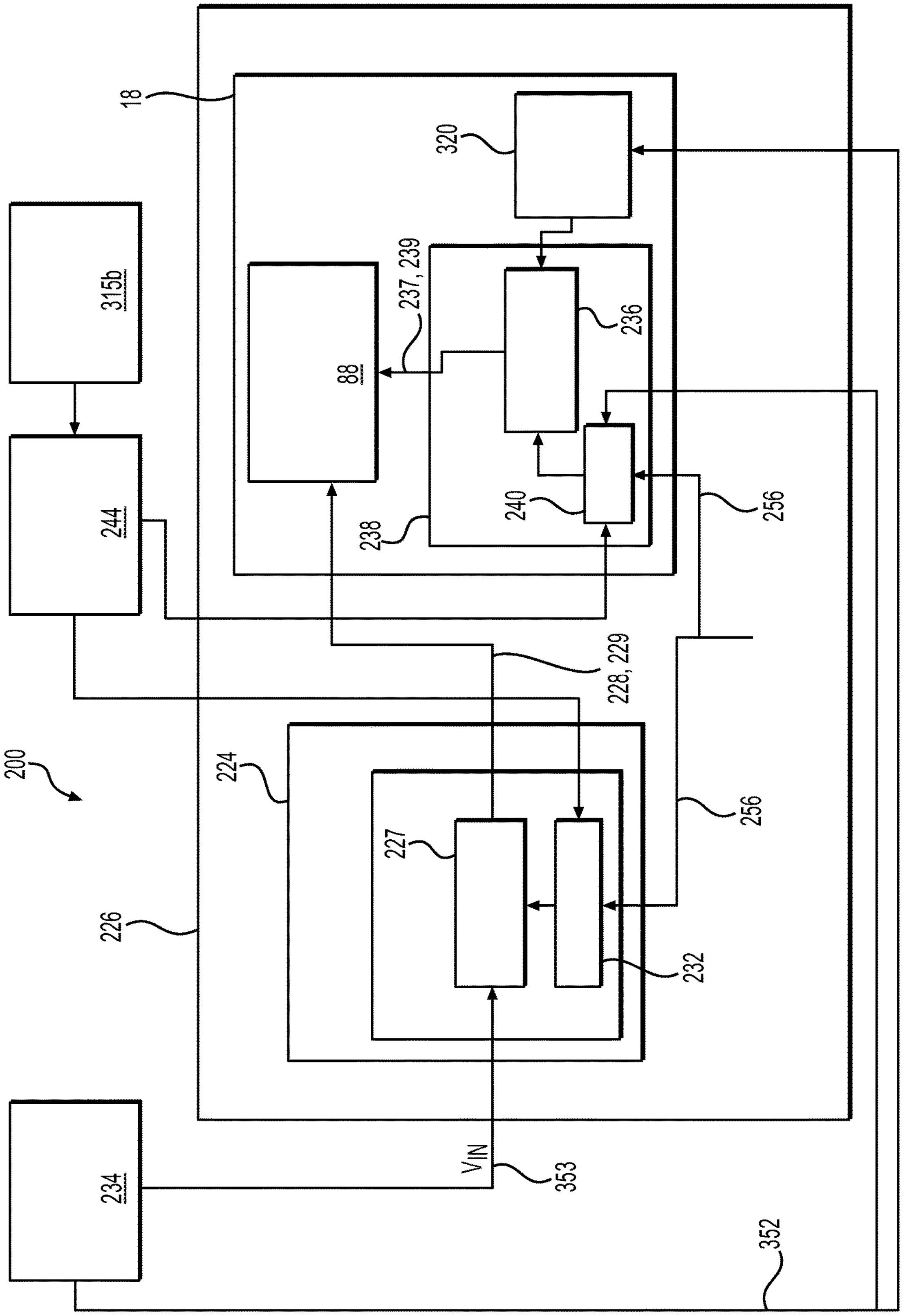
FIG. 27 shows the system in operation in an emergency mode of the closure latch assembly with no power loss to the door node according to aspects of the disclosure.

FIG. 27 shows the system 200 in operation in an emergency mode of the closure latch assembly 18 with no power loss to the door node 224. The power source (e.g., battery 234) provides power to the primary motor driver 227, it is not less than an expected voltage level or disconnected (i.e., under voltage condition). So, the primary motor driver 227 can still provide the primary control signals 228 to the power release motor 88 (using the primary motor driver 227) via primary release motor driving line 229 in response to the door node controller 232 receiving the door open signal 256. The door node controller 232 can act on the door open signal 256, since it remains powered. While the secondary control unit 240 also receives the door open signal 256, the secondary control unit 240 knows not to drive the power release motor 88, since the power levels from the battery 234 are normal even though the crash signal 247 is sent from the BCM 244.

Figure 28:
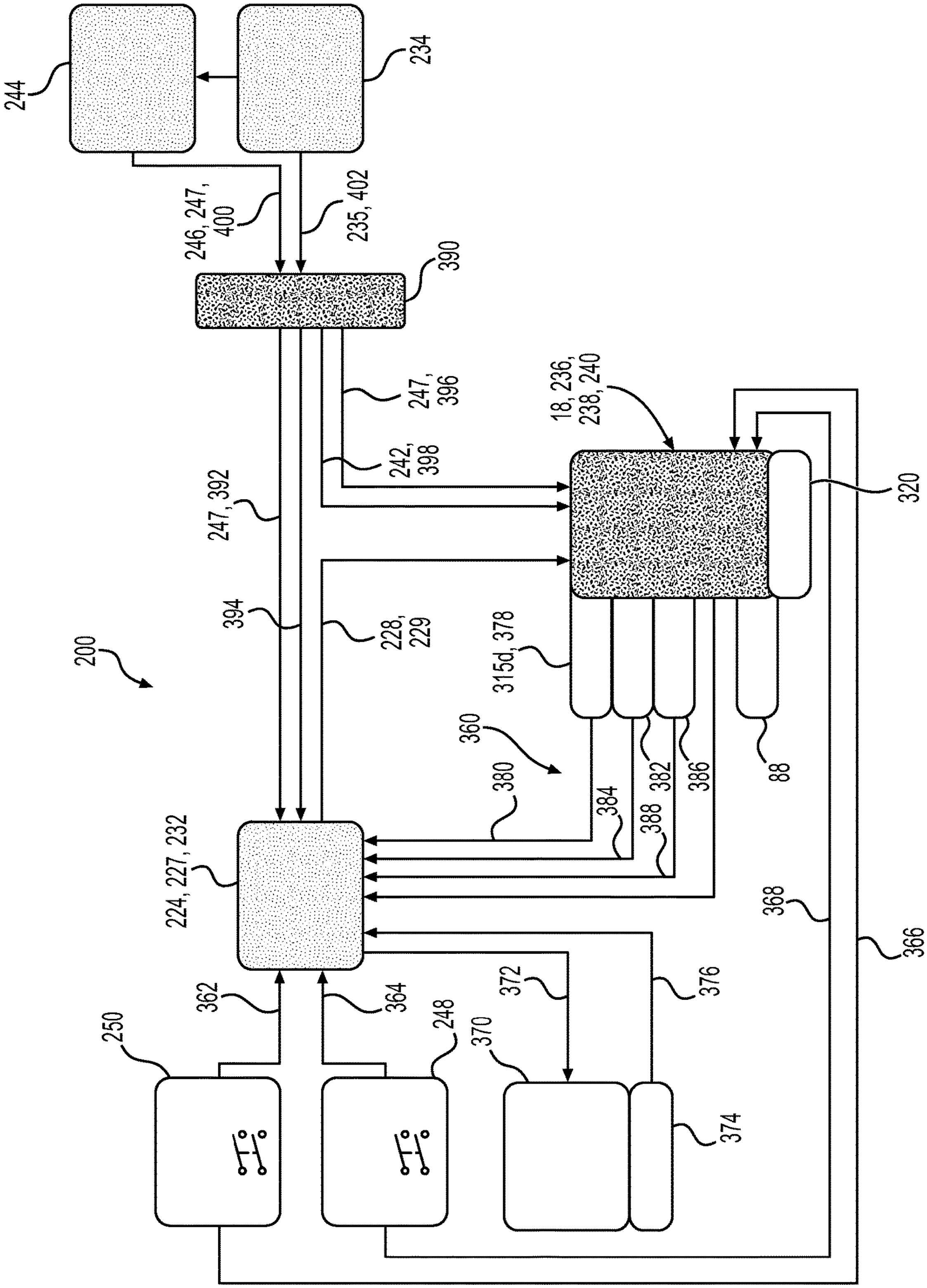
FIG. 28 shows another block diagram of the system including additional details regarding wiring according to aspects of the disclosure.

FIG. 28 shows another block diagram of the system 200 including additional details regarding wiring. The inside and outside switches 248, 250 respectively associated with first inside and outside handles 252, 254 of the front passenger door 226 are shown coupled to the door node 224 using an outside switch to door node line 362 to carry a tag signal and an inside switch to door node line 364 to carry a tig signal. The inside and outside switches 248, 250 are also coupled to the closure latch assembly 18 via an outside switch to latch line 366 to carry an emergency tag signal and an inside switch to latch line 368 to carry an emergency tig signal. The system 200 also includes a cinching actuator 370 coupled to the door node 224 via a cinch motor driving line 372 for cinching the first passenger door 226 to the vehicle body 12 of the motor vehicle 10. The cinching actuator 370 may be included with (not shown) or separate from the closure latch assembly 18 (as shown in FIG. 28). The system 200 also includes a cinching actuator home switch 374 coupled to the door node 224 via a cinch home signal line 376. The primary electronic control unit 232 receives latch status signals 360 from latch sensors of the closure latch assembly 18, such as pawl switch 378 (e.g., position sensors 315*d*) via pawl signal line 380, door ajar switch 382 via door ajar signal line 384, reset switch 386 via reset signal line 388 and backup energy status, for example, from the secondary control unit 240 (of the latch controller 238) via the latch diagnostic line 356. As discussed, the primary controller (e.g., door node 224) is configured to supply primary control signals 228 to the power release motor 88 (using the primary motor driver 227) via the primary release motor driving line 229.

The system also includes a door to body unit 390 coupled to the door node 224 via a door to body unit to door node crash line 392 to carry the crash signal 247. The door to body unit 390 is also coupled to the door node 224 via a door to body unit to door node power line 394 to carry the power from the main power source (e.g., battery 234). Similarly, the door to body unit 390 is coupled to the closure latch assembly 18 via a door to body unit to latch crash line 396 to carry the crash signal 247. The door to body unit 390 is also coupled to the closure latch assembly 18 via a door to body unit to latch power line 398 to carry the power from the main power source (e.g., battery 234). The door to body unit 390 is coupled to the BCM 224 via a BCM to door to body unit line 400 to carry the crash signal 247 from the BCM 244. The door to body unit 390 is also coupled to the main power source or battery 234 via a power to door to body unit line 402 to carry the power from the power source or battery 234.

Figure 29:
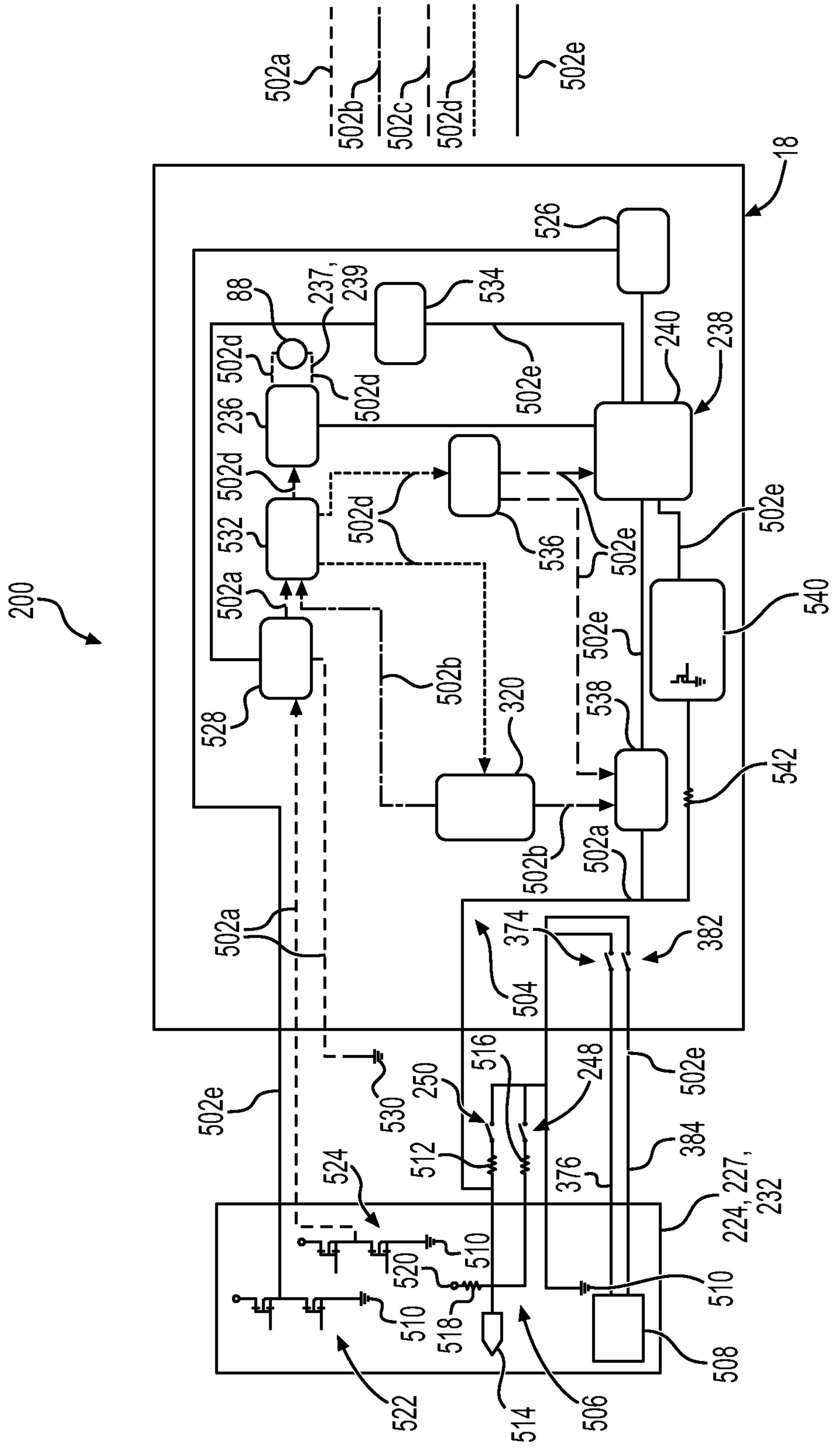
FIG. 29 shows the system including the closure latch assembly, the door node, and inside and outside switches according to aspects of the disclosure.

FIG. 29 shows the system 200 with the closure latch assembly 18 and the door node 224 for controlling the closure latch assembly 18. Vehicle battery power connections are labeled as 502*a*, backup power connections are labeled as 502*b*, signal power supply connections are labeled as 502*c*, vehicle battery or boost output connections are labeled as 502*d* and signal lines are labeled as 502*e*. A first door release switch circuit 504 is electrically connected to the closure latch assembly 18. Similarly, a second door release switch circuit 506 is electrically connected to the door node 224. The door system 200 further includes the inside switch 248 associated with the inside handle 252 of the door 226 and the outside switch 250 associated with the outside handle 254 of the door 226. The inside switch 248 and the outside switch 250 are each coupled to the first door release switch circuit 504 and the second door release switch circuit 506. In addition, the closure latch assembly 18 has the backup energy source 320 for use in an emergency condition. The door node 224 is electrically coupled to the closure latch assembly 18 for controlling the closure latch assembly 18 in a normal condition. In other words, the closure latch assembly 18 is a slave of the door node 224 and receives the power release command or release command from the door node 224 during the normal condition. Yet, when during an emergency condition (no power or crash), the closure latch assembly 18 shall directly read the release switches (i.e., the inside switch 248 and the outside switch 250) through the first door release switch circuit 504.

The door node 224 includes a latch reading circuit 508 connected to the cinching actuator home switch 374 via the cinch home signal line 376. The latch reading circuit 508 is coupled to the door ajar switch 382 via door ajar signal line 384. Both the door ajar switch 382 and the cinching actuator home switch 374 connect to a door node ground 510 of the door node 224. An input terminal of the outside switch 250 connects through an outside switch reading resistor 512 to an analog to digital input 514 of the door node 224. An output terminal of the outside switch 250 also connects to the door node ground 510. An input terminal of the inside switch 248 connects through an inside switch reading resistor 516 and switch pull up resistor 518 to a battery node 520 and the analog to digital input 514 of the door node 224. The outside switch reading resistor 512 also connects to the battery node 520 of the door node 224 through the switch pull up resistor 518. An output terminal of the inside switch 248 also connects to the door node ground 510.

The door node 224 also includes a two pairs of transistors 522, 524. From a central tap of one of the pairs of transistors 522, a signal line 502*e* connects to the secondary electronic control unit 240 (latch controller 238) of the closure latch assembly 18 through a data input circuit 526 for data input. From a central tap of another of the pairs of transistors 524, a vehicle battery power connection 502*a* connects to a battery input circuit 528 of the closure latch assembly 18. The battery input circuit 528 is connected through another vehicle battery power connection 502*a* to a vehicle ground 530, to a power supply selector circuit 532 of the closure latch assembly 18, to the backup energy source 320 through a backup power connection 502*b*, and to the secondary electronic control unit 240 through a signal line 502*e* and through a battery reading circuit 534. The power supply selector circuit 532 also connects to the secondary motor driver 236, the backup energy source 320, and an ECU power management circuit 536 through separate vehicle battery or boost output connections 502*d*. The ECU power management circuit 536 then connects to the secondary electronic control unit 240 and a release switch reading circuit 538 of the closure latch assembly 18 through signal power supply connections 502*c*. The release switch reading circuit 538 additionally connects to the backup energy source 320 through a backup power connection 502*b* and to the outside switch 250 and the secondary electronic control unit 240 via signal lines 502*e*. The secondary electronic control unit 240 also connects to both the outside switch 250 and the release switch reading circuit 538 through a signal line 502*e*, a data output circuit 540 and a data output resistor 542.

So, the first door release switch circuit 504 includes one or more signal lines 502*e* coupled to the inside and outside switches 248, 250 and the release switch reading circuit 538. The second door release switch circuit 506 includes one or more signal lines 502*e*. The outside and inside switch reading resistors 512, 516 are coupled to the inside and outside switches 248, 250, the door node ground 510, the analog to digital input 514 of the door node 224, the switch pull up resistor 518 and the battery node 520 of the door node 224.

Figure 30A:
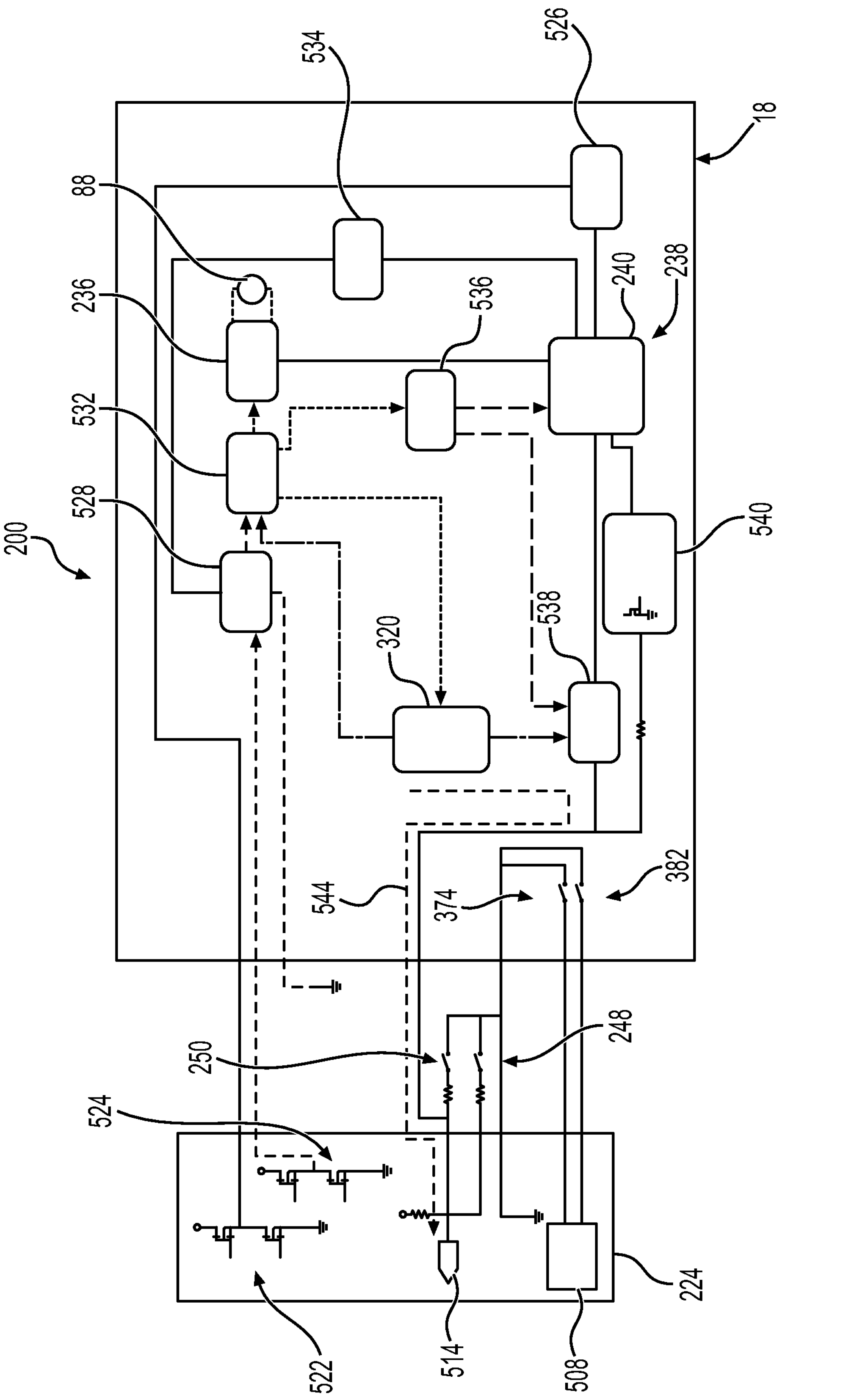
FIGS. 30A-30B show a possible leakage path of the system while door node is not powered according to aspects of the disclosure.
Figure 30B:
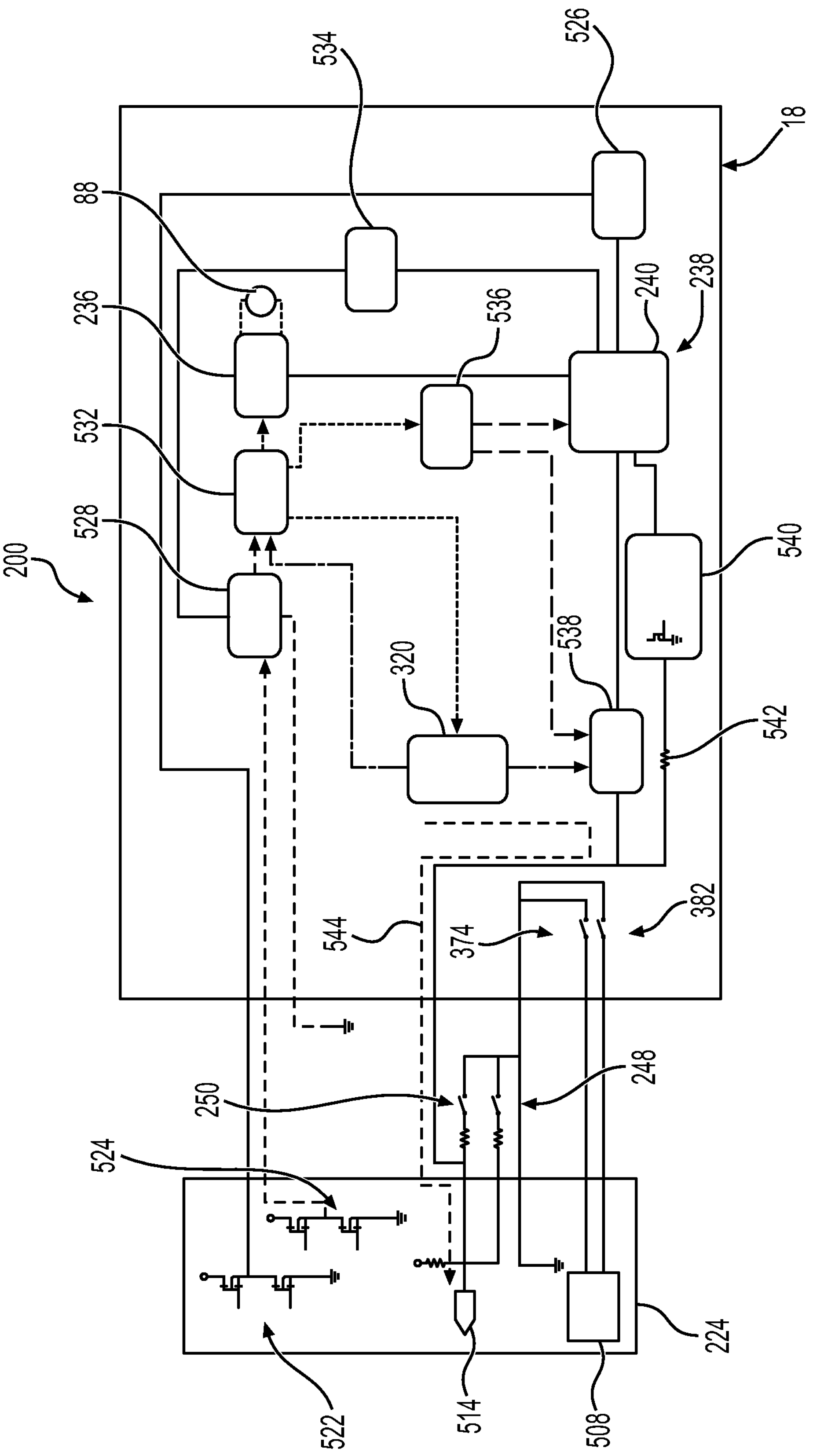

FIGS. 30A-30B show a possible leakage path 544 of the system 200 show a possible leakage path of the system while the door node 224 is not powered according to aspects of the disclosure. Specifically, the possible leakage path 544 is from the backup energy source 320 and through the door node 224 when the door node 224 is not powered. In order to reduce the leakage path 544, switch pull up resistor 518 can be selected to be higher than 47 kΩ to guarantee performance of the power release function after 24 hrs from battery disconnection. However, a high pull up value could impact the capability to detect which switch 248, 250 is activated (necessary i.e. to avoid opening from outside if the closure latch assembly 18 is locked or in lock status). In case one of the inside and outside switches 248, 250 is stuck active (i.e., switched on), it is not possible to switch off the backup energy source 320. Therefore, it is not possible to guarantee performance of the power release function after 24 hrs from battery disconnection.

Figure 31:
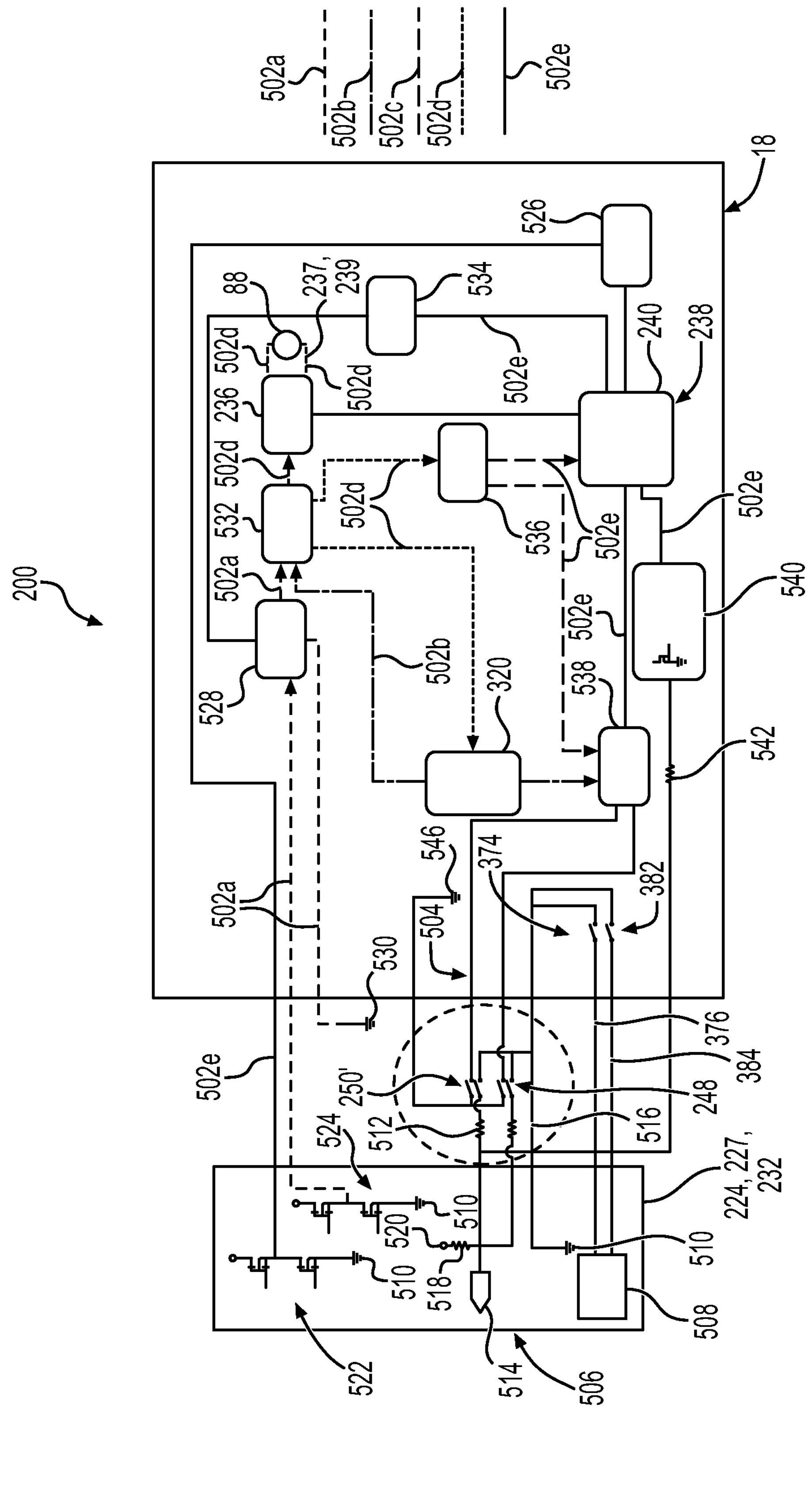
FIG. 31 shows the system including the closure latch assembly, the door node, and alternative inside and outside switches according to aspects of the disclosure.
Figure 32:
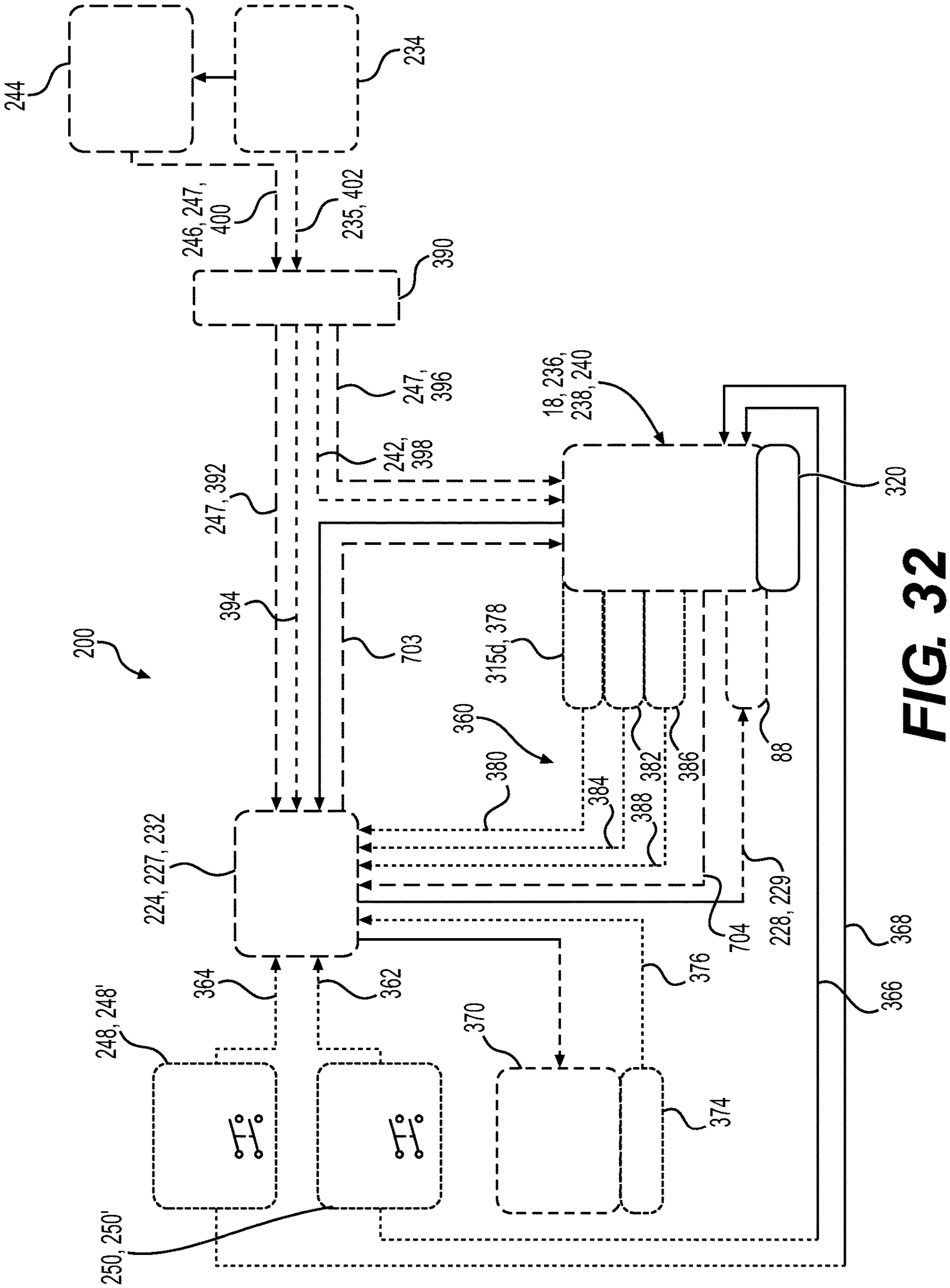
FIG. 32 shows a further block diagram of the system similar to that shown in FIG. 28 according to aspects of the disclosure.

FIG. 31 shows the system including the closure latch assembly, the door node, and with alternative inside and outside switches according to aspects of the disclosure. As in FIG. 29, the inside switch 248 and the outside switch 250 are each coupled to the first door release switch circuit 504 and the second door release switch circuit 506, respectively. However, instead of each being single pole single throw switches, the inside switch 248' and the outside switch 250' are each double pole single throw switches to electrically isolate the first door release circuit 504 from the second door release switch circuit 506. One of the input terminals of each of the inside switch 248' and the outside switch 250' is connected to a closure latch ground 546 of the closure latch assembly 18 (i.e., now part of the second door release switch circuit 506). Another of the input terminals of the outside switch 250' connects to the outside switch reading resistor 512. Similarly, another of the input terminals of the inside switch 248' connects to the inside switch reading resistor 516. One of the output terminals of each of the inside switch 248' and the outside switch 250' is connected to the door node ground 510 and the other output terminal of each is connected to the release switch reading circuit 538 of the closure latch assembly 18. Consequently, electricity flowing in the first door release switch circuit 504 does not flow in the second door release switch circuit 506. While the door node 224 is electrically coupled to the closure latch assembly 18 for controlling the closure latch assembly 18 in a normal condition as shown in FIG. 29, the door node 224 and the closure latch assembly 18 are electrically isolated to prevent the flow of electricity from the backup energy source 320 to the door node 224 during the emergency condition. The inside switch 248' and the outside switch 250' may also be provided with or without additional diagnosis capabilities based on application requirements and safety analysis. In more detail, one contact or input terminal of each of the inside switch 248' and the outside switch 250' is dedicated to the door node 224 and one contact or output terminal of each of the inside switch 248' and the outside switch 250' is dedicated to the closure latch assembly 18. Thus, issues related to reading discussed above and energy leakage from the backup energy source 320 is avoided. In addition, three additional pins in the connector of the closure latch assembly 18 and a change in the wiring harness are avoided.

FIGS. 32-40 show further block diagrams of the system 200 showing operation of the system 200 in the normal condition and the emergency condition. Specifically, in FIG. 32, the door system 200 is shown is almost identical to that shown in FIG. 28, however, some changes are shown. Again, the closure latch assembly 18 selectively secures the door 226 and includes the latch controller 238 and has the backup energy source 320 for use in an emergency condition. The door node 224 is electrically coupled to the closure latch assembly 18 and has the door node controller 232 configured to control the closure latch assembly 18 in both a normal condition and in the emergency condition. The closure latch assembly 18 is powered by the main power source 234 in the normal condition and is configured to supply power to the door node 224 from the backup energy source 320 during the emergency condition. The inside and outside switches 248, 248', 250, and 250' (associated with the inside handle 252 and the outside handle 254 of the door 226) are coupled to the door node 224 via the inside switch to door node line 364 to communicate an IS signal and the outside switch to door node line 362 to communicate an OS signal, respectively. The inside and outside switches 248, 248', 250, and 250' are also electrically coupled to the latch controller 238 of the closure latch assembly 18 via the outside switch to latch line 366 to carry an emergency tag signal (i.e., emergency OS signal) and an inside switch to latch line 368 to carry an emergency tig signal (i.e., emergency IS signal) and the crash signal 247 is delivered via crash line 396 to the closure latch assembly 18. So, there is a duplication of IS & OS switch lines to both the closure latch assembly 18 and the door node 224. The emergency IS and emergency OS signals cause the closure latch assembly 18 to activate the backup energy source 320 in the emergency mode.

A backup power supply active signal is delivered to the door node 224 from the closure latch assembly 18 via a backup power supply active line 702. The backup power supply active signal is used to notify the door node 224 that it is supplied with power by the backup energy source 320 as well as to notify when the supply of power from the backup energy source 320 is set to be switched off. A backup power supply active signal is communicated between the closure latch assembly 18 and the door node 224 via a backup supply active line 703. Diagnostics on the backup energy source 320 are communicated between the latch controller 238 and the door node controller 232 via a backup energy diagnostics and status data line 704. Backup energy diagnostics are also communicated between the door node controller 232 and the body control module 244 via a BCM backup energy diagnostics line 705.

As shown in operation of the door system 200 in FIGS. 33-36, the closure latch assembly 18 powered by the main power source 234 in the normal mode or condition and the latch controller 238 is configured to detect a loss of the main power source 234. The latch controller 238 is also configured to detect the crash signal 247 (e.g., from the body control module 244 in communication with the latch closure assembly 18). The latch controller 238 is also configured to detect activation of at least one of the inside switch 248, 248' and the outside switch 250, 250' by a user. The latch controller 238 prevents supply of the power from the backup energy source 320 to the door node 224 until activation of at least one of the inside switch 248, 248' and the outside switch 250, 250' is detected and at least one of the loss of the main power source 234 is detected and the crash signal 247 is received. In more detail, the closure latch assembly 18 further includes a backup energy control switch 706 coupled between the backup energy source 320 and the door node 224 and connected to and controlled by the latch controller 238 for selectively allowing and permitting the supply of power from the backup energy source 320 to the door node 224. Because power is not supplied to the door node 224 immediately when power loss is detected, but only after detection of the inside switch 248, 248' and the outside switch 250, 250', power can be conserved. The door node 224 is also powered by the main power source 234 in the normal condition and the door node controller 232 is configured to control both latch control functions 708 (i.e., door management) of the closure latch assembly 18 and non-latch related functions 710 different from the latch control functions 708 in the normal condition.

Figure 33:
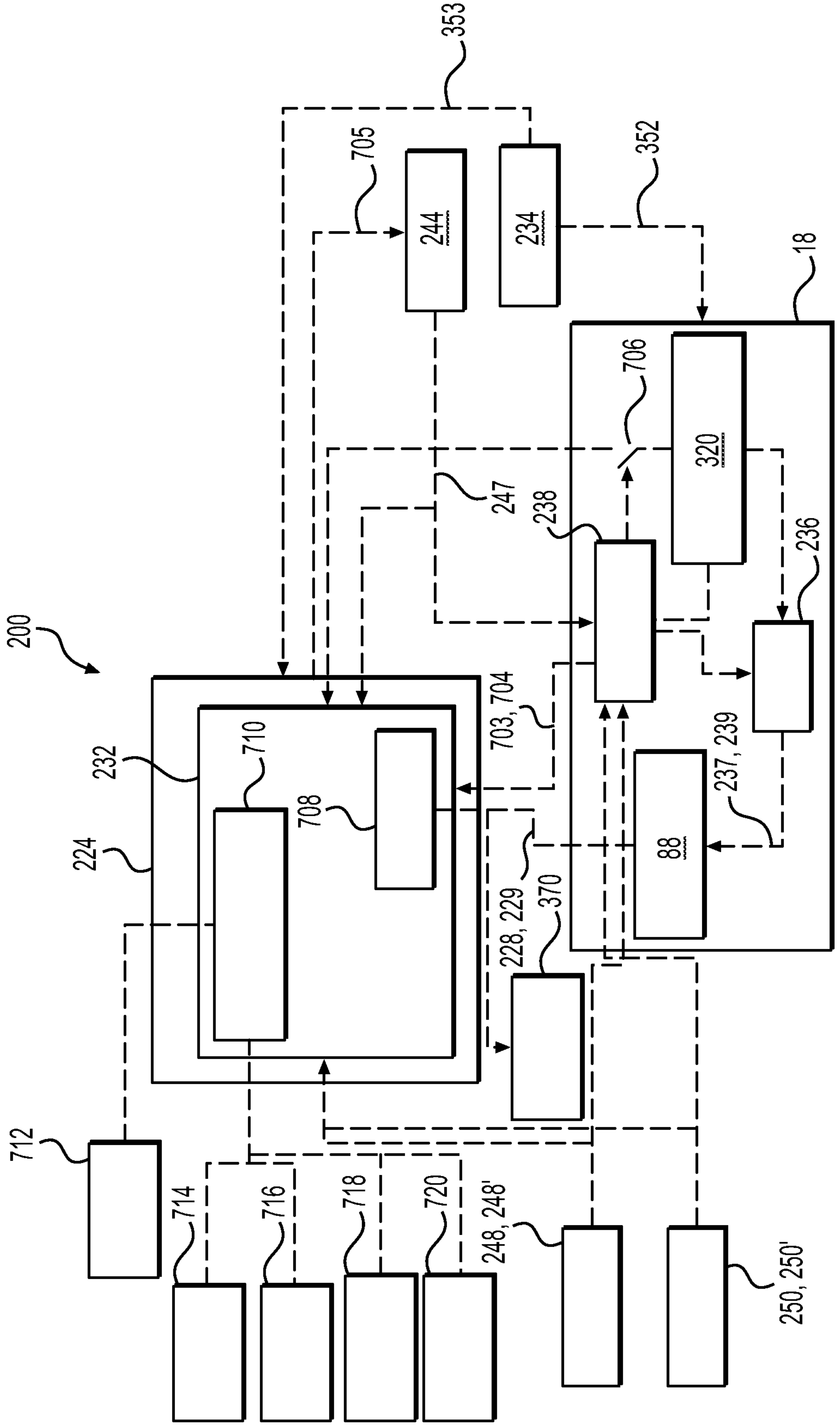
FIGS. 33-40 illustrate operation of the door system during the normal mode and emergency mode according to aspects of the disclosure.
Figure 34:
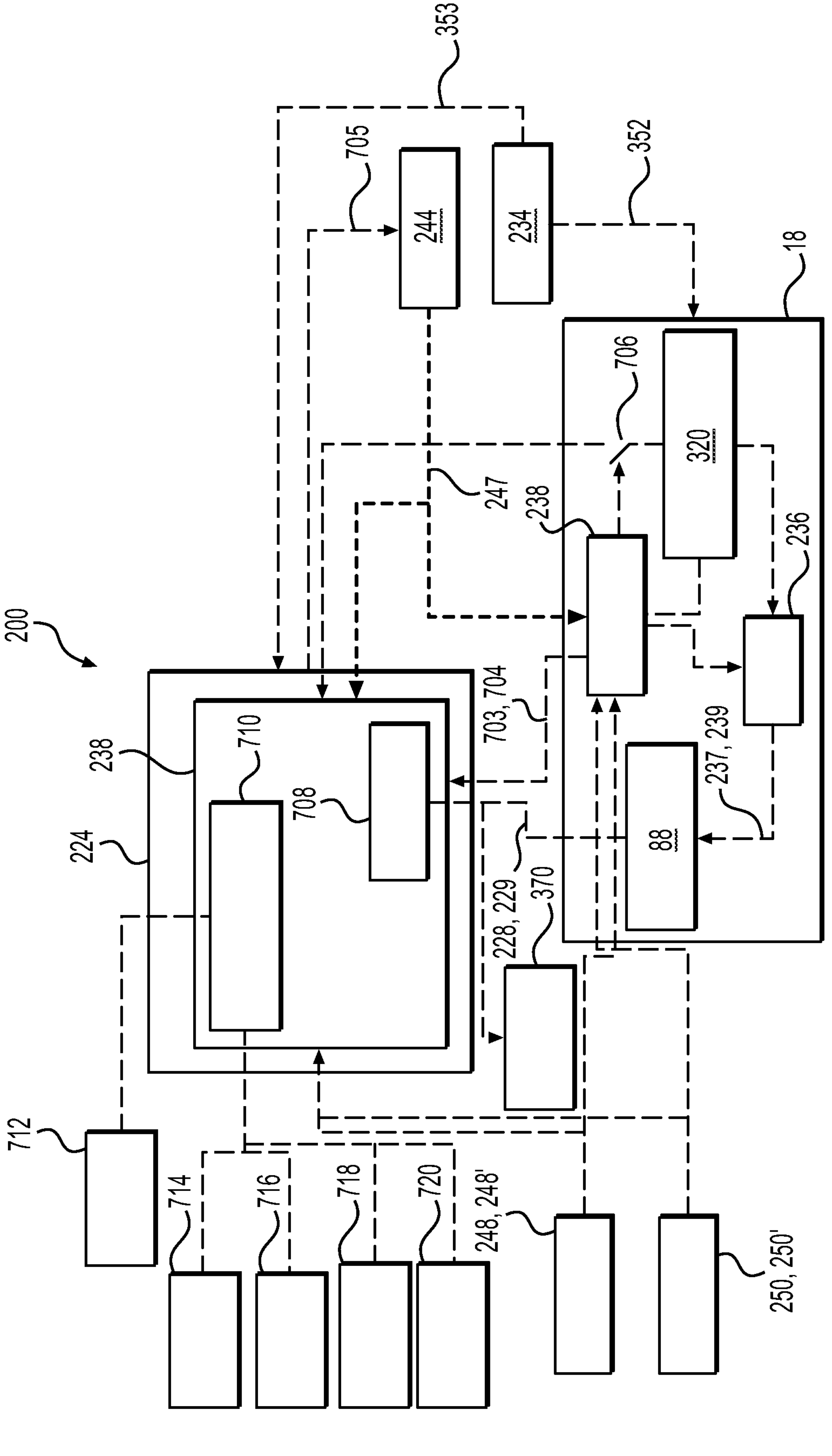
Figure 35:
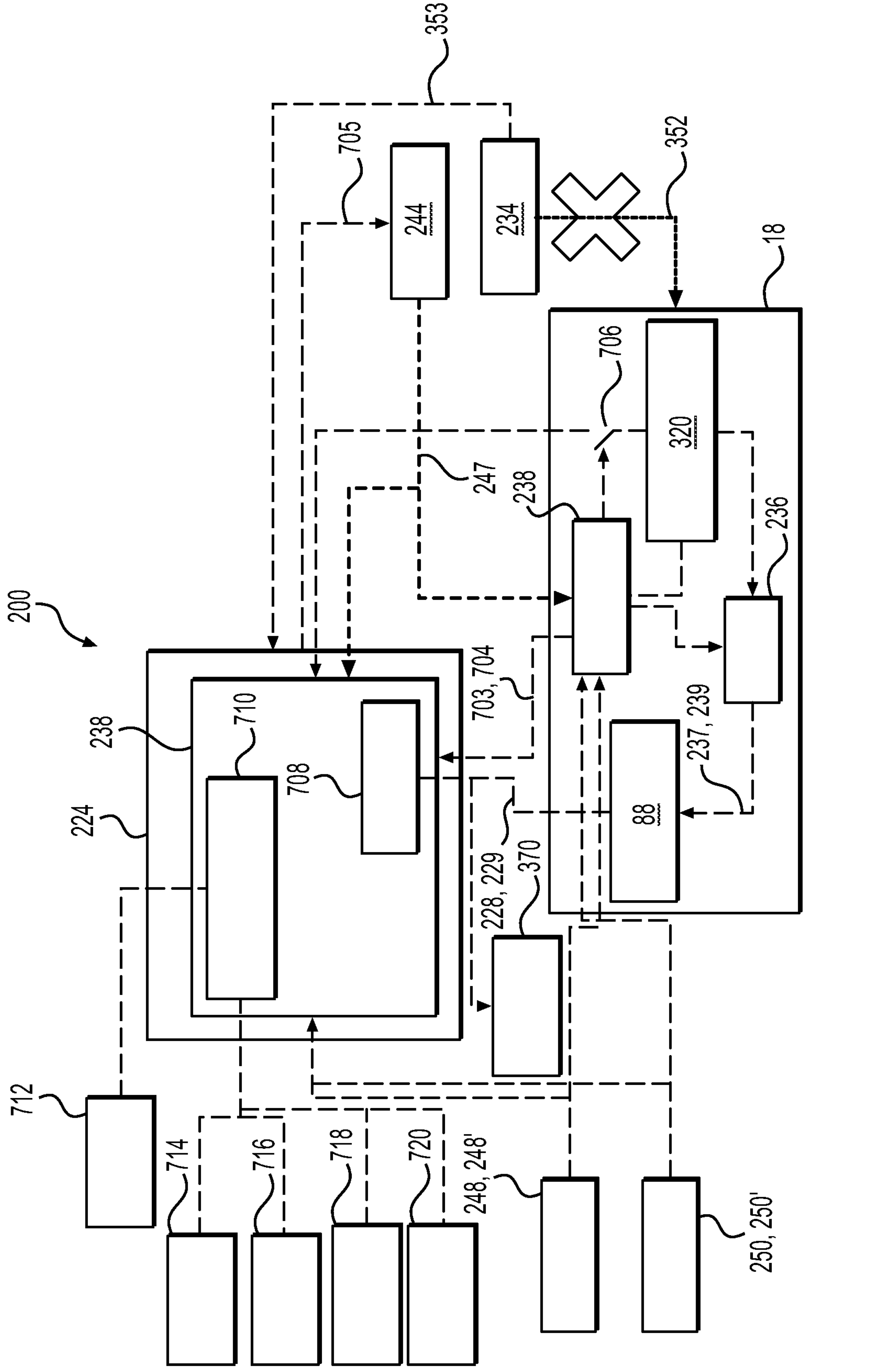
Figure 36:
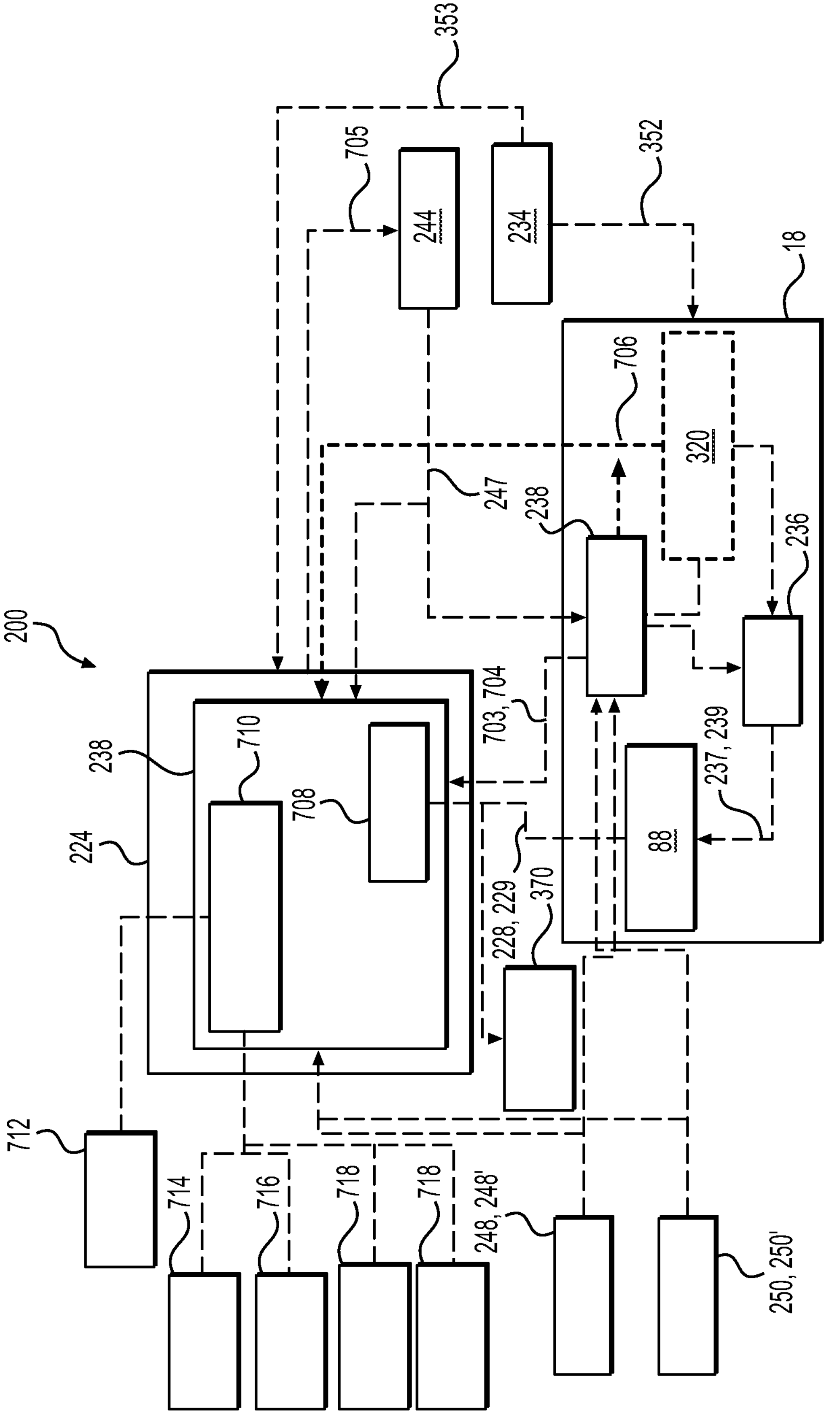

So, in FIG. 33, the latch controller 238 does not detect the crash signal 247 and maintains the backup energy control switch 706 disabled (i.e., open) to prevent power from flowing from the backup energy source 320 to the door node 224. The latch controller 238 functions during the normal mode to perform diagnostics on the backup energy source 320 while latch control functions 708 are controlled by the door node controller 232 of the door node 224. In FIG. 34, the backup power source switch 706 remains disabled, the latch controller 238 continues to perform diagnostics on the backup energy source 320 while latch control functions 708 are controlled by the door node controller 232 of the door node 224 and the crash signal 247 is sent to the latch controller 238 and to the door node controller 232. Then, in FIG. 35, the latch controller 238 detects the crash signal 247 or power loss during the emergency condition. The latch controller 238 is powered by backup energy source 320. In FIG. 36, the latch controller 238 controls the backup energy control switch 706 to supply power from the backup energy source 320 to the door node 224.

Figure 37:
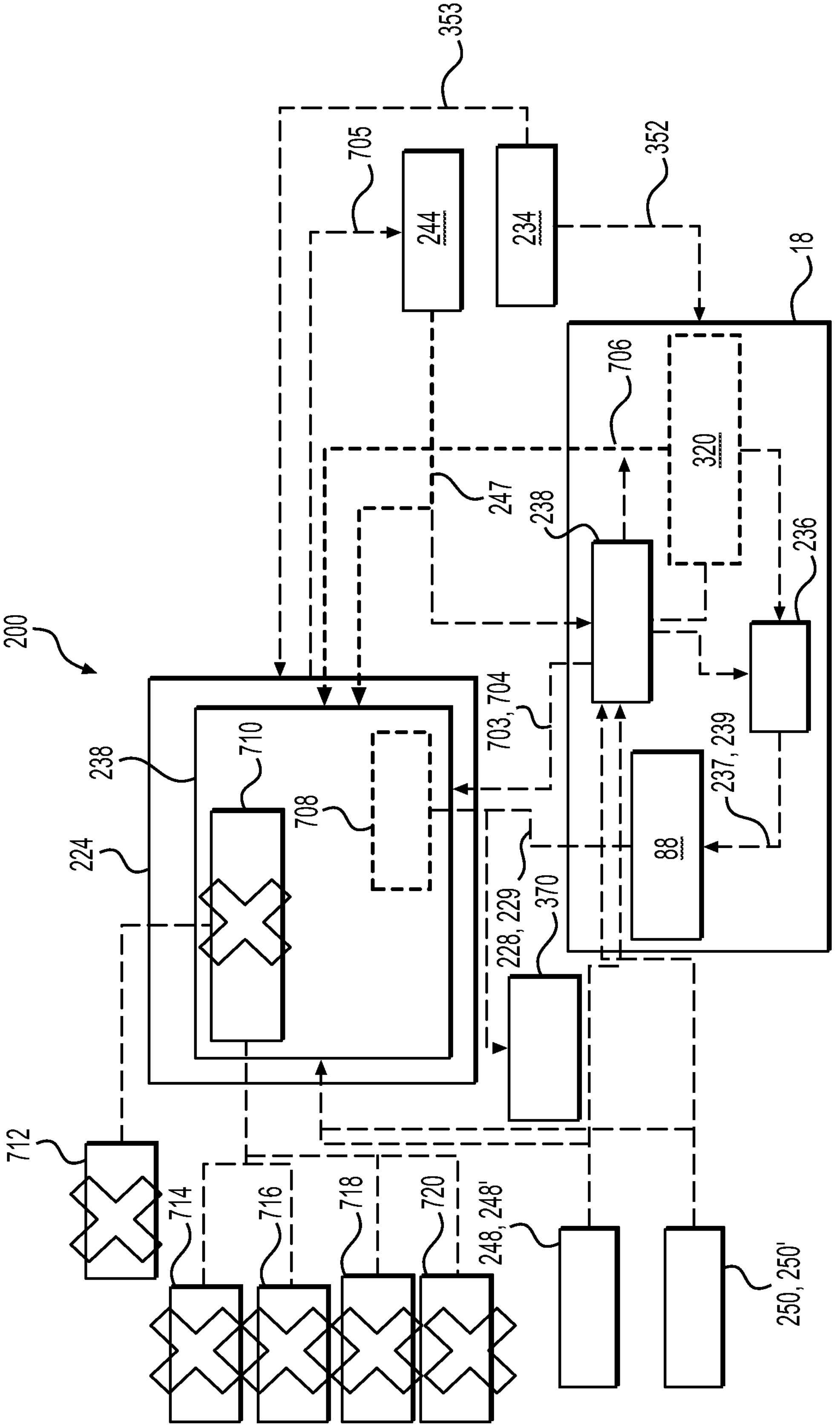
Figure 38:
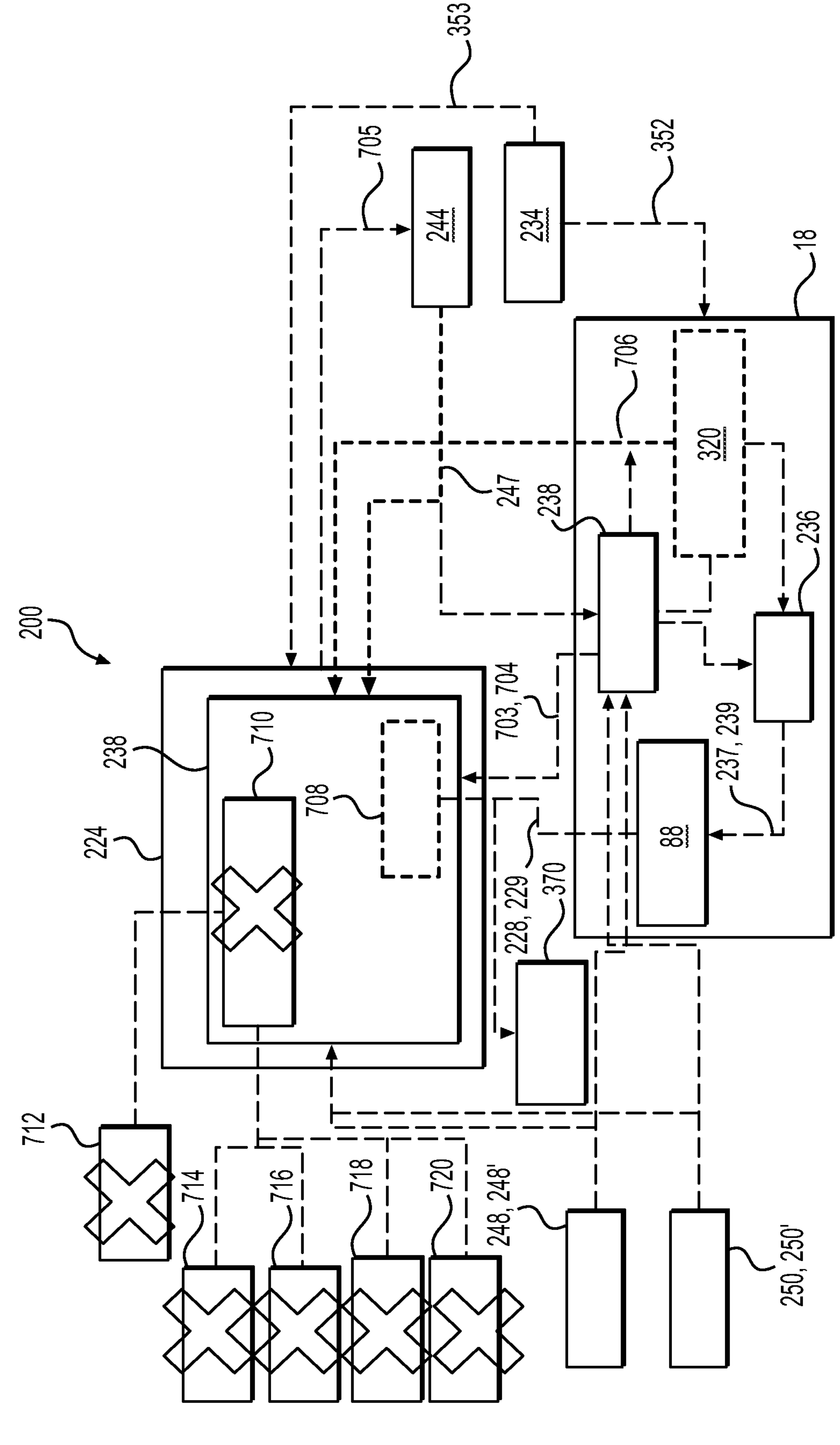

Referring to FIGS. 37 and 38, the door node controller 232 is configured to detect the crash signal 247 from the body control module 244 in communication with the door node 224. The door node controller 232 also detects a loss of the main power source 234 and enables the latch control functions 708 of the closure latch assembly 18 while disabling non-latch related functions 710 in a door node emergency mode in response to detection of one of the crash signal 247 and the loss of the main power source 234. So, the door node 224 (e.g., the door node controller 232) detects whether the crash signal 247 is present on a crash signal 247 line or no power from the power source 234 and senses that power is being supplied from the backup energy source 320 and shifts to an emergency mode. In the emergency mode, the door node 224 will disable all non-latch related functions 710 and only enable latch control functions 708. In more detail, the door node 224 is electrically coupled to at least one of a window regulator 712 and a powered door actuator 714 and a door presenter 716 and lights and alarms 718 and obstacle detection sensors 720 and the door node controller 232 is configured to control the at least one of the window regulator 712 and a powered door actuator 714 and a door presenter 716 and lights and alarms 718 and obstacle detection sensors 720 as the non-latch related functions 710 in the normal condition. Thus, the door node controller 232 controls the latch functions of the closure latch assembly 18 in both the normal and emergency conditions, but disables non-latch related functions 710 (e.g., window regulator 712 and a powered door actuator 714 and a door presenter 716 and lights and alarms 718 and obstacle detection sensors 720) in the emergency condition. So, the door node 224 knows when it is supplied by the backup energy source 320 in order to switch off all loads not related to the closure latch assembly 18. The backup energy diagnostics and status data line 704 allows such information to be communicated between the door node controller 232 and the latch controller 238.

Figure 39:
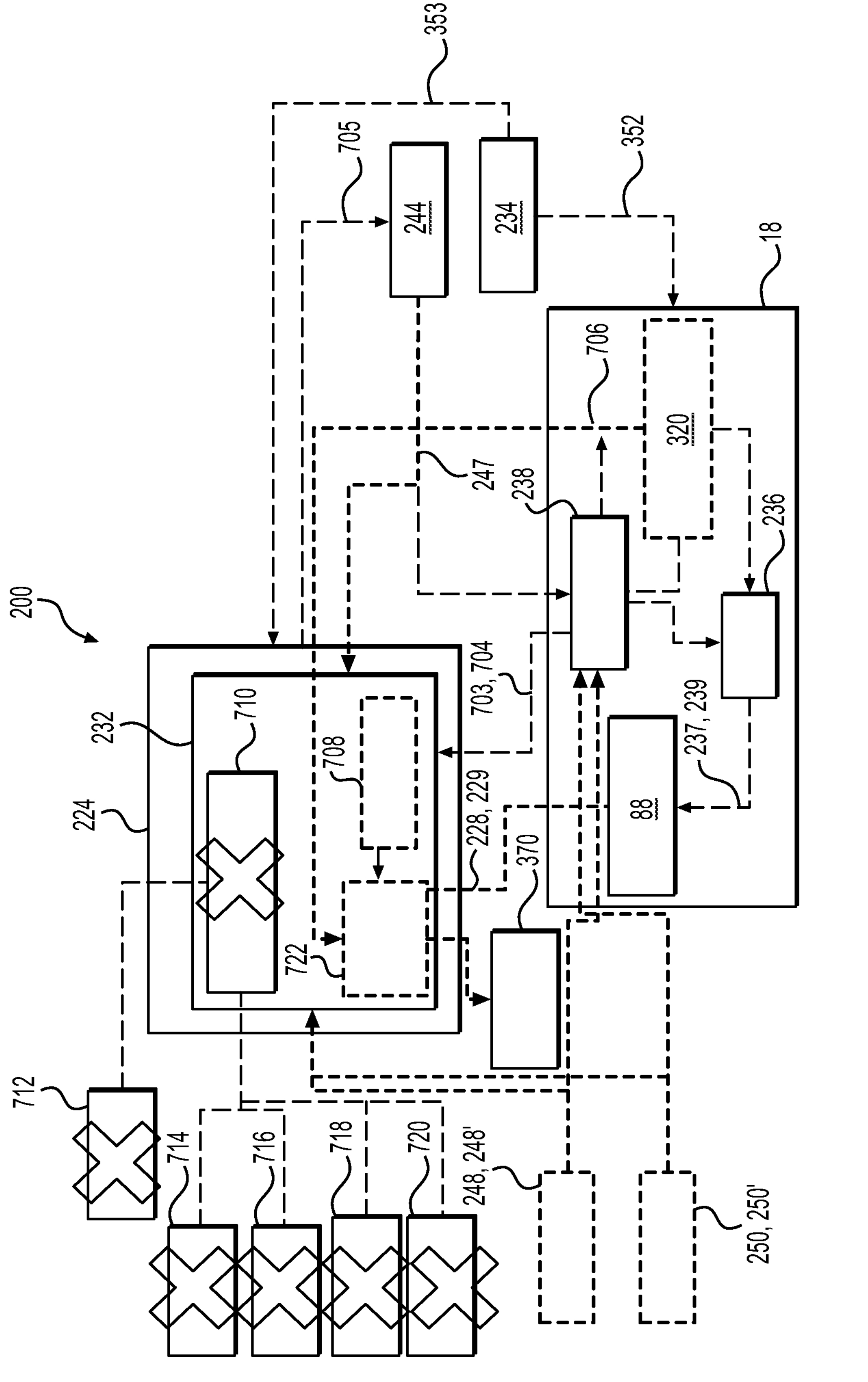

Referring to FIG. 39 and as discussed above, the closure latch assembly 18 includes the power release motor 88 for releasing the door 226. The activation of inside or outside handle signals are received by both the latch controller 238 (i.e., emergency IS and emergency OS signals) and door node controller 232 (i.e., IS and OS signals). The door node 224 further includes a super capacitor discharge switch 722 coupled between the backup energy source 320 and the power release motor 88. The super capacitor discharge switch 722 is configured to condition power sent from the backup energy source 320 to the power release motor 88. The door node controller 232 is also coupled to the super capacitor discharge switch 722 and is further configured to control the super capacitor discharge switch 722 to condition the power from the backup energy source 320 and have priority control of the power release motor 88 during the emergency condition (i.e., in the emergency mode). The door system 200 also includes the cinching actuator 370 coupled to the super capacitor discharge switch 722 of the door node 224 for cinching the door 226 closed. Consequently, the door node controller 232 is further configured to control the super capacitor discharge switch 722 to condition the power from the backup energy source 320 to the cinching actuator 370 and control the cinching actuator 370 using the power from the backup energy source 320 during the emergency condition. So, the door node controller 232 will have priority control and control the power release motor 88 using power supplied from the backup energy source 320, which is conditioned (e.g., pulse width modulated (PWM)) in the door node 224. For example the door node controller 232 will also control automatic cinch homing using power from the backup energy source 320.

Figure 40:
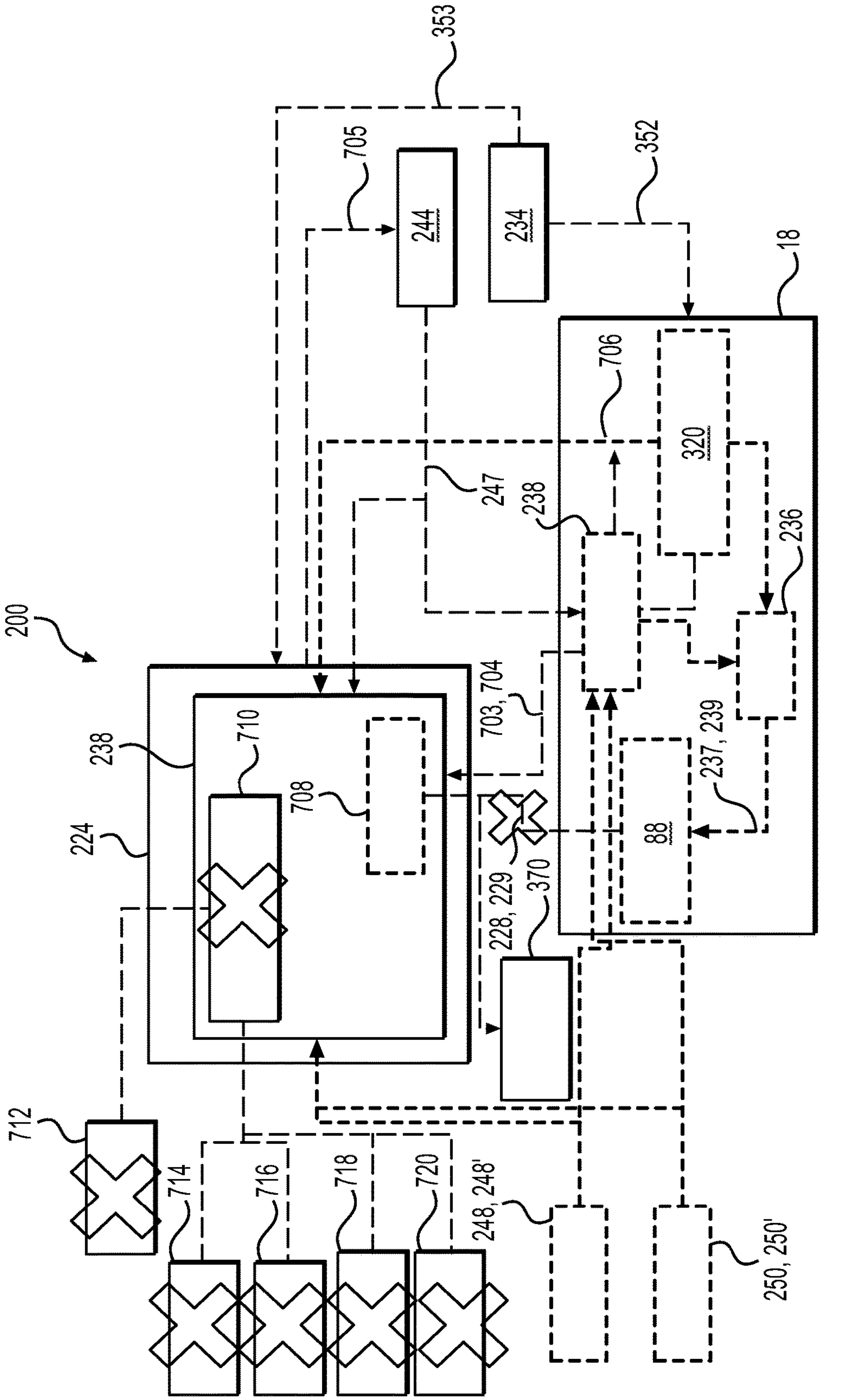

Now referring to FIG. 40 and as mentioned above, the closure latch assembly 18 further includes a secondary motor driver 236 coupled to the latch controller 238 and the backup power supply 320 and the power release motor 88 for supplying control signals 237 to the power release motor 88. In the event the closure latch assembly 18 does not release after a period of time from the latch controller receiving the IS/OS switch release signal (i.e., IS and OS signals indicating activation of at least one of the inside (IS) switch 248, 248' and the outside (OS) switch 250, 250'), the latch controller 238 will assume the door node controller 232 is unavailable (e.g., severed wire/circuity issues, etc.). In other words, the latch controller 238 is further configured to determine whether the closure latch assembly 18 is released within a predetermined release time period after the activation of the at least one of the inside switch 248, 248' and the outside switch 250, 250'. The latch controller 238 is also configured to assume the door node controller 232 is unavailable and proceed to control the power release motor 88 using the secondary motor driver 236 with power from the backup energy source 320 in response to the closure latch assembly 18 not being released within the predetermined release time period after the activation of the at least one of the inside switch 248, 248' and the outside switch 250, 250'. Thus, the latch controller 238 will proceed to control the power release motor 88 internally using the backup energy source 320 via an internally controlled power circuity (e.g., PWM the secondary motor driver 236). This provides additional release control redundancy for release activation in case of crash causing damage to the door node 224 or severing of wires to the closure latch assembly 18 compared to if the backup energy source 320 was provided in the door node only.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A closure latch assembly, comprising:

a ratchet and a pawl, the ratchet being moveable between a striker capture position and a striker release position, the pawl being moveable between a ratchet holding position, whereat the ratchet is maintained in the striker capture position, and a ratchet release position, whereat the ratchet is biased toward the striker release position;

a power actuator operably coupled to a drive train, the drive train including a first driven gear and a second driven gear, the second driven gear having an actuation feature fixed thereto; and a latch release mechanism operably coupling the actuation feature to the pawl, the latch release mechanism having a lost motion connection with the actuation feature, wherein rotation of the gear train via energization of the power actuator causes the actuation feature to move in the lost motion connection with the latch release mechanism prior to the latch release mechanism pulling the pawl to move from the ratchet holding position toward the ratchet release position, wherein the latch release mechanism includes a link arm operably coupling the pawl to the second driven gear, wherein a pulling force extending generally along a length of the link arm is applied on the pawl to pull the pawl from the ratchet holding position toward the ratchet release position, wherein the lost motion connection is between the actuation feature and the link arm, wherein the link arm has a slot extending between a first drive end and a second drive end, and the actuation feature is disposed in the slot for sliding movement between the first drive end and the second drive end.

2. The closure latch assembly as set forth in claim 1, wherein the first driven gear has a driven pinion gear fixed thereto, the driven pinion gear being in meshed engagement with the second driven gear.

3. The closure latch assembly as set forth in claim 2, wherein the power actuator has a motor shaft with a worm gear fixed thereto, the worm gear being in meshed engagement with the first driven gear.

4. The closure latch assembly as set forth in claim 3, wherein the worm gear and the first driven gear have a first gear ratio, the driven pinion gear and the second driven gear have a second gear ratio, and the worm gear and the second driven gear have a third gear ratio, the second gear ratio being greater than the first gear ratio, and the third gear ratio being greater than the second gear ratio.

5. The closure latch assembly as set forth in claim 1, wherein a motor shaft extends along a first axis, the first driven gear rotates about a second axis, and the second driven gear rotates about a third axis, the first axis extending transversely to the second axis and the third axis.

6. The closure latch assembly as set forth in claim 1, wherein the pawl comprises a first leg for coupling with the latch release mechanism, and a second leg for releasably engaging with the ratchet.

7. The closure latch assembly as set forth in claim 6, wherein the length of the first pawl leg is greater than the length of the second pawl leg.

8. The closure latch assembly as set forth in claim 6, wherein the first leg is adapted to be moved by a manual latch release mechanism.

9. The closure latch assembly as set forth in claim 6, wherein a roller is positioned between the second leg and the ratchet.

10. A closure latch assembly, comprising:

a ratchet and a single pawl, the ratchet being moveable between a striker capture position and a striker release position, the pawl being moveable between a ratchet holding position, whereat the ratchet is maintained in the striker capture position, and a ratchet release position, whereat the ratchet is biased toward the striker release position; and a power actuator operably coupled to a power release chain, the power release chain having at least three torque multiplication stages and an output operably coupled to the pawl for pulling the pawl to move from the ratchet holding position toward the ratchet release position, wherein the output is operably coupled to the pawl via a link arm having a slot extending between a first drive end and a second drive end, and the output having an actuation feature disposed in the slot for sliding lost motion movement between the first drive end and the second drive end to pull the pawl form the ratchet holding position toward the ratchet release position.

11. The closure latch assembly as set forth in claim 10, wherein the power release chain includes at least one of a gear train and at least one crank mechanism providing the at least three torque multiplication stages.

12. The closure latch assembly as set forth in claim 11, wherein the gear train provides at least three torque multiplication stages, and the at least one crank mechanism provides at least one further torque multiplication stage.

13. The closure latch assembly as set forth in claim 11, wherein the at least one crank mechanism includes a bell-crank.

14. The closure latch assembly of claim 13, wherein the pawl is configured as the bellcrank.

15. The closure latch assembly as set forth in claim 10, wherein one of the at least three torque multiplication stages is a variable torque multiplication stage.

16. The closure latch assembly of claim 10, further comprising a roller between the pawl and the ratchet.

17. A closure latch assembly, comprising:

a ratchet and a pawl, the ratchet being moveable between a striker capture position and a striker release position, the pawl being moveable between a ratchet holding position, whereat the ratchet is maintained in the striker capture position, and a ratchet release position, whereat the ratchet is biased toward the striker release position; and a power actuator operably coupled to a multistage power release chain having at least three stages, including a final stage, of torque multiplication, wherein each stage has an input and an output, wherein an application of force at the input causes a corresponding force at the output, the output from one stage drives the next stage in the release chain to impart a pulling force on the pawl to pull the pawl to the ratchet release position, wherein the output of the final stage is configured to move a drive pin, wherein a link arm operably couples the drive pin to the pawl, wherein the link arm has a slot extending between a first drive end and a second drive end, and the drive pin is disposed in the slot for sliding lost motion movement between the first drive end and the second drive end to pull the pawl form the ratchet holding position toward the ratchet release position.

* * * * *